US012271130B2

(12) United States Patent
Nakazono et al.

(10) Patent No.: US 12,271,130 B2
(45) Date of Patent: Apr. 8, 2025

(54) FIXING APPARATUS AND IMAGE FORMING APPARATUS

(71) Applicant: CANON KABUSHIKI KAISHA, Tokyo (JP)

(72) Inventors: Yusuke Nakazono, Kanagawa (JP); Yutaka Sato, Tokyo (JP); Naofumi Murata, Tokyo (JP); Hikaru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/489,035

(22) Filed: Oct. 18, 2023

(65) Prior Publication Data

US 2024/0134304 A1 Apr. 25, 2024
US 2024/0231261 A9 Jul. 11, 2024

(30) Foreign Application Priority Data

Oct. 25, 2022 (JP) ................................. 2022-170350

(51) Int. Cl.
*G03G 15/20* (2006.01)

(52) U.S. Cl.
CPC ..... *G03G 15/2025* (2013.01); *G03G 15/2039* (2013.01)

(58) Field of Classification Search
CPC ....................... G03G 15/2025; G03G 15/2039
See application file for complete search history.

(56) References Cited

U.S. PATENT DOCUMENTS 5,366,291 A * 11/1994 Nakagama ......... G03G 15/2039 374/208
2016/0098001 A1* 4/2016 Ogawa ............... G03G 15/2053 399/338
2020/0174408 A1* 6/2020 Furuichi ............ G03G 15/2042

FOREIGN PATENT DOCUMENTS

JP 2020-122850 A 8/2020

* cited by examiner

*Primary Examiner* — Stephanie E Bloss
*Assistant Examiner* — Michael A Harrison
(74) *Attorney, Agent, or Firm* — Venable LLP

(57) ABSTRACT

A fixing apparatus is used that has: a first rotation member; an elongated heater disposed in an internal space of the first rotation member, and having a heat generating member and a substrate on which the heat generating member is provided; a temperature sensing unit that detects a temperature of the heater; a heater holder that holds the heater; a second rotation member that forms a nip portion with the heater, across the first rotation member; a reservoir unit that stores grease that is supplied between the first rotation member and the heater; and an elastic member that encloses the temperature sensing unit, such that a toner image formed on a recording material is heated and fixed at the nip portion.

8 Claims, 51 Drawing Sheets

FIXING APPARATUS AND IMAGE FORMING APPARATUS

BACKGROUND OF THE INVENTION

Field of the Invention

The present invention relates to a fixing apparatus, and to an image forming apparatus.

Description of the Related Art

In an electrophotographic image forming apparatus, a fixing apparatus is used in which an unfixed toner image formed on a recording material such as paper is melted by being heated, and a toner image is fixed onto the recording material. The fixing apparatus has a heating member having a heater and a fixing film that slides over the heater, and a pressurizing roller that presses against the heater, across the fixing film, thereby forming a fixing nip. When the recording material having the unfixed image formed thereon is transported to the fixing nip, the image becomes fixed onto the recording material on account of heat from the heater and pressure from the pressurizing roller. Japanese Patent Application Publication No. 2020-122850 discloses a fixing apparatus.

In such a fixing apparatus, a lubricant grease may be interposed between the heater and the fixing film, to improve slidability between the heater and the fixing film.

SUMMARY OF THE INVENTION

An object herein is to develop a fixing apparatus that utilizes grease.

The present invention provides a fixing apparatus, comprising:

- a first rotation member;
- an elongated heater configured to have a heat generating member and a substrate on which the heat generating member is provided and to be disposed in an internal space of the first rotation member;
- a temperature sensing unit configured to detect a temperature of the heater;
- a heater holder configured to hold the heater;
- a second rotation member configured to form a nip portion with the heater, across the first rotation member;
- a reservoir unit configured to store grease that is supplied between the first rotation member and the heater; and
- an elastic member configured to enclose the temperature sensing unit,
- in the nip portion, a toner image formed on a recording material being heated and fixed,
- wherein the reservoir unit, the temperature sensing unit and the elastic member are provided between the heater and the heater holder, in a thickness direction orthogonal to both a longitudinal direction of a surface of the substrate on which a heat generating member is provided, and to a transverse direction that is orthogonal to the longitudinal direction; and
- the temperature sensing unit is enclosed by the elastic member in the longitudinal direction and the transverse direction.

A fixing apparatus that utilizes grease can thus be developed.

Further features of the present invention will become apparent from the following description of exemplary embodiments with reference to the attached drawings.

DESCRIPTION OF THE EMBODIMENTS

Figure 1:
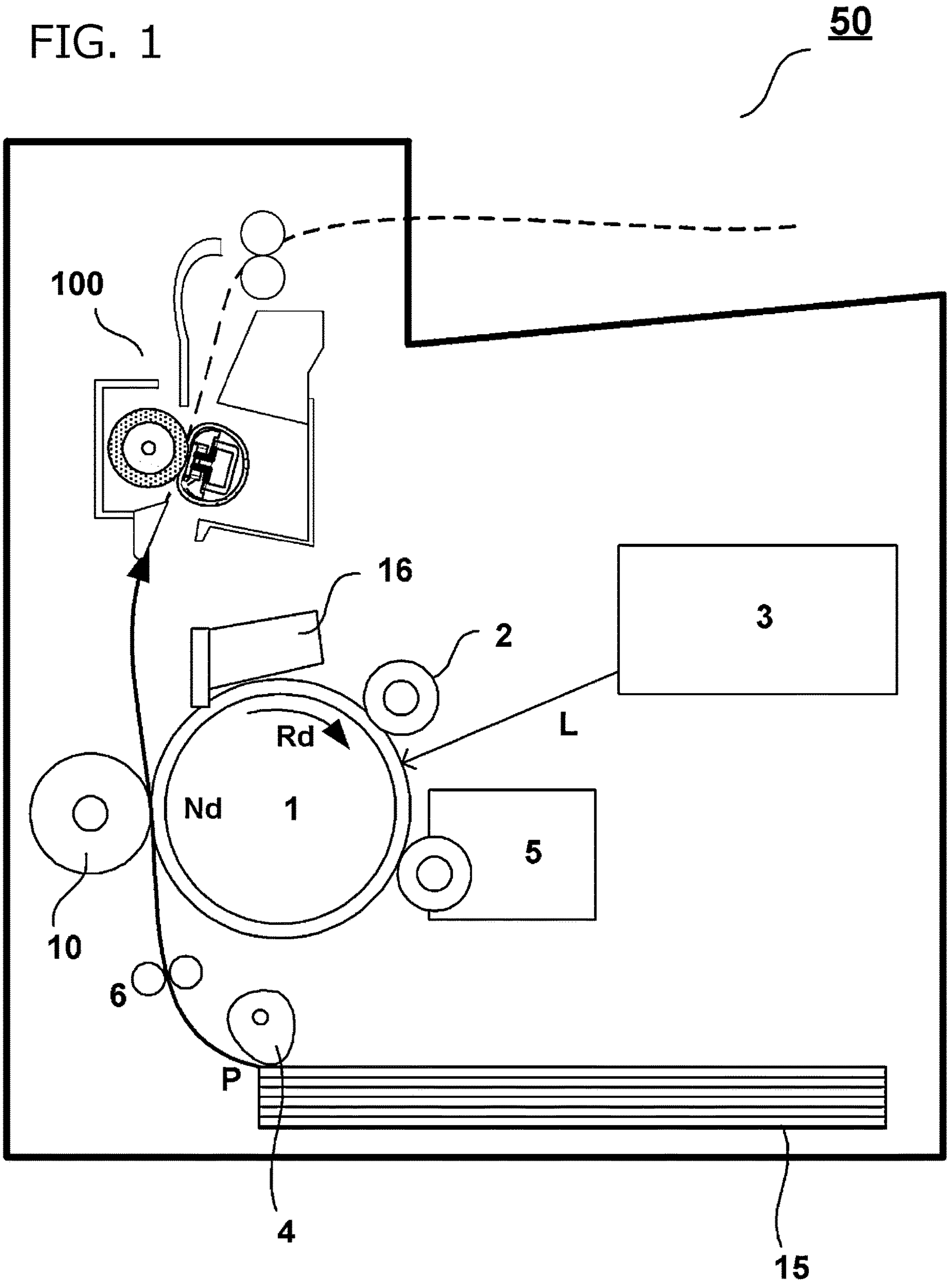
FIG. 1 is a schematic cross-sectional diagram of an image forming apparatus of Embodiment 1.

Embodiments of the present invention will be explained in detail below with reference to accompanying drawings. However, the dimensions, materials, shapes and relative arrangement of the constituent components described in the embodiments are to be modified as appropriate depending for instance on the configuration of apparatus to which the invention is to be applied, and on various conditions; the scope of the invention is thus not meant to be limited to the embodiments below.

(I)

Reducing power consumption as much as possible by not supplying power to fixing apparatuses of film heating type, in particular during standby, has been proposed in recent years in such fixing apparatuses. That is, fixing apparatuses of film heating type can use a linear heating member of low heat capacity, and can utilize a film in the form of a thin film of low heat capacity; as a result, this allows saving power and quick-starting the apparatus over a shorter waiting time. Driving schemes for such fixing apparatuses of film fixing heating type include film transport-dedicated roller schemes, as well as tensionless schemes. A film transport-dedicated roller scheme involving transport of a fixing film while applying tension to the fixing film, using a dedicated conveying roller and a dedicated driven roller, is advantageous in terms of improving the transportability of the fixing film. In a tensionless scheme, a cylindrical fixing film is driven by a conveying force at the time where the pressurizing roller is rotationally driven; such a scheme is advantageous in terms of simplifying apparatus configuration and reducing costs.

A lubricant grease may be interposed between the heater and the fixing film in such a fixing apparatus, to improve slidability between the heater and the fixing film. When the image forming apparatus is used over long periods of time, however, the grease exudes little by little from the edges of the film, and becomes discharged together with the recording material. Therefore, a grease reservoir unit that stores grease and supplies grease may be conceivably provided between the heater and the fixing film. The grease reservoir unit may be provided for instance between the back side of the heater and a heater holder which is a heater supporting member. In a case where a grease is used in the fixing apparatus it is likewise conceivable to provide an enclosing member that encloses a thermistor and a safety device being disposed behind the heater, for the purpose of preventing the grease from adhering to or seeping into the thermistor or the safety device.

In a case however where the enclosing member is integrated with the heater holder, and the Young's modulus of the enclosing member is high, a gap may be formed between the heater and the enclosing member, and grease may intrude through that gap. In a case for instance where the height of the enclosing member on the side of a contact surface with the heater is not uniform, even within tolerances, a slight discrepancy may arise between the heights the enclosing member and of the heater contact surface side of the heater holder, outside the enclosing member. In such a case, the enclosing member fails to be in close contact with the heater, on account of the slant of the heater, and thus a gap becomes formed between the heater and the enclosing member. As a result, grease adheres to or seeps into the thermistor and/or the safety device, and responsiveness is impaired. Therefore, adhesion/seepage of grease onto/into the thermistor and the safety device must be suppressed in the fixing apparatus.

Embodiment 1

Image Forming Apparatus

FIG. 1 is a schematic cross-sectional diagram of an image forming apparatus 50 of Embodiment 1. The image forming apparatus 50 is an electrophotographic image forming apparatus that directly transfers a toner image T on a photosensitive drum 1 onto a recording material P. A charging unit 2, an exposing apparatus 3, a developing unit 5, a transfer roller 10, and a cleaner 16 are disposed sequentially along the rotation direction (direction of arrow Rd) on the peripheral surface of the photosensitive drum 1, which is an image bearing member.

The charging unit 2 negatively charges the surface of the photosensitive drum 1. The exposing apparatus 3 irradiates the charged photosensitive drum 1 with a laser beam L on the basis of image data transmitted from a computer, not shown, or image data in a memory, not shown. An electrostatic latent image becomes formed on the surface of the photosensitive drum 1 as a result of an increase of surface potential at the exposed portion. In the developing unit 5 the negatively charged toner is caused to adhere only to the electrostatic latent image portion on the photosensitive drum 1. A toner image T corresponding to the image data becomes formed as a result on the photosensitive drum 1. The photosensitive drum 1, the charging unit 2, the exposing apparatus 3 and the developing unit 5 can be collectively referred to as an image forming unit.

A sheet feeding roller 4 picks up the recording material P from within a cassette 15. Conveying rollers 6 transport the recording material P to a nip Nd between the photosensitive drum 1 and the transfer roller 10. The toner image T on the photosensitive drum 1 becomes transferred onto the recording material P when a power supply, not shown, applies transfer bias of polarity (positive polarity in this case) opposite to that of the toner, to the transfer roller 10. The cleaner 16 removes, using an elastic blade, untransferred toner on the surface of the photosensitive drum 1 after transfer. The recording material P bearing the toner image T is transported to a fixing apparatus 100. A controlling unit 320, which is made up of a control circuit, a processor and so forth, controls the various constituent elements within the apparatus in accordance with a program and/or user instructions.

Fixing Apparatus

Figure 2:
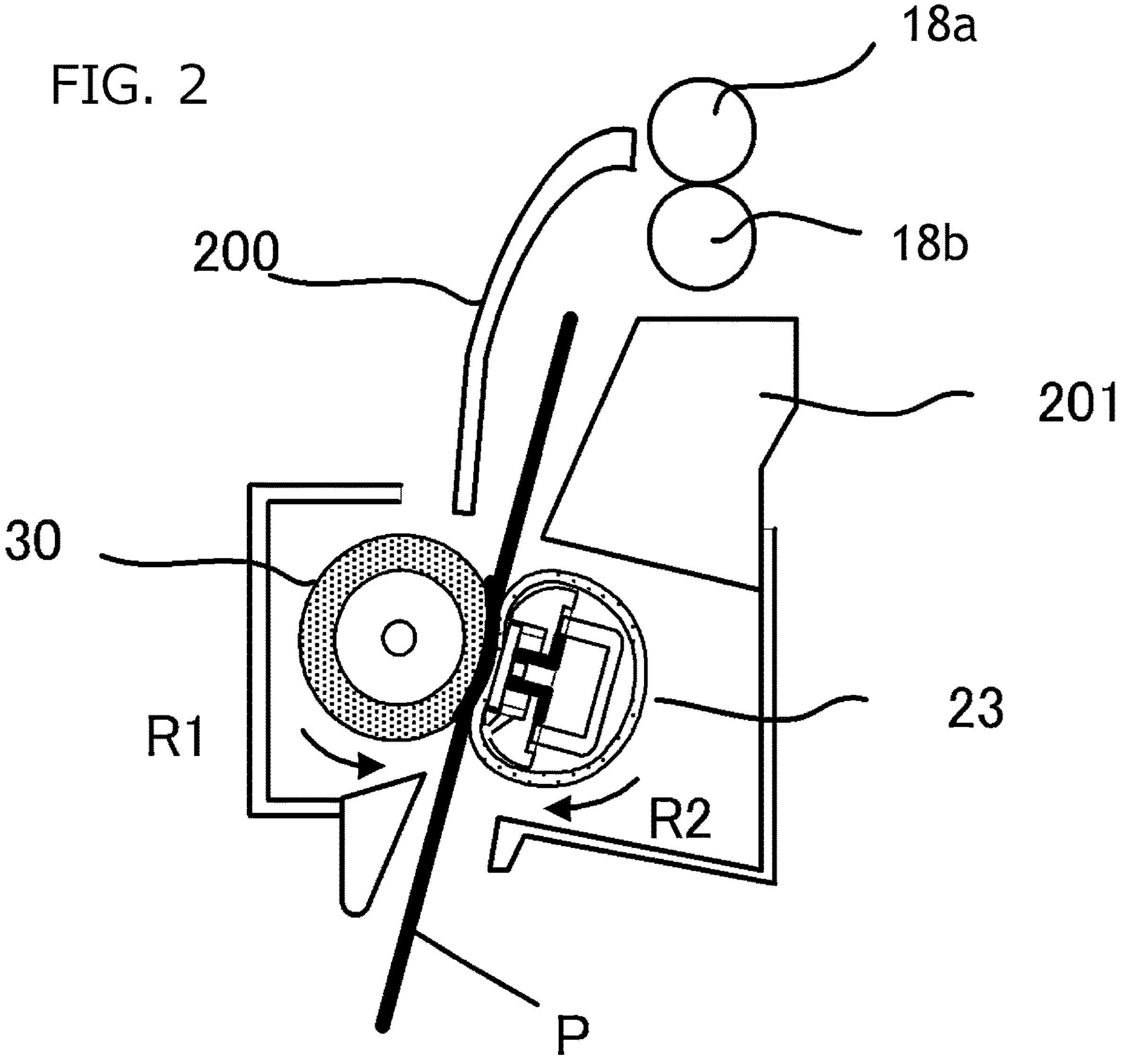
FIG. 2 is a schematic cross-sectional diagram of a fixing apparatus of Embodiment 1.
Figure 3:
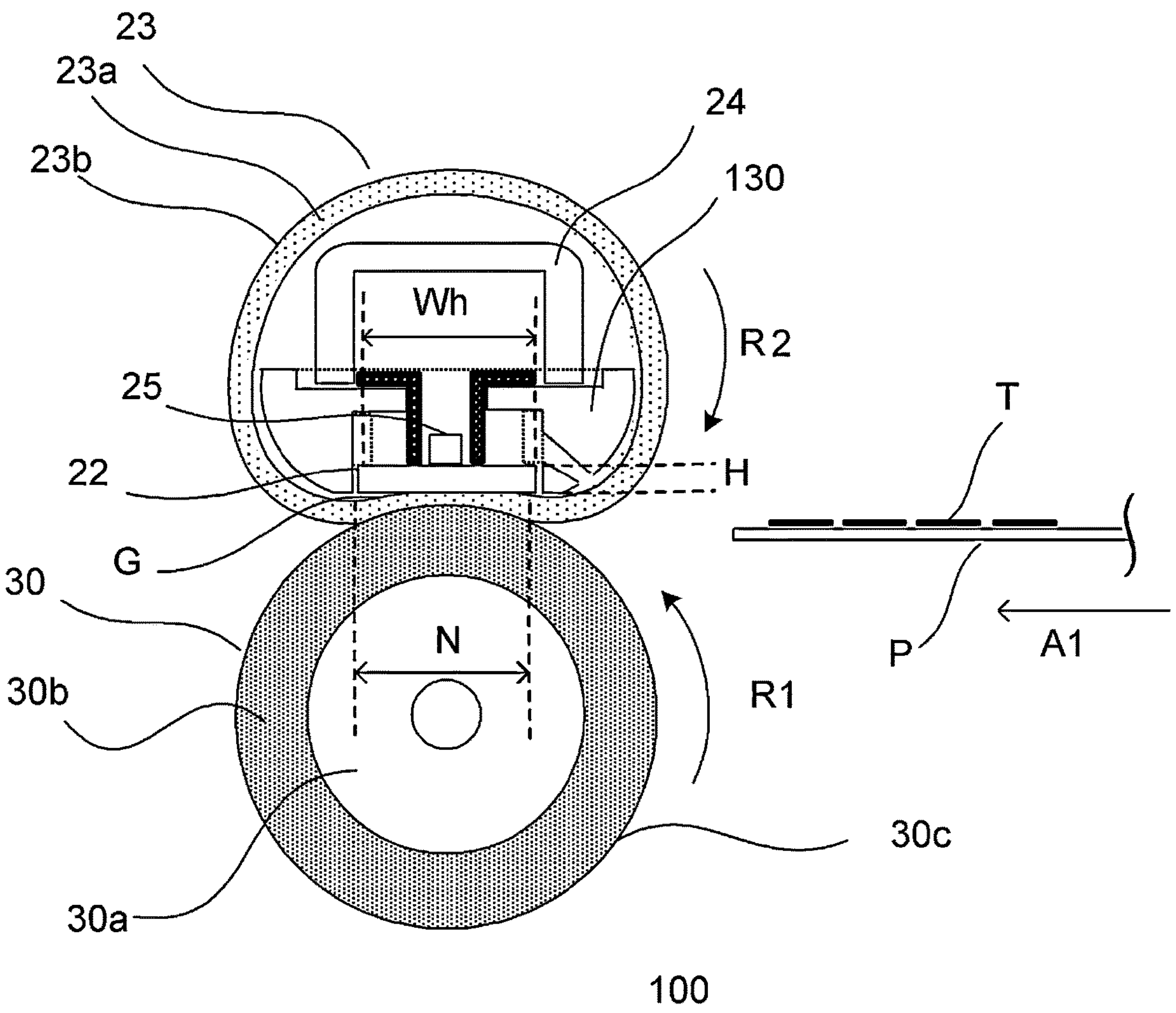
FIG. 3 is a schematic cross-sectional diagram of a pressurizing roller and a fixing film of the fixing apparatus of Embodiment 1.

As described above, the fixing apparatus 100 of film heating type of the present embodiment allows shortening start-up times and reducing power consumption. FIG. 2 is a schematic configuration cross-sectional diagram of the fixing apparatus 100. FIG. 3 is a schematic configuration cross-sectional diagram illustrating the configuration of a fixing film 23 as a first rotation member and a pressurizing roller 30 as a second rotation member, of the fixing apparatus 100.

As illustrated in FIG. 3, a heater 22 is held by a heater holder 130. The heater 22 is an elongated member disposed in the internal space of the fixing film 23. The fixing film 23, which is an endless belt, is provided around the heater 22 and the heater holder 130. The heater 22 is in contact with the inner surface of the fixing film 23, and heats up the fixing film 23 from the inward side. The pressurizing roller 30 opposes the heater 22 across the fixing film 23 in between. A fixing nip N is formed, as a nip portion, between the pressurizing roller 30 and the fixing film 23. As the pressurizing roller 30 is driven in the direction of arrow R1, the fixing film 23 receives motive power from the pressurizing roller 30, at the fixing nip N, and is rotationally driven in the direction of arrow R2. A stay 24 made of iron is herein a structure for reinforcing the heater holder 130.

The recording material P having an unfixed toner image T transferred thereonto is transported in the direction of arrow A1, and passes through the fixing nip N, whereupon the toner image T becomes fixed on the recording material P. As illustrated in FIG. 2, the fixed recording material P is thereafter guided by guide members 200, 201 and is discharged out of the body of the image forming apparatus by sheet discharging rollers 18*a*, 18*b*.

Fixing Film

The fixing film 23 has an outer diameter of φ20 mm in a cylindrical state, without deformation. The fixing film 23 has a multilayer structure in the thickness direction, and includes a film base layer 23*a* for preserving film strength, and a film releasing layer 23*b* for reducing adhesion of dirt to the surface. The film base layer 23*a* is required to exhibit heat resistance in order to receive heat from the heater 22, and also to have strength for the purpose of sliding over the heater 22. Therefore, a metal such as SUS (Stainless Used Steel) or nickel, or a heat-resistant resin such as a polyimide, is preferable herein as the material. Metals are stronger than resins, and therefore can be made thinner; further, metals have high thermal conductivity, and accordingly heat from the heater 22 can be readily transferred to the surface of the fixing film 23. By contrast, resins have a lower specific gravity than metals, and are therefore advantageous in terms of readily warming up on account of their lower heat capacity. Moreover, resins can be molded into thin films by coating molding, which allows reducing costs.

In the present embodiment a polyimide resin was used as the material of the film base layer 23*a*, with a carbon-based filler being added thereto for the purpose of improving thermal conductivity and strength. The thickness of the film base layer 23*a* in the present embodiment was set to 50 μm. The smaller the thickness, the more readily heat from the heater 22 is transferred to the surface of the pressurizing roller 30, although at the expense of a lower strength. It is therefore preferable to set a thickness from about 15 μm to 100 μm. The material of the film releasing layer 23*b* is preferably a fluororesin such as a perfluoroalkoxy resin (PFA), a polytetrafluoroethylene resin (PTFE) or a tetrafluoroethylene-hexafluoropropylene resin (FEP). In the present embodiment there is used PFA, which boasts excellent releasability and heat resistance among fluororesins. The film releasing layer 23*b* may result from tube coating, or from surface coating with a coating material. In the present embodiment the film releasing layer 23*b* was molded through coating, excellent for thin-wall molding. The thinner the film releasing layer 23*b*, the more readily heat from the heater 22 is transferred to the surface of the fixing film 23, although durability is impaired if the layer is excessively thin. The thickness is preferably from about 5 μm to 30 μm, and was set to 10 μm in the present embodiment.

Pressurizing Roller

The pressurizing roller 30 of the present embodiment is a member, having an outer diameter of φ20 mm, in which a 4-mm thick elastic layer 30*b* made up of foamed silicone rubber is formed on a φ12 mm iron-made core metal 30*a*. When the pressurizing roller 30 has large heat capacity and high thermal conductivity, heat on the surface of the pressurizing roller 30 is readily absorbed towards the interior, such that the surface temperature of the pressurizing roller 30 rises less readily. Therefore, the rise time of the surface temperature of the pressurizing roller 30 can be shortened by using, as the pressurizing roller 30, a material of lowest possible heat capacity and thermal conductivity, and that exhibits low heat capacity, low thermal conductivity, and a high thermal insulation effect. Foam rubber obtained by foaming of the above silicone rubber has a thermal conductivity from 0.11 to 0.16 W/m·K, which is lower than that of solid rubber, ranging from about 0.25 to 0.29 W/m·K. Solid rubber has a specific gravity, related to heat capacity, from about 1.05 to 1.30, whereas foam rubber has a specific gravity from about 0.45 to 0.85, i.e. has also a low heat capacity. Therefore, such foam rubber allows shortening the rise time of the surface temperature of the pressurizing roller 30.

If the outer diameter of the pressurizing roller 30 is small, the heat capacity thereof can be curtailed; if by contrast the outer diameter is too small, the width of the fixing nip becomes smaller, and hence a moderate diameter is necessary herein. The outer diameter was set to φ20 mm in the present embodiment. Concerning also the thickness of the elastic layer 30*b*, an excessively small thickness results in heat escaping towards the metal-made core metal; hence, a moderate thickness is required here as well. The thickness of the elastic layer 30*b* was set to 4 mm in the present embodiment.

On the elastic layer 30*b* there is formed a releasing layer 30*c* made up of a fluororesin such as a perfluoroalkoxy resin (PFA), as a toner releasing layer. Similarly to the film releasing layer 23*b* of the fixing film 23, the releasing layer 30*c* may result from tube coating, or from surface coating with a coating material. A tube having excellent durability was used in the present embodiment. As the material of the releasing layer 30*c* there may be used, besides PFA, for instance also a fluororesin such as PTFE or FEP, or fluorocarbon rubber or silicone rubber having good releasability. The lower the surface hardness of the pressurizing roller 30, the greater is the width of the fixing nip N that is achieved with light pressure; however, an excessively low surface hardness in the present embodiment translates into impaired durability, and accordingly the surface hardness was set to 40° in terms of Asker-C hardness (4.9 N load). A rotation means, not shown, prompts the pressurizing roller 30 to rotate in the direction of arrow R1 in the figure, at a surface moving speed of 160 mm/sec.

Heater

The heater 22 of the present embodiment is a heating heater ordinarily used in fixing apparatuses of film heating type, and has heat generating members and a substrate on which the heat generating members are provided. The substrate has a longitudinal direction and a transverse direction orthogonal to the longitudinal direction, of the surface where resistive heat generating members are provided. The substrate also has a thickness direction orthogonal to both the longitudinal direction and the transverse direction. Specifically, the heater 22 has a configuration in which resistive heat generating members are provided in series on a ceramic-made substrate. As the heater 22 there was used a heater resulting from coating the surface of an alumina substrate, having a width Wh=6 mm and a thickness H=1 mm in the transport direction of the recording material, with 10 μm of resistive heat generating members of Ag—Pd (silver-palladium), by screen printing, the applied resistive heat generating members being then covered with glass, as a heat generating member protecting layer, to a thickness of 50 μm. A thermistor 25 is disposed on the back surface of the heater 22 (surface on the reverse side from that of the fixing nip N; i.e. surface opposite the fixing nip, across the heater 22). The thermistor 25 is a temperature detection element that detects the temperature of the ceramic substrate having risen in response to the heat generated by the resistive heat generating members. The controlling unit 320 adjusts the temperature of the heater 22 by properly controlling the current flowing through the resistive heat generating members in accordance with a signal from the thermistor 25. To assemble the fixing apparatus, a reservoir unit 190, the thermistor 25 and enclosing members 170 are provided between the heater 22 and the heater holder 130 in the thickness direction. The thermistor 25 is enclosed by a respective enclosing member 170.

Grease

A grease G is a lubricant, applied onto the inner surface of the fixing film 23, for improving slidability between the fixing film 23 and the heater 22. A heat-resistant and durable grease is preferably used as the grease; MOLYKOTE (trademark) HP-300 by DuPont-Toray Specialty Materials KK is used in the present embodiment. The inner surface of the fixing film 23 at an initial stage is coated with 500 mg of the grease. A fluorine-based grease having high heat resistance is preferably used, since the temperature of the surface of the heater 22 in contact with the fixing film 23 reaches a high temperature, of about 200° C.

Heater Holder

Figure 4:
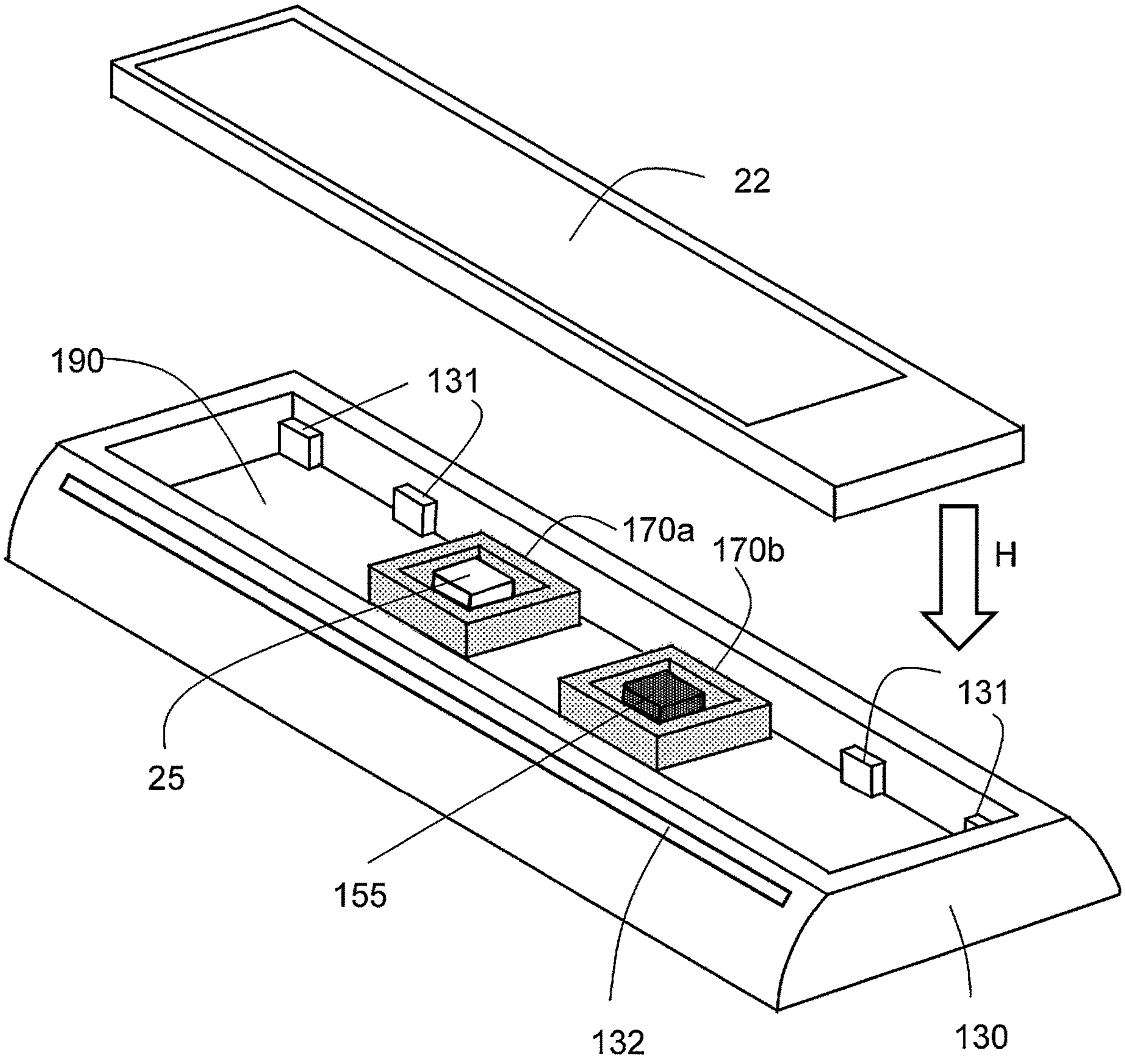
FIG. 4 is a schematic perspective-view diagram of a heater holder of Embodiment 1.
Figure 5:
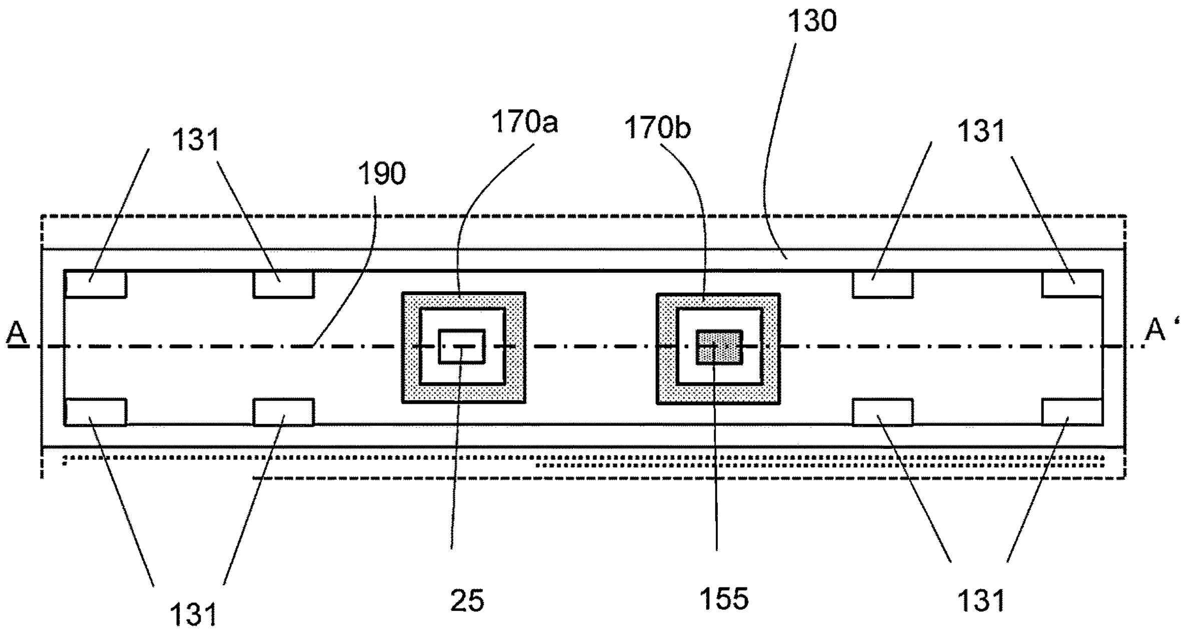
FIG. 5 is a plan-view diagram of the heater holder of Embodiment 1.
Figure 6:
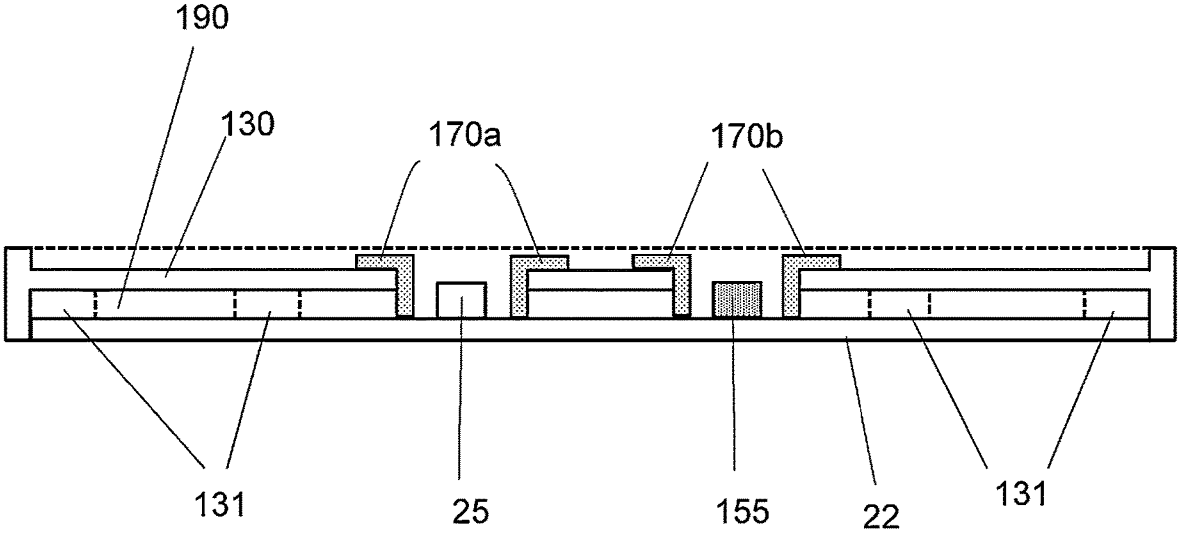
FIG. 6 is a cross-sectional diagram of the heater holder of Embodiment 1.

FIG. 4 is a schematic perspective-view diagram illustrating the heater holder of the present embodiment. FIG. 5 is a schematic plan-view diagram viewed in the H direction of FIG. 4. FIG. 6 is a schematic cross-sectional diagram along line AA' of FIG. 5.

As illustrated in FIG. 4 and FIG. 5, the heater holder 130 has the reservoir unit 190 that stores grease. Grease is supplied from the reservoir unit 190 to the inner surface of the fixing film 23 via a grease supplying port 132. The reservoir unit 190 of the present embodiment is a space capable of storing 5000 mg of grease, with the life of the body envisaged for 1000000 prints. In the present embodiment there is stored a full tank (5000 mg) of grease.

The heater 22 is installed, facing in in the direction of arrow H, on heater supporting members 131 of the heater holder 130 and on the enclosing members 170. The heater holder 130 is provided with the thermistor 25 that detects the temperature of the heater 22, and with a fuse 155 which is a safety element that cuts current off upon detection of an abnormal situation such as an abnormally high temperature. The thermistor 25 and the fuse 155 are installed so as to be in contact with the back surface of the heater 22. Herein, the "back surface" of the heater 22 refers to the surface on the reverse side from that of the front surface, the "front surface" being the surface closer to the fixing nip N from among the two surfaces of the heater 22. Both the thermistor 25 and the fuse 155 can be referred to as a temperature sensing unit, by virtue of having the function of sensing the temperature of the heater 22. The present embodiment can be applied to configurations having at least either one from among the thermistor 25 and the fuse 155. Needless to say, the present embodiment is also applicable to a configuration that includes both the thermistor 25 and the fuse 155.

The thermistor 25 is set on a respective heater holder 130 via ceramic paper, not shown, having a thickness of 5 mm. A polyimide film having a thickness of 10 μm, not shown, is provided between the thermistor 25 and the heater 22. This configuration allows for stable installation, and allows ensuring thermal insulation and responsiveness.

The thermistor 25 and the fuse 155 are separated by the reservoir unit 190 and the enclosing members 170. Each enclosing member 170 as an elastic member enclosing a temperature sensing unit is a member separate from the heater holder 130. So long as the enclosing members 170 and the heater holder 130 can be stably joined to each other, the method for installing the enclosing members 170 to the heater holder 130 is inconsequential, and for instance may involve fixing through pinching, or fixing by way of an adhesive. From the viewpoint of adherence to the heater 22, the enclosing members 170 are preferably heat-resistant members in the form of elastic bodies of low Young's modulus. Preferably, the enclosing members 170 are at least elastic members having a Young's modulus lower than that of the body of the heater holder 130. Silicone rubber is used in the enclosing members 170 of the present embodiment. The enclosing members 170 of the present embodiment include an enclosing member 170*a* for the thermistor 25 and an enclosing member 170*b* for the fuse 155. As illustrated in FIG. 6, the heater 22 is in contact with the heater supporting members 131, the enclosing members 170, the thermistor 25 and the fuse 155.

Effect

Printing was performed using the image forming apparatus 50 provided with fixing apparatus 100 of Embodiment 1, and the degree of adhesion of grease to the thermistor 25 and the fuse 155 in the heater holder 130 was ascertained. Ascertainment of the change in weight of the thermistor 25 and the fuse 155 before and after printing was adopted herein as a method for determining the degree of adhesion of the thermistor.

Conditions

Environment: 23° C. 60% R. H.

Image forming apparatus body: machine Canon Satera LBP 162, 28 ppm (paper processable up to a LTR size width)

Paper processed: Canon Red Label 80 g/$m^2$, A4 paper

Print count: 30000 prints

Control temperature of fixing heater during passage of paper: 200° C.

Experimental results are described below. Table 1 sets out the change in weight of the of the thermistor 25 and the fuse 155 before and after a paper passage durability test in the image forming apparatus, and the state of the end portions of the pressurizing roller 30.

TABLE 1

| | Thermistor | Fuse | State of end portions of pressurizing roller |
|---|---|---|---|
| Embodiment 1 | 5 mg by weight increase in weight | 4 mg by weight increase in weight | No problem |
| Comparative example 1 | 45 mg by weight increase in weight | 32 mg by weight increase in weight | Thermal degradation |

Comparative Example 1

Figure 7:
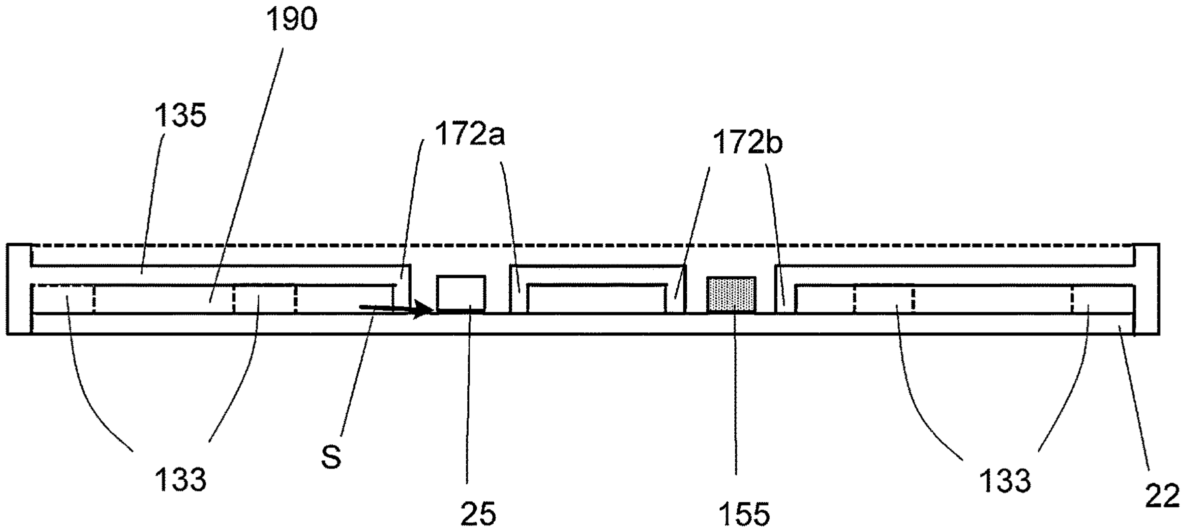
FIG. 7 is a cross-sectional diagram of a heater holder of a comparative example.

The results of comparative example 1 will be explained first. FIG. 7, which corresponds to FIG. 6 of Embodiment 1, is a schematic cross-sectional diagram along the longitudinal direction of the configuration of a heater holder 135 in Comparative example 1, at the center in the transport direction. In Comparative example 1, an enclosing member 172*a* of the thermistor 25 and an enclosing member 172*b* of the fuse 155 are configured integrally with the heater holder 135. The heater 22 is installed in contact with heater supporting members 133 and the enclosing members 172. However, both the heater supporting members 133 and the enclosing members 172 are one same member, very hard, that is integral with the heater holder 135; as a result, small gaps may arise at contact portions of the enclosing members 172 and the heater 22, even when the heights of the foregoing are slightly different, within tolerances. In consequence, the grease in the reservoir unit 190 intrudes into the enclosing members 172 through a gap denoted by the arrow S, and adheres to and/or seeps into the thermistor 25 and the fuse 155, giving rise to a significant increase in weight, as seen in Table 1.

In comparative example 1, rubber deterioration was observed at the longitudinal-direction end portions of the pressurizing roller 30 of the fixing apparatus 100. The end portions of the pressurizing roller 30 are portions at which heat generating members of the heater 22 are present but through which paper does not pass (paper non-passage portions). The heat generating members of the heater 22 of the present embodiment and Comparative example 1 correspond to paper sizes up to LTR size, and accordingly in the conditions of the present embodiment the paper non-passage portions of the heat generating members are areas between respective A4 end portions and LTR end portions, in the longitudinal direction. The temperature in these areas rises since heat generated at the time of fixing is not robbed there by the paper. In the design of the image forming apparatus, therefore, the temperature at such areas is prescribed not to exceed the heat resistance temperature of the rubber that makes up the pressurizing roller 30. The pressurizing roller 30 of the present embodiment and Comparative example 1 utilizes silicone foam rubber having a heat resistance temperature of 230° C., and accordingly the pressurizing roller 30 is designed so that the paper non-passage portion does not exceed this heat resistance temperature.

However, when the responsiveness of the thermistor 25 of Comparative example 1 deteriorates on account of seepage of grease, and the actual temperature of the heater 22 becomes higher than a control target value (for instance 200° C.), also the temperature of the paper non-passage portion of the pressurizing roller 30 exceeds the heat resistance temperature, and rubber deterioration occurs. A measurement of the temperature of the paper non-passage portion of the pressurizing roller 30 in Comparative example 1 revealed that the temperature rose to 250° C., beyond the heat resistance temperature. Further continued passage of paper in this state might result in destruction of the pressurizing roller 30.

Present Embodiment

On the other hand, the enclosing members 170 in Embodiment 1 are formed separately from the heater holder 130, and are made up of silicone rubber, which is an elastic body; adherence to the heater is accordingly enhanced thereby. As a result, seeping of grease into the thermistor 25 and the fuse 155 was reduced, as Table 1 reveals. Accordingly, there was virtually no change in the responsiveness of the thermistor 25, and there was observed no deterioration of rubber at the paper non-passage portion at the end portions of the pressurizing roller 30, such as that which occurred in Comparative example 1. A measurement of the temperature of the paper non-passage portions of the pressurizing roller 30 in Embodiment 1 yielded a value of 220° C., lower than the heat resistance temperature.

As described above, in the present embodiment the enclosing members 170 that isolate the thermistor 25 and the fuse 155 from the grease in the interior of the grease reservoir unit of the heater holder 130 are made up of an elastic body of low Young's modulus. As a result, it becomes possible to reduce adhesion/seepage of grease onto/into the thermistor 25 and the fuse 155, and prevent impairment of responsiveness.

In the present embodiment the heater holder 130 and the enclosing members 170 are configured as separate members, and the material of the enclosing members 170 is silicone rubber; however, the embodiment is not limited thereto so long as a similar effect is elicited. Through the use of a material having higher elasticity than at least that of the heater holder 130, in the enclosing members 170, better results can be obtained than in a case where conventional enclosing members are used that are integrally formed with the heater holder.

Variation

The configuration in the present variation is identical to the Embodiment 1, the only difference being the manner in which an enclosing member is bonded to the heater. Therefore, a detailed description of the configuration of the present embodiment is omitted. Herein the portions of the enclosing members 170 that are in contact with the heater 22 are bonded by way of a silicone adhesive. Adhesion/seepage of grease onto/into the thermistor 25 and the fuse 155 are further reduced as a result.

Effect

Printing was performed using the image forming apparatus 50 provided with the fixing apparatus 100 of the variation, and the degree of adhesion of grease to the thermistor 25 and the fuse 155 in the heater holder was ascertained in the same way as in Embodiment 1.

Conditions

Environment: 23° C. 60% R. H.

Image forming apparatus body: machine Canon Satera LBP 162, 28 ppm (paper processable up to a LTR size width)

Paper processed: Canon Red Label 80 g/$m^2$, A4 paper

Print count: 30000 prints, which is the life of the body

Experimental results are described below. Table 2 illustrates the change in weight of the thermistor 25 and the fuse 155 before and after a paper passage durability test.

TABLE 2

| | Thermistor | Fuse | State of end portions of pressurizing roller |
|---|---|---|---|
| Embodiment 2 | No weight change | No weight change | No problem |

As in Embodiment 1, the enclosing members 170 of the thermistor 25 and the fuse 155 were set to be separate from the heater holder 130. The material of the enclosing members 170 was silicone rubber, which is an elastic body, to enhance adherence to the heater. The portions of contact of the enclosing members 170 and the heater 22 were bonded by way of an adhesive. Adhesion/seepage of grease onto/into the thermistor 25 and fuse 155 were further reduced as a result. In consequence, the responsiveness of the thermistor 25 virtually does not change, and hence also the rise in temperature at the paper non-passage portion does not become larger. Accordingly, no deterioration of rubber in the paper non-passage portion of the pressurizing roller 30 was observed.

As described above bonding of the enclosing members 170 to the heater 22 in the present variation allows further reducing adhesion/seepage of grease onto/into the thermistor 25 and the fuse 155, and preventing impairment of responsiveness. In the present embodiment a silicone adhesive is used for bonding the enclosing members 170 and the heater 22 together, but any type of adhesive may be used, so long as the same effect is elicited.

(II)

A fixing apparatus has: an endless fixing film that moves while in contact with a heater; a film guide that holds the heater and guides the movement of the film; a stay that holds the film guide; and a pressurizing roller that forms a nip portion with the heater, across the film in between. In such a fixing apparatus, heat-resistant grease is interposed as a lubricant between the fixing film and the heater, to reduce sliding resistance between the foregoing. A recording material such as paper carrying an unfixed toner image is heated while being nipped and transported at the nip portion, as a result of which the toner image becomes fixed on the recording material. When a recording material of size smaller than a passable width passes through such a fixing apparatus, no absorption of heat by the recording material takes place in the paper non-passage portion of the pressurizing roller. As a result, the temperature of the end portions of the pressurizing roller rises, and the outer diameter of the pressurizing roller widens. In consequence, the feeding speed of the fixing film becomes higher at the paper non-passage portion than in a paper passage portion, and the fixing film may twist and/or deflect. Deflection of the fixing film results in wrinkles on the surface of the fixing film, which translates into image defects. Therefore, deflection of the fixing film may conceivably be prevented by providing a regulating rotation member for regulating the passage shape of the fixing film on the stay facing the inner surface of the fixing film.

In such a fixing apparatus, however, the regulating rotation member may scrape off the grease on the inner surface of the fixing film when the inner surface of the fixing film and the regulating rotation member come into contact with each other. When the amount of grease on the inner surface of the fixing film decreases as a result, frictional forces between the inner surface of the fixing film and the heater increase, with slippage of the pressurizing roller and the film; this can result in jams where the recording material fails to be transported, and in image defects. It is therefore necessary to preclude the occurrence of image defects on account of deflection of the fixing film, and curtail reduction in grease on the inner surface of the fixing film, and thereby suppress the occurrence of image defects.

Embodiment 2

The image forming apparatus of the present embodiment is identical to that explained with reference to FIG. 1, and an explanation thereof will be omitted. In the fixing apparatus of the present embodiment the regulating rotation member for preventing deflection is provided with concaved grooves in the circumferential direction, so as to reduce a contact region with the inner surface of the fixing film. As a result, scraping of grease on the inner surface of the fixing film due to contact of the regulating rotation member with the inner surface of the fixing film is reduced, and good slidability is preserved.

Fixing Apparatus

Figure 8:
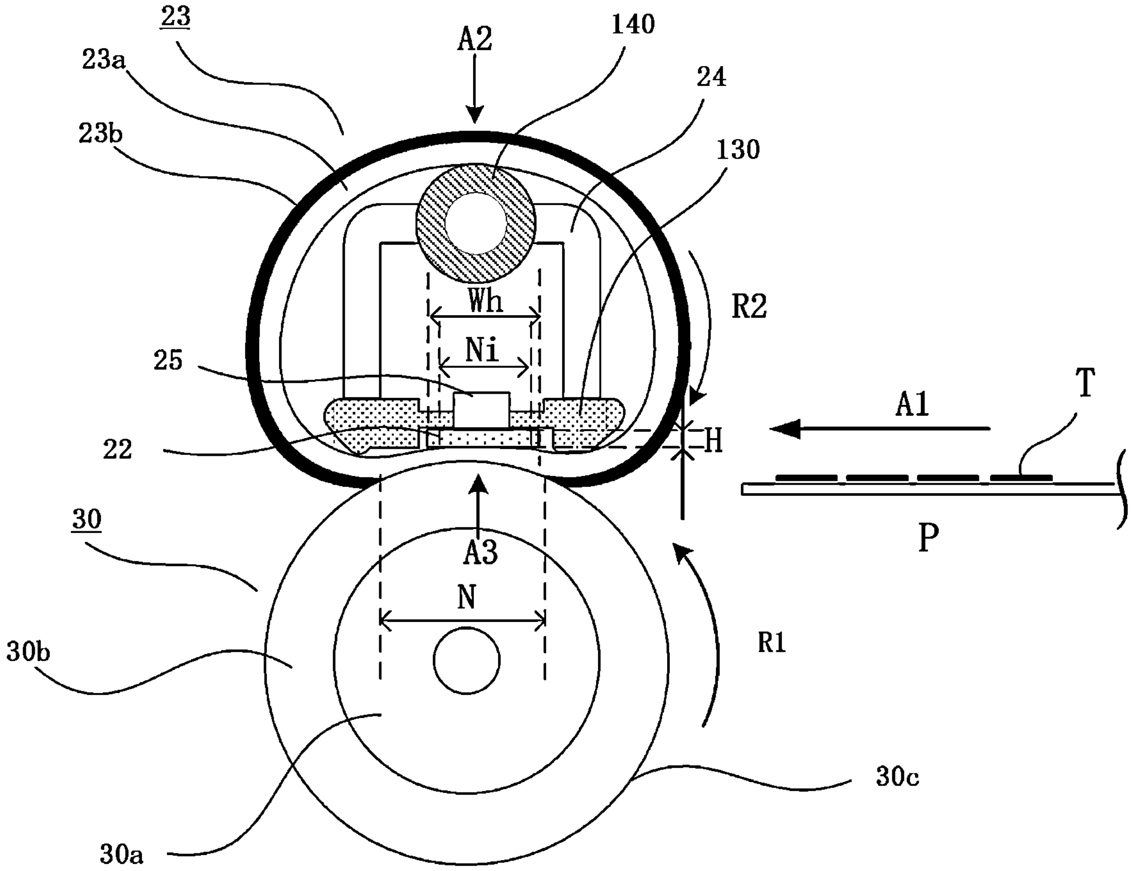
FIG. 8 is a schematic cross-sectional diagram of an image forming apparatus of Embodiment 2.

FIG. 8 is a cross-sectional diagram of the fixing apparatus 100 of film heating type of the present embodiment. The heater 22 is held by the heater holder 130, while the fixing film 23, which is an endless belt, is provided around the foregoing. The heater 22 is in contact with the inner surface of the fixing film 23, forming an inner surface nip Ni, so as to heat up the fixing film 23 from the interior. The pressurizing roller 30 forms the fixing nip N against the heater 22, so as to nip the fixing film 23 in between.

The stay 24 receives pressure, not shown, and urges the heater holder 130 towards the pressurizing roller 30. When the pressurizing roller 30 is driven in the direction of arrow R1 in the figure, the fixing film 23 receives motive power from the pressurizing roller 30 at the fixing nip N, and is rotationally driven in the direction of arrow R2. The recording material P having an unfixed toner image T transferred thereonto is transported to the fixing nip N, in the direction of the arrow A1 in the figure, and the toner image T becomes fixed on the recording material P.

The features of the fixing film 23, the pressurizing roller 30, the heater 22, and the grease G are identical to those in Embodiment 1, and hence an explanation of the foregoing will be omitted herein. In the present embodiment the rotational speed of the pressurizing roller 30 in the direction of the arrow R1 is set to a surface moving speed of 200 mm/sec. The amount of grease applied in the present embodiment was 300 mg.

Stay

The stay 24, which is for instance an elongated metallic member, faces the heater holder 130, and opposes the heater 22 across the heater holder 130. A regulating rotation member as a support member for supporting the fixing film 23 is attached, as a first rotation member, onto the stay 24.

Regulating Rotation Member

A regulating rotation member 140, which is a characterizing feature of the present invention, will be explained next. The regulating rotation member 140 is a member that stabilizes the trajectory of the film. The regulating rotation member 140 is a rotation member that rotates accompanying the rotation of the fixing film 23.

Figure 9:
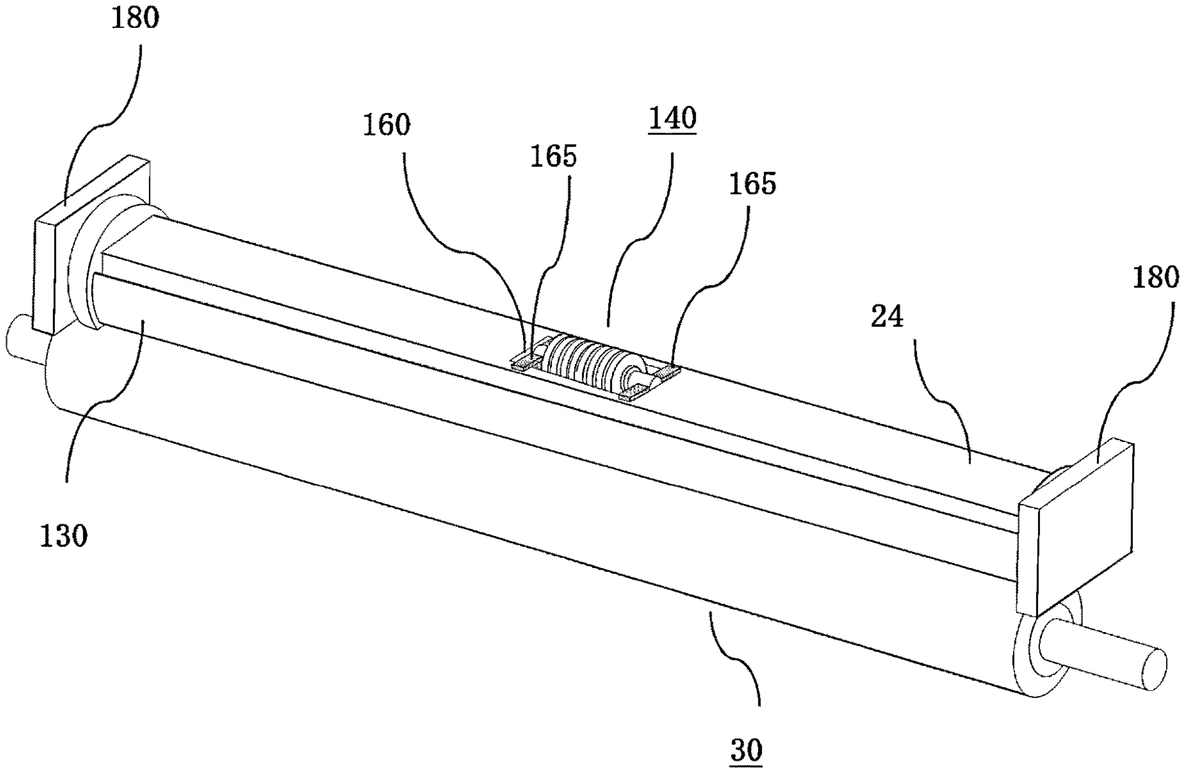
FIG. 9 is a perspective-view diagram of a fixing apparatus of Embodiment 2.

FIG. 9 is a perspective-view diagram of the fixing apparatus with the fixing film 23 omitted therefrom. One regulating rotation member 140 is provided in a positioning hole 160 in a longitudinal central portion of the stay 24. The rotating shaft of the regulating rotation member 140 is held by a bearing 165 provided in the positioning hole 160, and opposes the fixing film 23. A portion of the regulating rotation member 140 protrudes beyond the stay 24, from the side on the reverse side from that of the pressurizing roller 30. The portion of the regulating rotation member 140 protruding beyond the stay 24 is in contact with the fixing film 23 and is rotationally driven accompanying the rotation of the fixing film 23. Respective flanges 180 on both ends restrict the fixing film. In the present embodiment one regulating rotation member 140 is installed at the longitudinal central portion of the stay 24, where the fixing film 23 deflects more readily. However, the placement position and number of placement sites of the regulating rotation member 140 may be modified as appropriate depending on the configuration of the apparatus.

Figure 10:
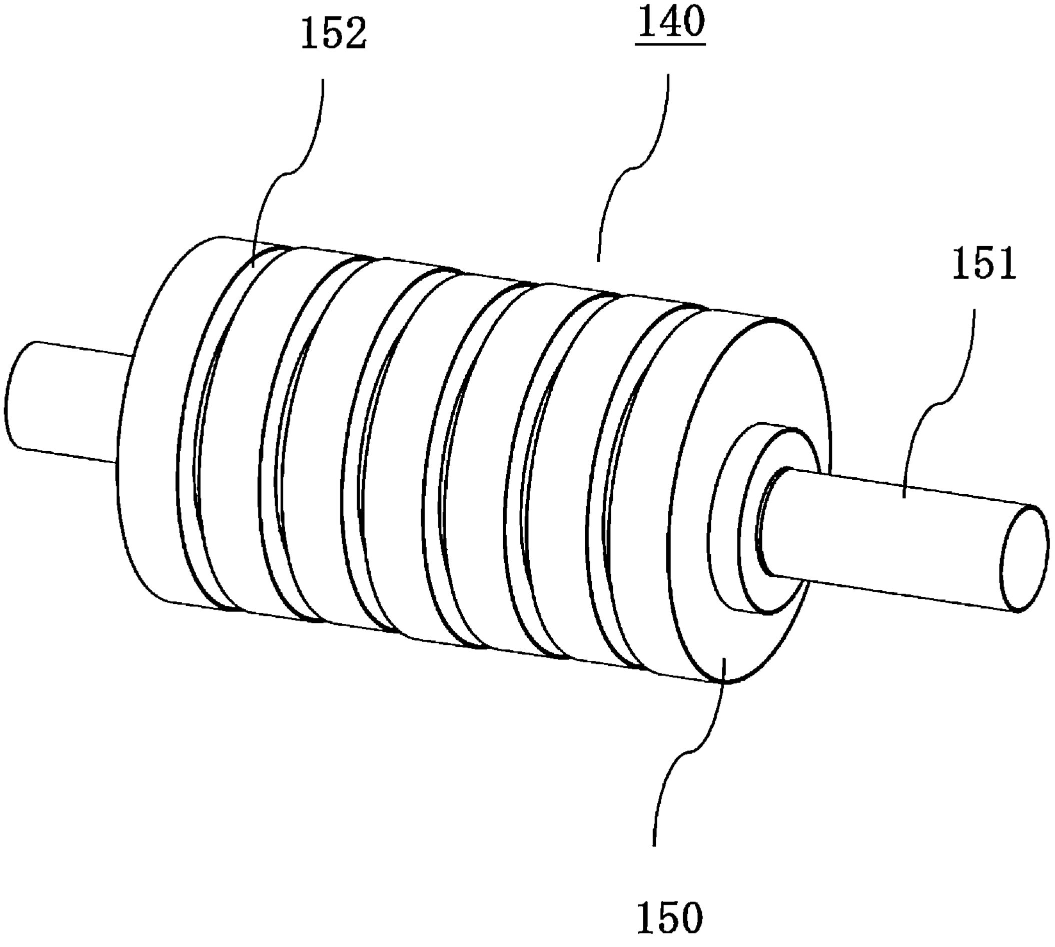
FIG. 10 is a perspective-view diagram illustrating a regulating rotation member of Embodiment 2.

As illustrated in FIG. 10, the regulating rotation member 140 has a roller 150 and a supporting axis 151 that rotatably supports the roller 150. The roller 150 is a cylindrical rotation member that is in contact with the inner surface of the fixing film 23. The outer diameter of roller 150 is set in accordance with the dimensions of the device. The longitudinal length of the roller 150 is set according to the range from the region at which the film deflects. In the present embodiment the roller 150 is set to have an outer diameter of 6 mm and a longitudinal length of 50 mm. A heat-resistant PBS resin is used as the material of the roller 150 of the present embodiment, but other heat-resistant resin materials may be used. A cylindrical PBS resin was used herein as the material of the supporting axis 151 of the present embodiment, but the supporting axis may be a spring.

Multiple slit-shaped concaved grooves 152 are formed, in the peripheral surface of the roller 150 of the present embodiment, so as to be juxtaposed in the longitudinal direction. The concaved grooves 152 are provided in the circumferential direction of the roller 150. By forming thus a plurality of concaved grooves 152 it becomes possible to reduce the contact surface area between the regulating rotation member 140 and the inner surface of the fixing film 23, and to curtail reduction in grease on the inner surface of the fixing film 23. In the present embodiment the width of the concaved grooves is set to 3 mm, with six concaved grooves being disposed at equal intervals in the longitudinal direction. A "concaved groove" may be herein any groove portion that is recessed from the surface of the regulating rotation member 140, regardless of the cross-sectional shape of the groove portion. The cross-sectional shape of the groove portion may be for instance a quadrangle with right-angled corners, a quadrangle with rounded corners, a semicircle, a semiellipse, or a triangle. By being provided with such grooves, the regulating rotation member 140 has a contact region of contact with the fixing film 23, and a non-contact region not in contact with the fixing film 23, in the longitudinal direction of the surface of the substrate of the heater 22 at which heat generating members are provided, or in a transverse direction that is orthogonal to the longitudinal direction.

Effect

In order to assess the effect of the present embodiment, printing was performed under the conditions below for an instance where the roller 150 of the present embodiment was used, and an instance where there was used a smooth regulating rotation member without concaved grooves on the circumferential surface, as a comparative example; respective amounts of reduction in grease on the inner surface of the fixing film 23 were compared.

Paper: Canon A5 size paper "PB PAPER (basis weight 64 g/m$^2$)"

Print count: maximum 1000 prints (100 prints continuously outputted, 200 prints continuously outputted, 500 prints continuously outputted, 1000 prints continuously outputted)

Under the above conditions, paper was continuously run, from a grease-applied state; the weight of the regulating rotation member 140 was measured before and after the start of the test, to measure thereby the weight of the grease adhered to the regulating rotation member. The larger the amount of grease adhered to the regulating rotation member 140, the greater is the extent to which grease on the inner surface of the fixing film 23 is scraped off by the regulating rotation member 140.

In a case where paper of the above size is utilized, there is a region, in the longitudinal direction, at which the heat generating members are present but through which no paper passes. In such a paper non-passage region the heat of the pressurizing roller 30 is not robbed by the paper, and the temperature rises, which causes the elastic layer to expand. As a result, a difference in transport speed arises between the longitudinal end portions and the center portion of the fixing film 23, and the fixing film 23 becomes prone to deflect and to come into contact with the regulating rotation member 140.

Figure 11:
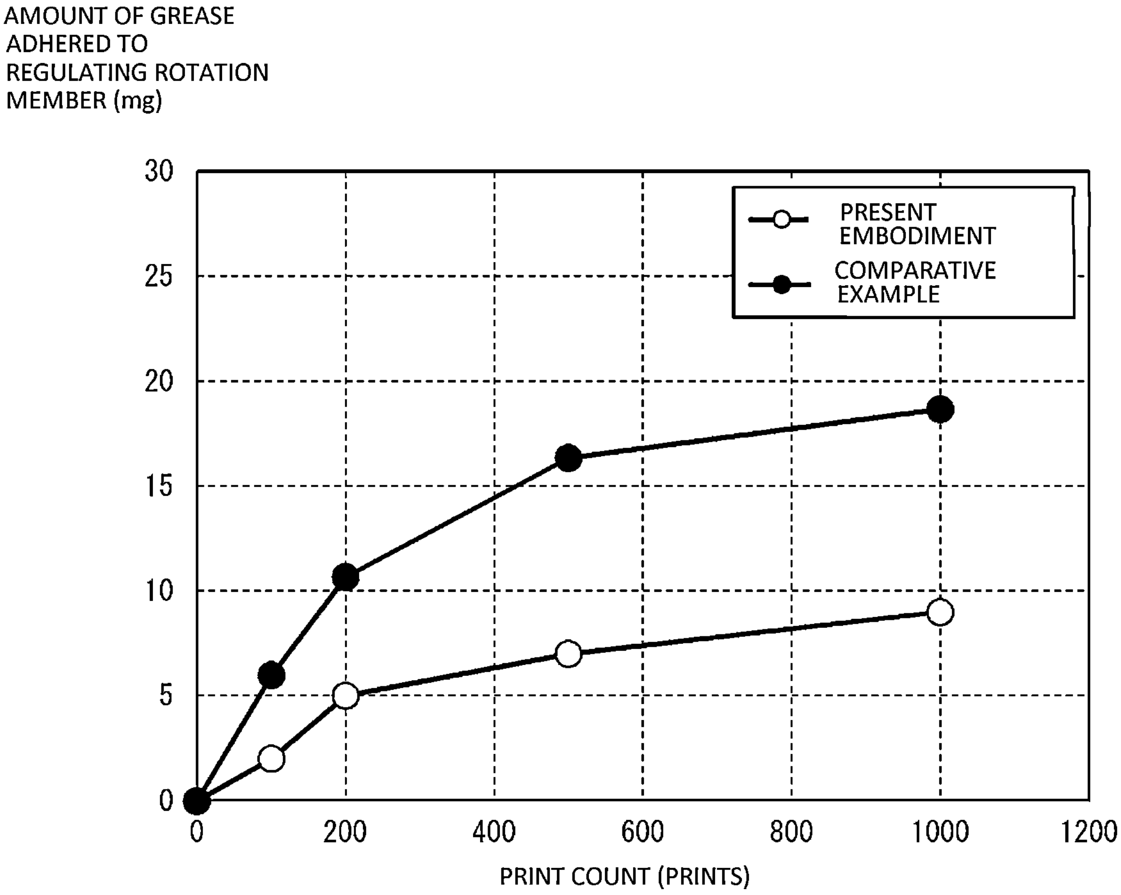
FIG. 11 is a graph illustrating the effect of Embodiment 2.

FIG. 11 is a graph illustrating comparison results, where the horizontal axis represents the number of prints that are run and the vertical axis represents the amount of grease adhered to the regulating rotation member 140. As the number of prints increases, the number of times that the fixing film 23 and the regulating rotation member 140 come into contact with each other increases, and in consequence the amount of grease adhered to the regulating rotation member increases likewise. The amount of grease adhered to the regulating rotation member of the present embodiment is smaller than that in the comparative example, for each print count. It was thus found that the amount of grease on the inner surface of the fixing film 23 and that was scraped off by the regulating rotation member 140 of the present embodiment was small.

By reducing the contact surface area between the regulating rotation member 140 and the inner surface of the fixing film 23, as in the present embodiment, it becomes possible to curtail reduction in grease on the inner surface of the fixing film 23, while regulating the longitudinal shape of the rotating film. As a result, this allows suppressing increases in frictional forces between the inner surface of the fixing film 23 and the heater 22, suppressing the occurrence of slippage between the pressurizing roller 30 and the fixing film 23, and preventing jamming of the recording material and image defects.

Embodiment 3

An explanation will focus next on points of dissimilarity relative to Embodiment 2. In the present embodiment the concaved grooves are provided in the longitudinal direction of a regulating rotation member 240. This configuration as well allows reducing the contact region between the inner surface of the fixing film 23 and the regulating rotation member 240, reducing scraping of grease from the inner surface of the fixing film 23 by the regulating rotation member 240, and preserving good slidability.

Regulating Rotation Member

Figure 12:
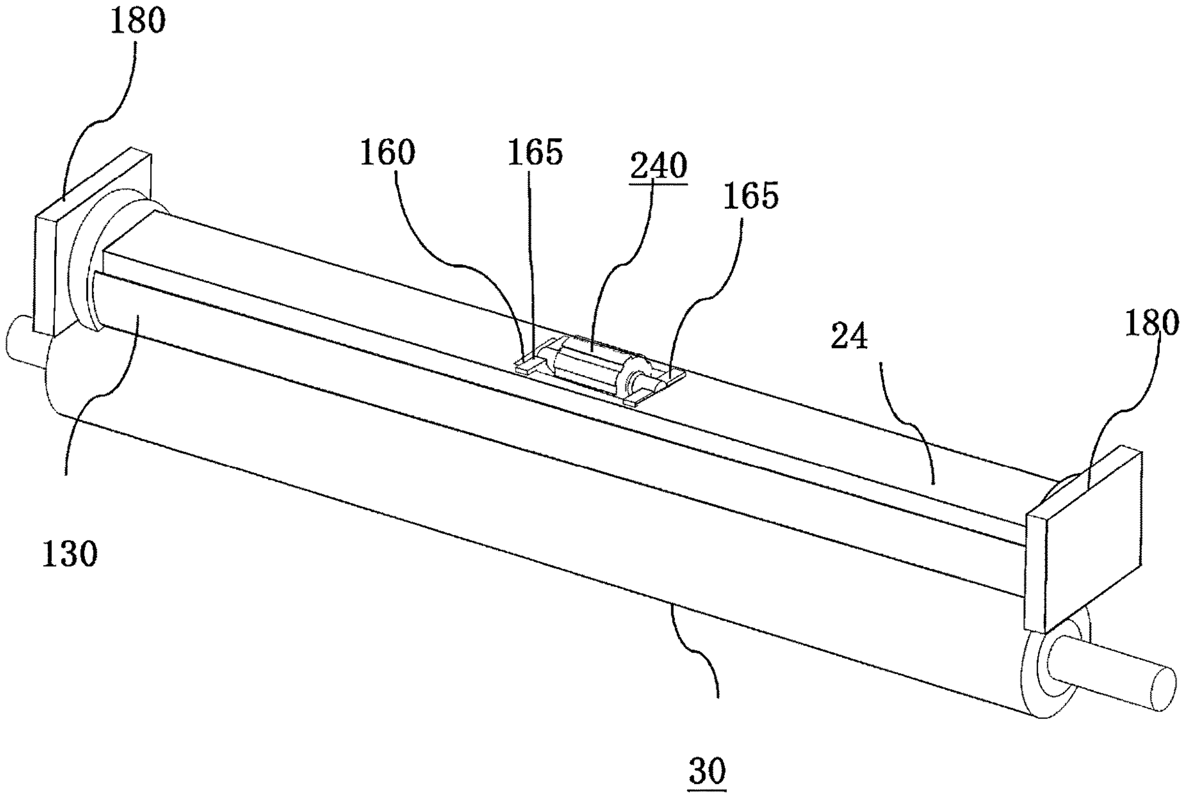
FIG. 12 is a perspective-view diagram of a fixing apparatus of Embodiment 3.

FIG. 12 is a perspective-view diagram of a heating device having the fixing film 23 omitted therefrom, and in which the shape of the regulating rotation member 240 is different from that in FIG. 9. In the present embodiment as well, the placement position and number of placement sites of the regulating rotation member 240 may be modified as appropriate.

Figure 13:
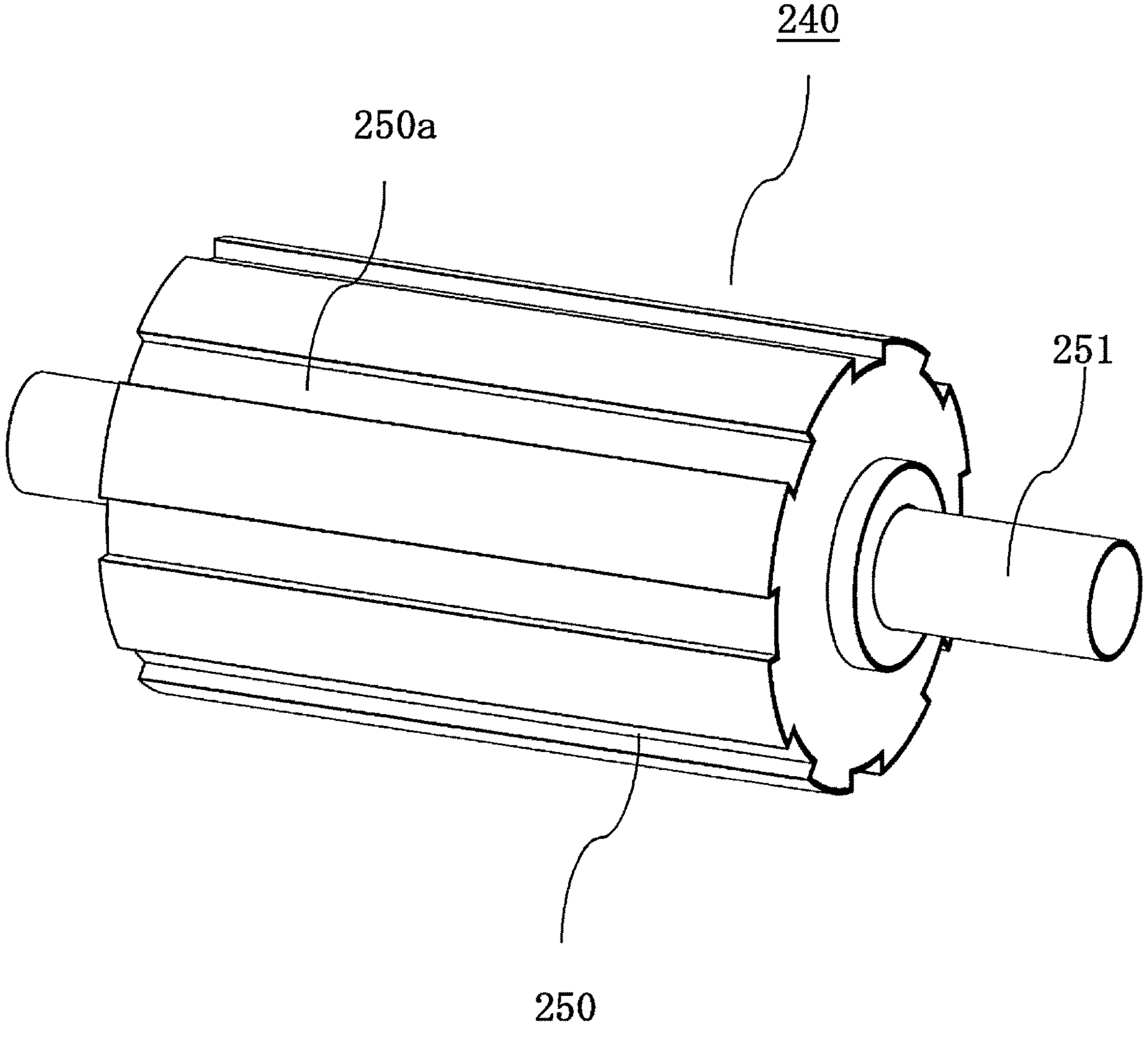
FIG. 13 is a perspective-view diagram illustrating a regulating rotation member of Embodiment 3.

As illustrated in FIG. 13, the regulating rotation member 240 is provided with a roller 250 and a supporting axis 251 that rotatably supports the roller 250. The material, outer diameter and longitudinal length of the roller 250 can be set as appropriate; in the present embodiment, the outer diameter is 6 mm, the longitudinal length is 50 mm, and the material is a PBS resin.

Multiple slit-shaped concaved grooves 250*a* are formed in the longitudinal direction, on the peripheral surface of the roller 250 of the present embodiment. By forming thus a plurality of concaved grooves 250*a* it becomes possible to reduce the contact surface area between the regulating rotation member and the inner surface of the fixing film 23, and to curtail reduction in grease on the inner surface of the fixing film 23. In the present embodiment the width of the concaved grooves is 1 mm, with eight concaved grooves being disposed at equal intervals in the circumferential direction.

Effect

Figure 14:
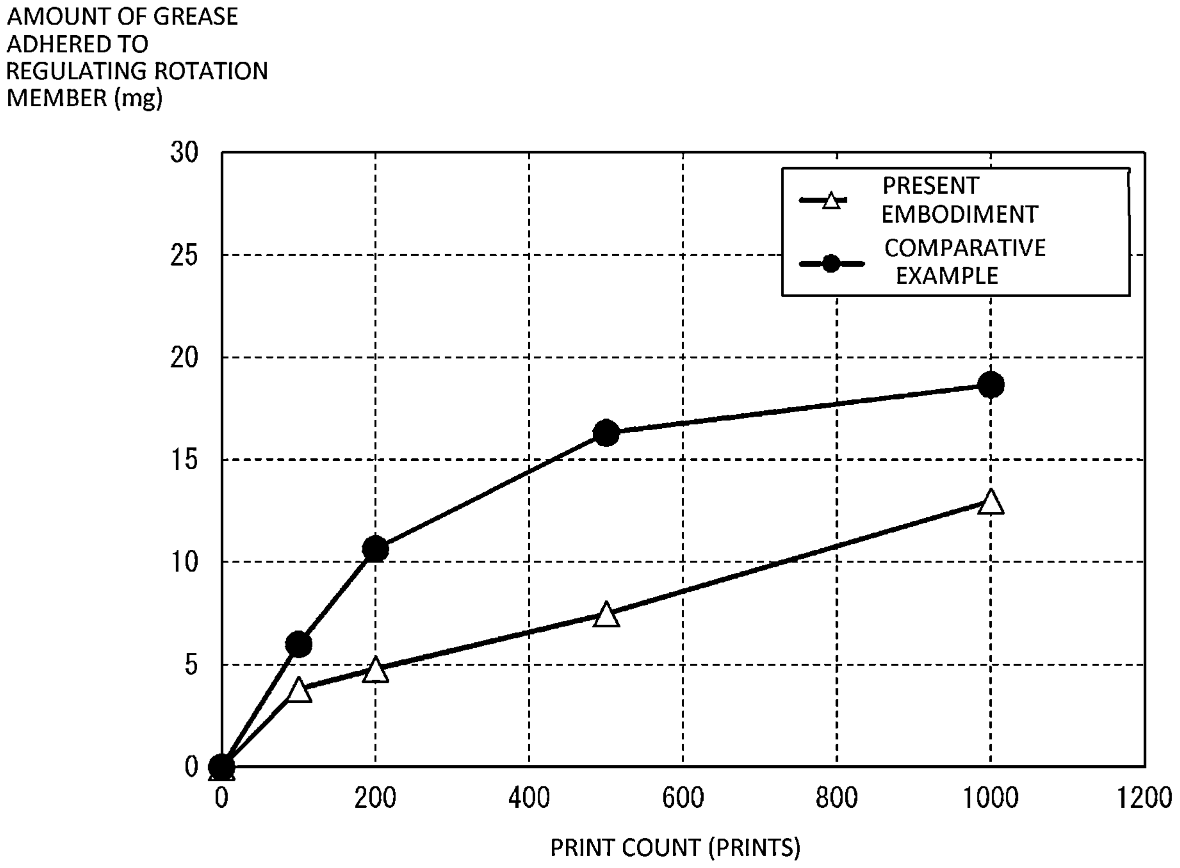
FIG. 14 is a graph illustrating the effect of Embodiment 3.

In order to assess the effect of the present embodiment, the reduction amount in grease on the inner surface of the fixing film 23 was compared with that of a comparative example. A smooth regulating rotation member having no concaved grooves on the peripheral surface was used herein as a comparative example. Printing conditions for comparison are identical to those in Embodiment 2. FIG. 14 is a graph illustrating comparison results, where the horizontal axis represents the number of prints that are run and the vertical axis represents the amount of grease adhered to the regulating rotation member 240. In the present embodiment as well it was found that the amount of grease scraped off the inner surface of the fixing film 23 was smaller than in the comparative example. By reducing the contact surface area between the regulating rotation member and the inner surface of the fixing film 23, as in the present embodiment, it becomes possible to curtail reduction in grease on the inner surface of the fixing film 23, while regulating the longitudinal shape of the rotating film.

By reducing the contact surface area between the regulating rotation member 240 and the inner surface of the fixing film 23, as in the present embodiment it becomes possible to curtail reduction in grease on the inner surface of the fixing film 23 while regulating the longitudinal shape of the rotating film. As a result, this allows suppressing increases in frictional forces between the inner surface of the fixing film 23 and the heater 22, suppressing the occurrence of slippage between the pressurizing roller 30 and the fixing film 23, and preventing jamming of the recording material and image defects.

Variation

Figure 15A:
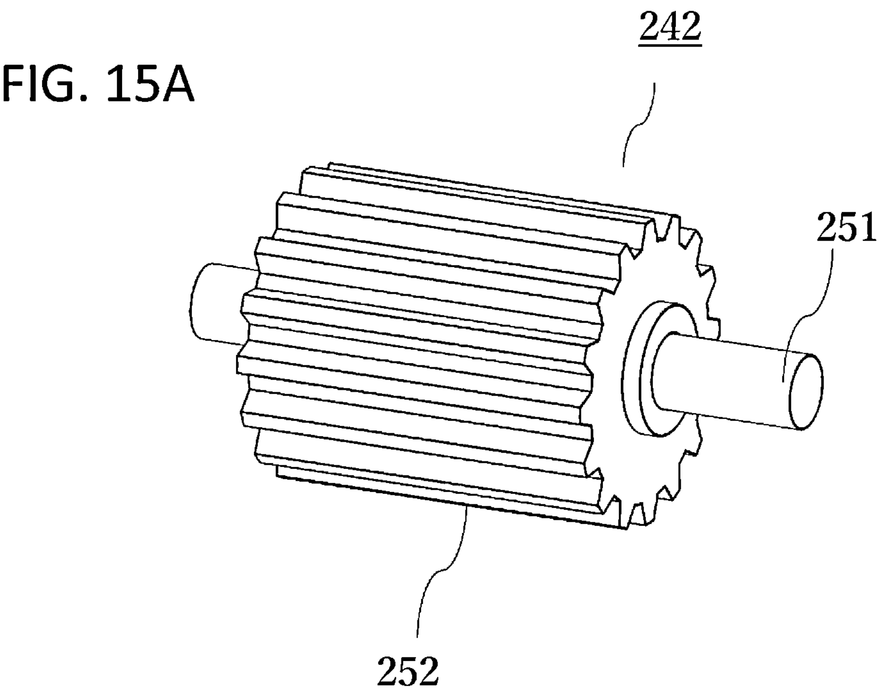
FIG. 15A and FIG. 15B are perspective-view diagrams illustrating a regulating rotation member of a variation.

FIG. 15A is a perspective-view diagram of a regulating rotation member 242 in a variation, in which there is used a gear-shaped roller 252 having a greater number of concaved grooves. This configuration allows further reducing the contact surface area with the inner surface of the fixing film 23 and effectively curtailing reductions in grease.

Figure 15B:
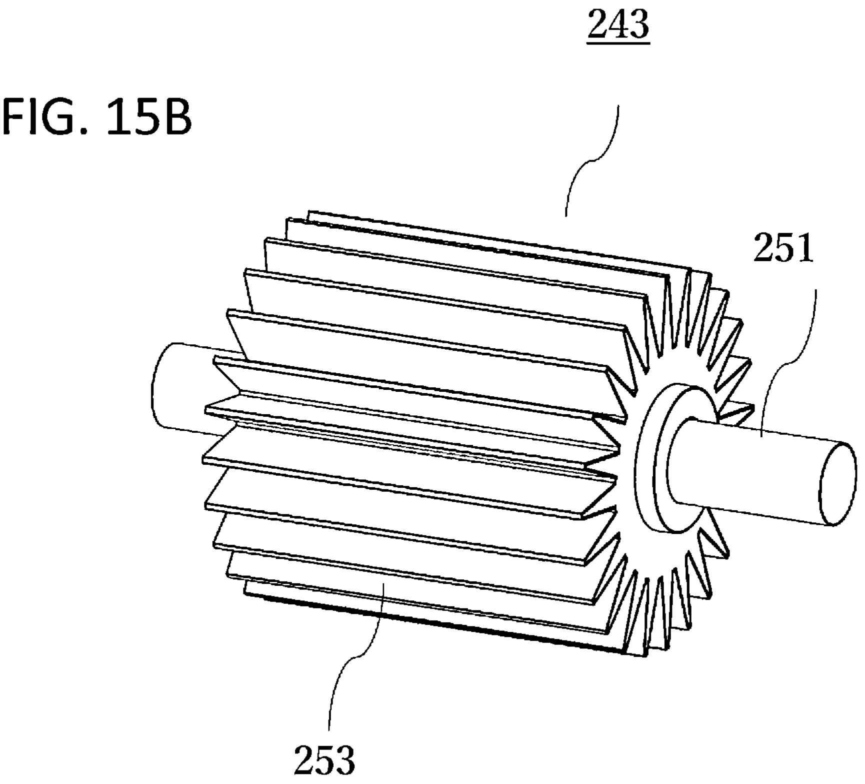

FIG. 15B is a perspective-view diagram of a regulating rotation member 243 in another variation, in which there is used a spur-shaped roller 253 exhibiting a reduced gear-shaped contact surface area. This configuration allows further reducing the contact surface area with the inner surface of the fixing film 23 and effectively curtailing reduction in grease.

Embodiment 4

An explanation of Embodiment 4 will focus next on points of dissimilarity relative to Embodiment 2. In the present embodiment the contact region with the inner surface of the fixing film 23 is reduced by virtue of the fact that a regulating rotation member 340 has herein a shape such that the outer diameter of the member varies in the longitudinal direction. As a result, scraping of grease on the inner surface of the fixing film 23 of the regulating rotation member 340 is reduced, and good slidability is maintained.

In terms of just shrinking the contact region, it is also conceivable to reduce the length of the regulating rotation member in the longitudinal direction. However, deflection of the fixing film 23 does not always occur at a same position in the longitudinal direction; therefore, the regulating rotation member may deviate from a deflection position of the fixing film 23, and deflection of the fixing film 23 may fail to be restricted, in a case where a regulating rotation member is used that has a small longitudinal length. The longitudinal length of the regulating rotation member cannot therefore be made shorter than a certain length.

Regulating Rotation Member

Figure 16:
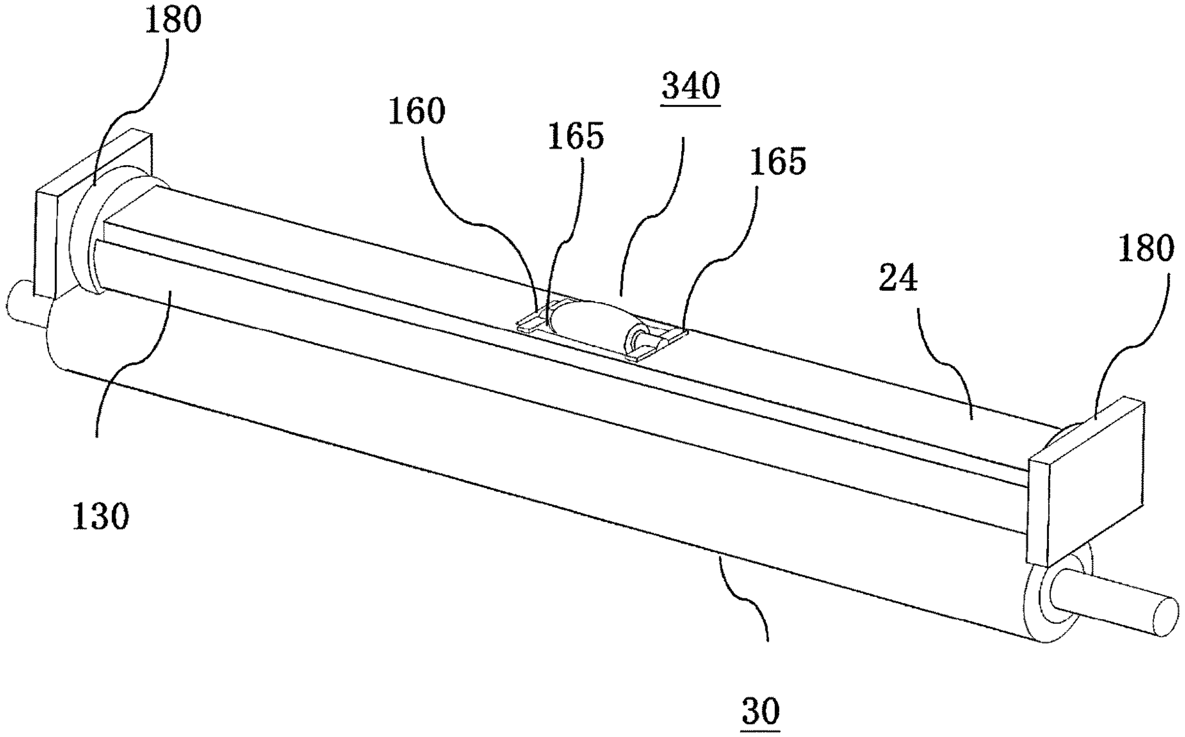
FIG. 16 is a perspective-view diagram of a fixing apparatus of Embodiment 4.

FIG. 16 is a perspective-view diagram of a heating device having the fixing film 23 omitted therefrom, and in which the shape of the regulating rotation member 340 is different from that in FIG. 9. In the present embodiment as well the placement position and number of placement sites of the regulating rotation member 340 may be modified as appropriate.

Figure 17A:
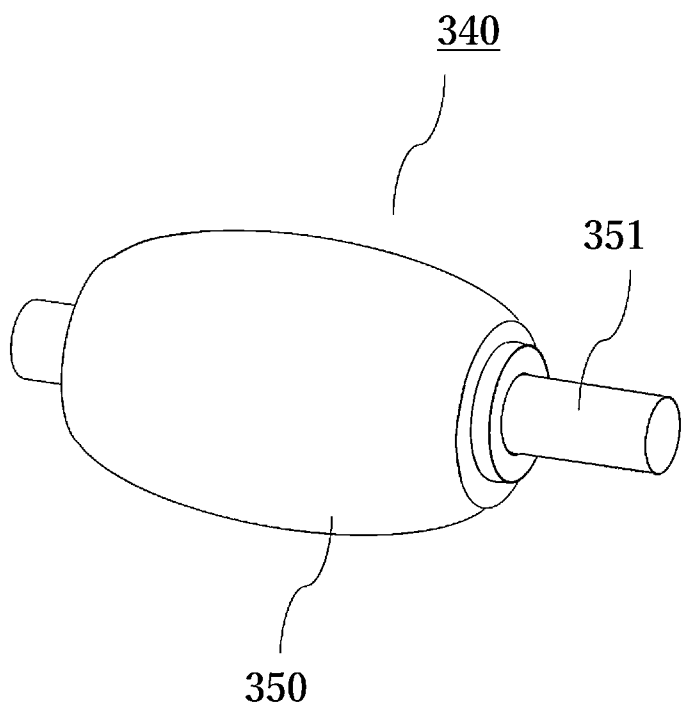
FIG. 17A is a perspective-view diagram.
Figure 17B:
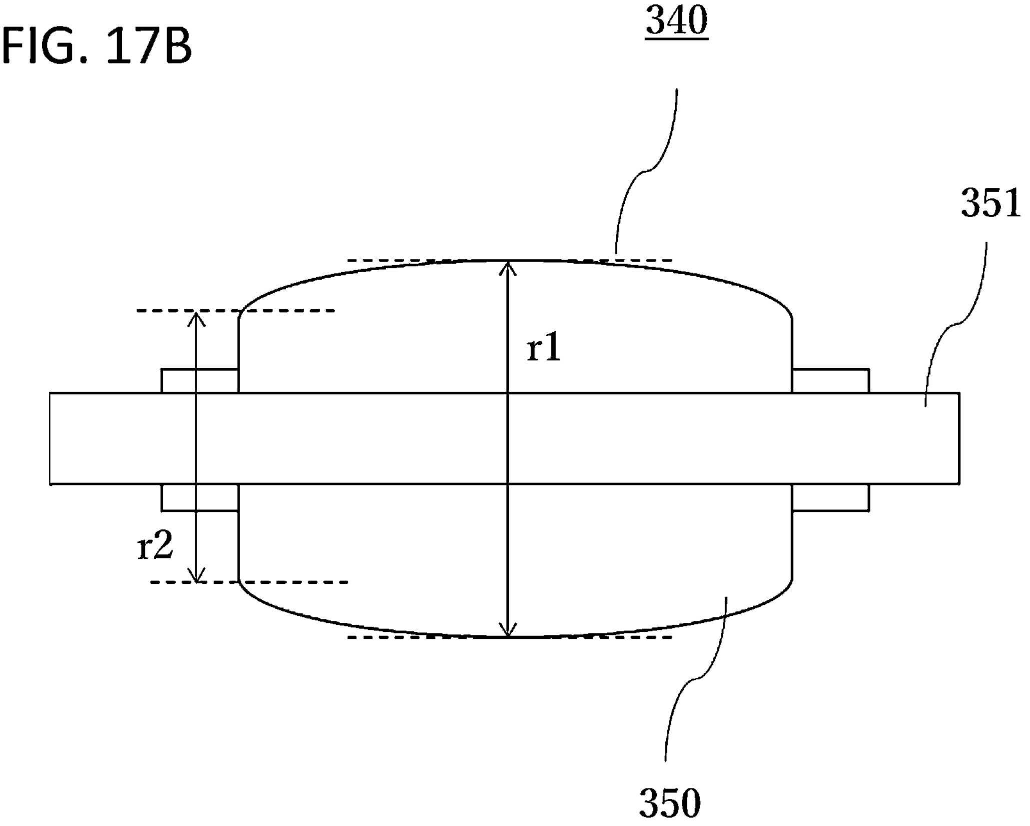
FIG. 17B is a cross-sectional diagram, illustrating a regulating rotation member of Embodiment 4.

As illustrated in FIG. 17A, the regulating rotation member 340 includes a roller 350 and a supporting axis 351 that rotatably supports the roller 350. As illustrated in FIG. 17B, the outer diameter shape of the roller 350 is a gentle crown shape having an outer diameter r1 of 6 mm at a longitudinal central portion, and an outer diameter r2 of 5.5 mm at the longitudinal end portions. The distance from the inner surface of the fixing film 23 to the roller 350 increases gradually from the longitudinal central portion towards the longitudinal end portions. In other words, the outer diameter gradually decreases from the central portion towards the end portions in the rotation axis direction. As a result, the longitudinal end portions of the roller 350 are less likely to come into contact with the inner surface of the fixing film 23, and the contact surface area becomes smaller. The materials of the roller 350 and the supporting axis 351 are similar to those in Embodiment 2.

Effect

Figure 18:
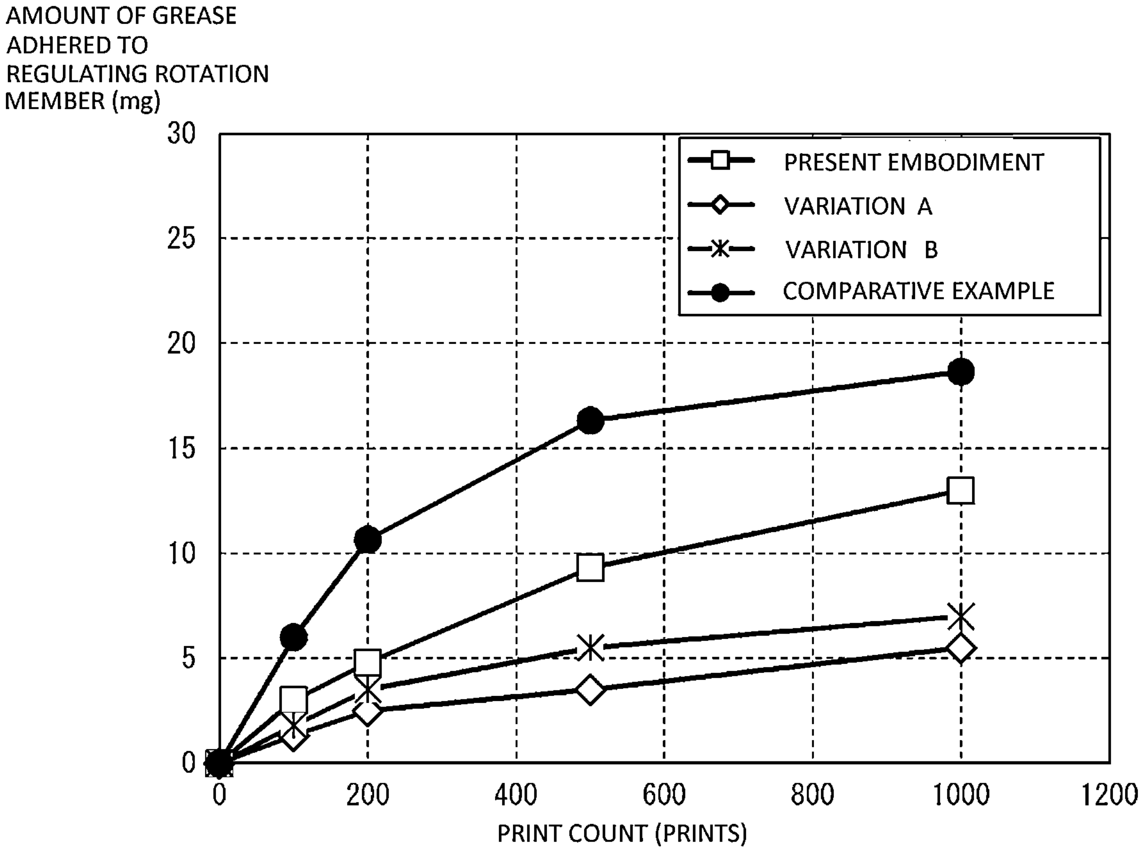
FIG. 18 is a graph illustrating the effect of Embodiment 4.

In order to assess the effect of the present embodiment, the reduction amount in grease on the inner surface of the fixing film 23 was compared with that of a comparative example. The printing conditions for comparison are identical to those in Embodiment 2. FIG. 18 is a graph illustrating comparison results, where the horizontal axis represents the number of prints that are run and the vertical axis represents the amount of grease adhered to the regulating rotation member 340. In the present embodiment as well it was found that the amount of grease scraped off the inner surface of the fixing film 23 was smaller than in the comparative example.

Figure 19A:
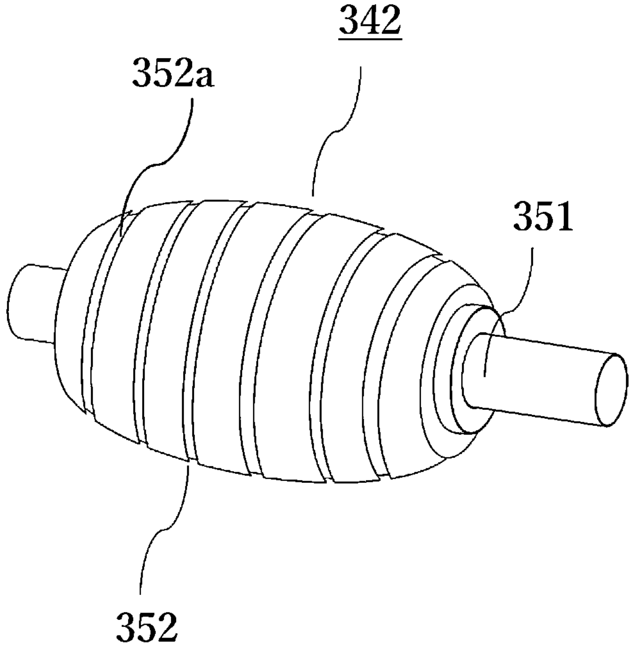
FIG. 19A and FIG. 19B are perspective-view diagrams illustrating a regulating rotation member of a variation.
Figure 19B:
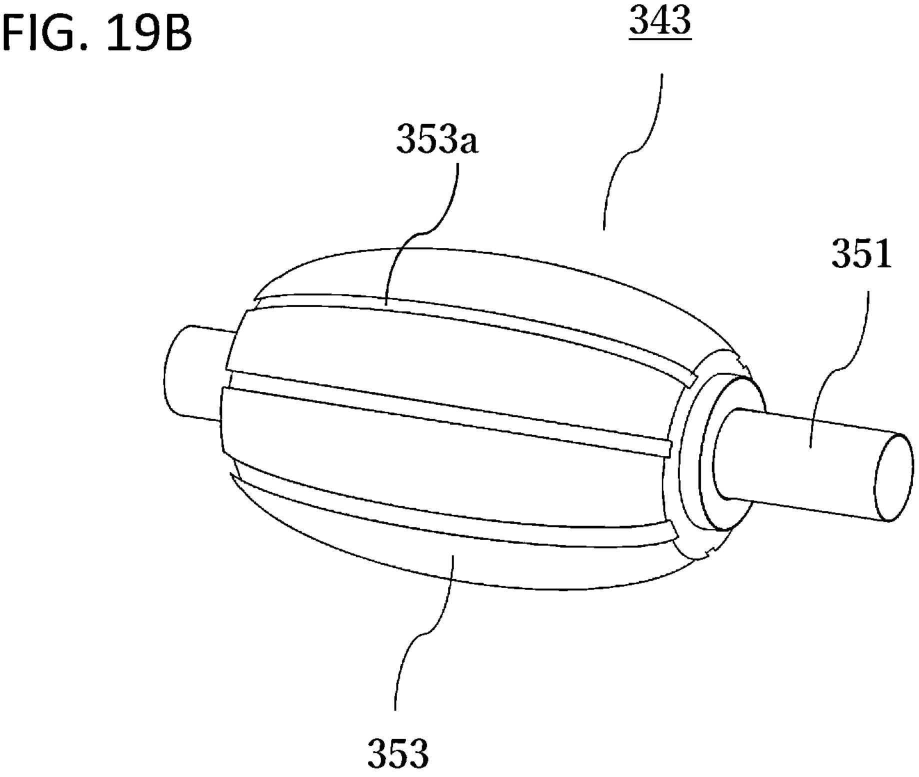

In FIG. 18, the caption "Present embodiment" is a graph of an instance where the regulating rotation member 340 of FIG. 17A and FIG. 17B was used. In FIG. 18, the caption "Variation a" is a graph of an instance where the regulating rotation member 342 of the variation illustrated in FIG. 19A is used. The regulating rotation member 342 is provided with a roller 352 having concaved grooves 352*a* extending in the rotation direction. In FIG. 18, the caption "Variation b" is a graph of an instance where a regulating rotation member 343 of the variation illustrated in FIG. 19B is used. The regulating rotation member 343 is provided with a roller 353 having concaved grooves 353*a* extending in the rotation axis direction. In all the variations it is observed that the amount of adhered grease is smaller, and the reduction in the grease on the inner surface of the film is further curtailed, than in the results for a regulating rotation member 340 not provided with the concaved grooves.

Figure 20:
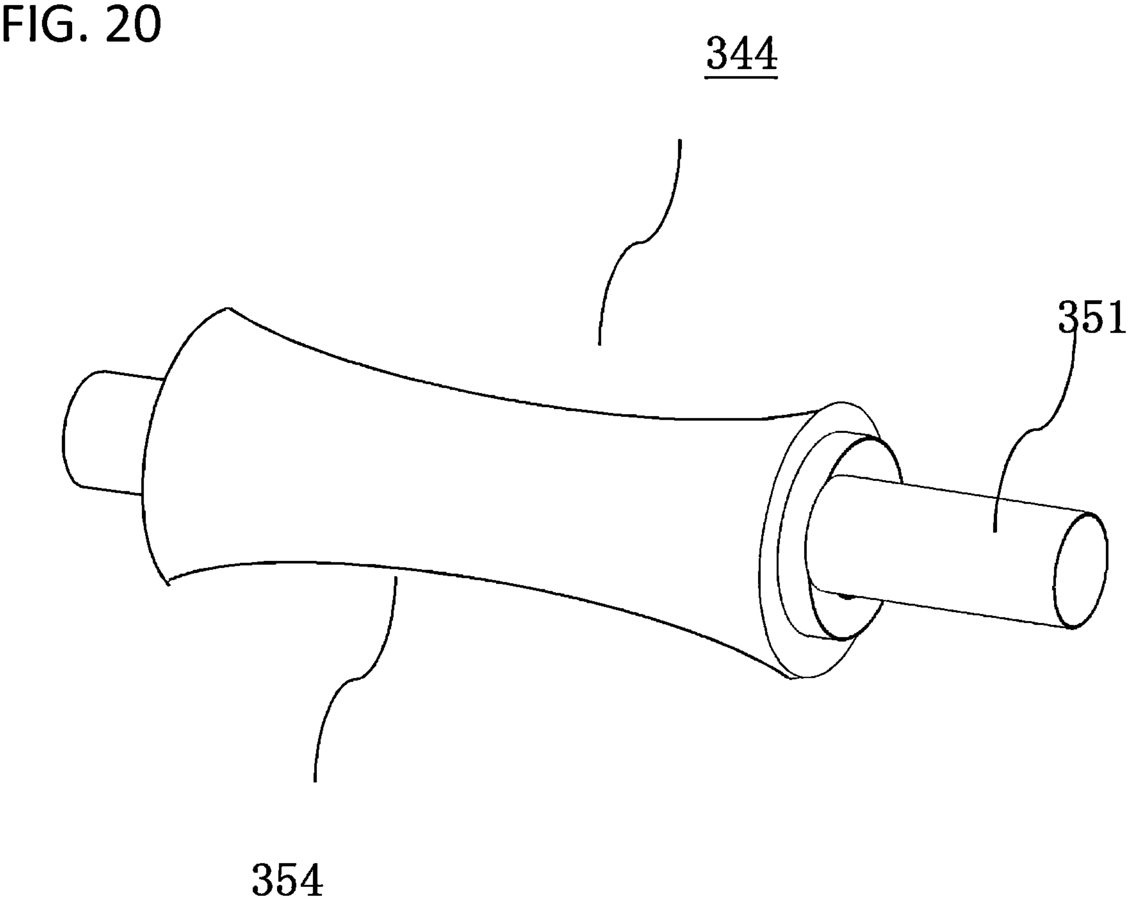
FIG. 20 is a perspective-view diagram illustrating a regulating rotation member of a variation.

In the present embodiment the outer diameter shape of the regulating rotation member is prescribed to be a crown shape, but as illustrated in FIG. 20, a regulating rotation member 344 provided with a roller 354 having an outer diameter shape in the form of an inverted crown may be used herein. In this case, the end portions have a larger outer diameter than the central portion in the rotation axis direction, and the outer diameter becomes gradually smaller from the end portions towards the central portion. In this case as well, the contact surface area decreases in the same manner as in the case where the regulating rotation member 140 of Embodiment 2 has concaved grooves, along the rotation direction, at the central portion.

Other Embodiments

In Embodiment 2 through Embodiment 4 above, the contact surface area between the inner surface of the fixing film 23 and the regulating rotation member is reduced by way of the slit-shaped concaved grooves provided in the circumferential direction of the regulating rotation member, or by way of the slit-shaped concaved grooves provided in the longitudinal direction of the regulating rotation member. However, the pattern of the concaved grooves is not limited to the foregoing.

Figure 21:
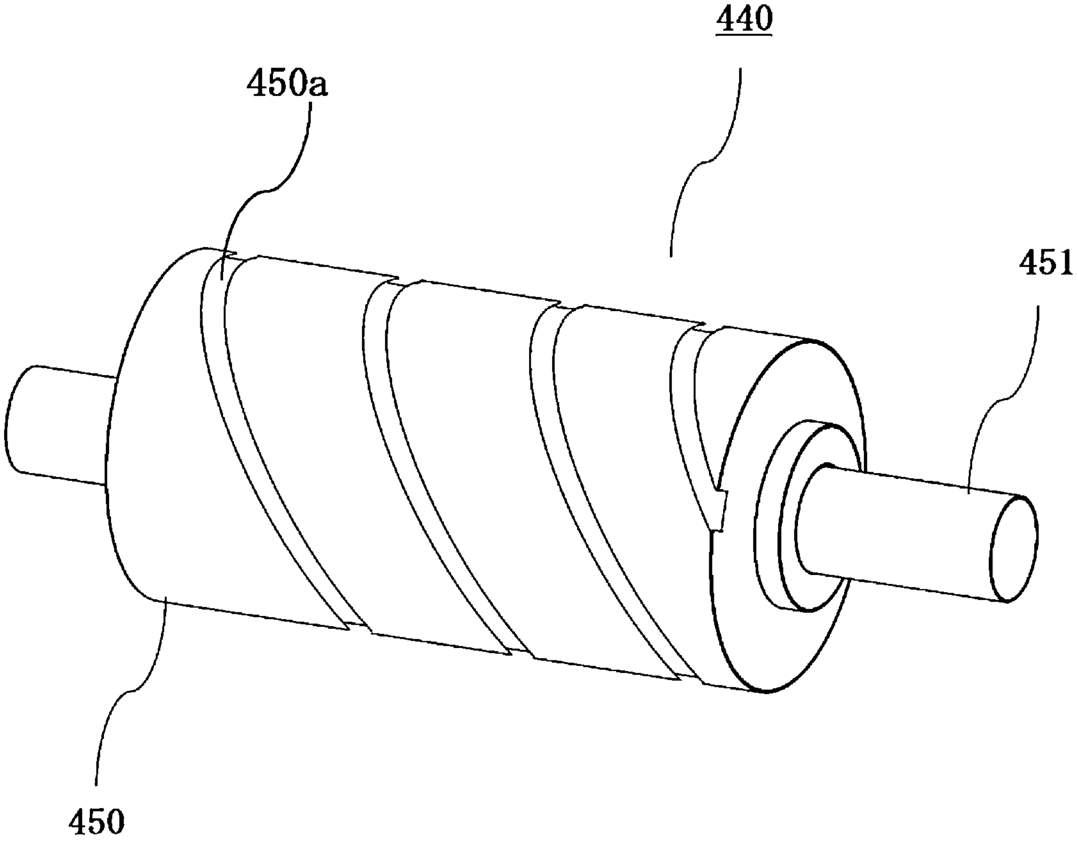
FIG. 21 is a perspective-view diagram illustrating a regulating rotation member of a variation.
Figure 22:
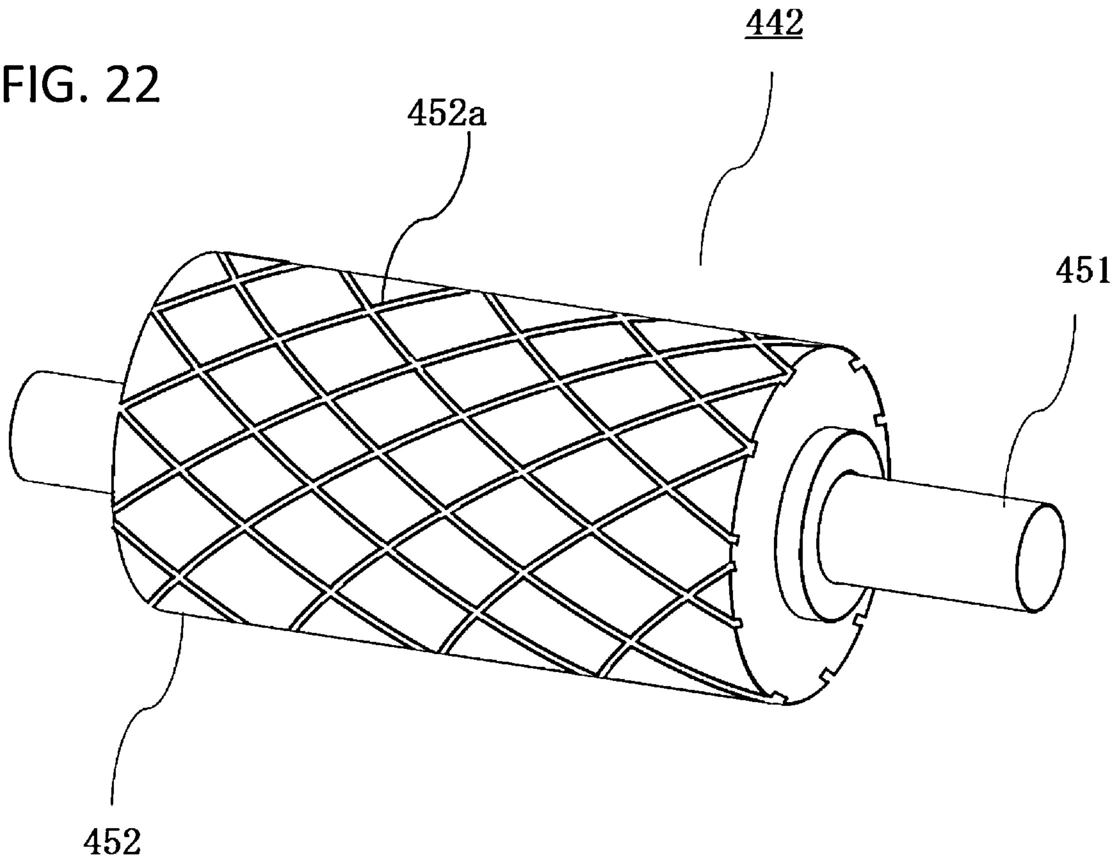
FIG. 22 is a perspective-view diagram illustrating a regulating rotation member of a variation.
Figure 23:
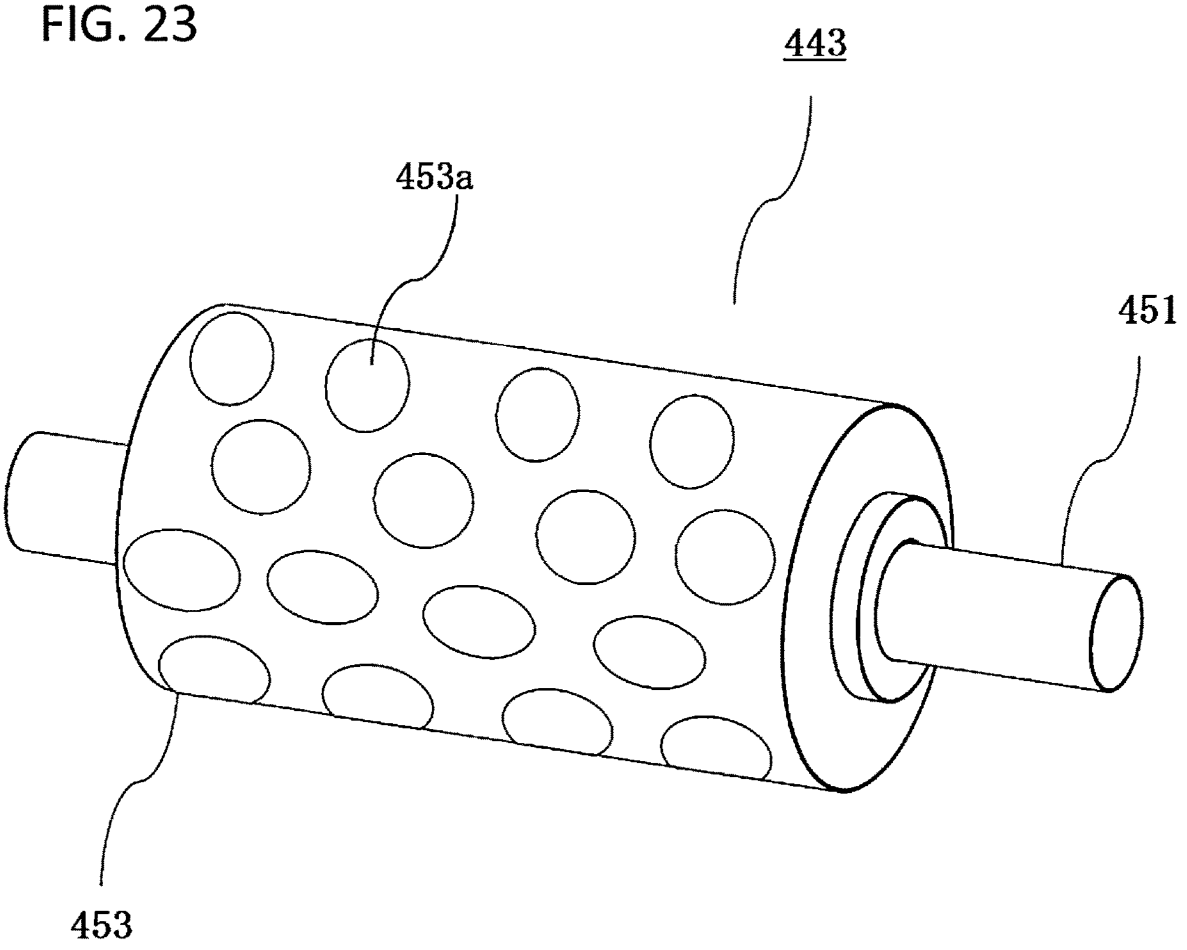
FIG. 23 is a perspective-view diagram illustrating a regulating rotation member of a variation.

As illustrated for instance in FIG. 21, there may be used a regulating rotation member 440 having a roller 450 provided with a spiral groove 450*a*. As shown in FIG. 22, it is even better to use a regulating rotation member 442 having a roller 452 in which grooves 452*a* intersect each other spirally forming rhomboids. A regulating rotation member 443 such as that in FIG. 23 having a roller 453 with circular crater-shaped depressed portions 453*a* may also be used.

Besides the above, also depressed portions having concave shapes, for instance of polygons such as triangles and pentagons, not shown, may be provided. Alternatively, the outer diameter may conversely be made non-uniform through formation of polygonal protrusions such as rhomboids, triangles or pentagons, rounded protrusions or elliptical protrusions. The cylindrical surface of the regulating rotation member may be blasted, to form thereon as a result an irregularly textured shape. More preferably, a contact surface area reduction method is resorted to such that concaved grooves are not continuously formed on the inner surface of the fixing film 23, in the rotation direction or in the rotation axis direction.

These surface profiles of the regulating rotation member are more effective when combined with the configuration, of Embodiment 4, in which the outer diameter shape of the regulating rotation member is caused to vary in the longitudinal direction.

As described above, in Embodiments 2 to 4 of the present invention the contact surface area is reduced, and the amount of scraped grease is likewise reduced, by providing a portion that is not parallel to the fixing film 23, on the surface of the regulating rotation member that is in contact with the fixing film 23. That is, in a virtual cylindrical surface of the regulating rotation member, a recessed portion provided sunken below than that virtual surface does not come therefore in contact with the fixing film. In other words, the distance (outer diameter) from the rotation center to the circumferential direction of the regulating rotation member is not uniform. The amount of scraped grease can be reduced as a result.

Ways of providing recessed portions (non-contact region) include for instance a method of providing grooves, depressed portions and/or textured portions. A non-contact region can be provided by forming the regulating rotation member to a shape other than a cylindrical shape, such as a crown shape or an inverted crown shape. It suffices herein that the outer diameter of the regulating rotation member be not uniform in at least one from among the longitudinal direction (rotation axis direction) and the circumferential direction (rotation direction). For instance the distance in the rotation axis direction is not uniform in a case where circular groove portions are provided in the circumferential direction. The distance in the rotation direction is not uniform in a case where groove portions extending in the longitudinal direction are provided. In a case where a spiral groove is provided, or multiple circular depressed portions are provided, or texturing is provided, the outer diameter distance is not uniform in the rotation direction and in the rotation axis direction.

(III)

In a fixing apparatus in which toner is fixed onto a sheet at a fixing nip portion formed by a fixing film and a pressurizing roller, a heater having resistive heat generating members on a substrate is disposed in the interior of the fixing film. Toner becomes fixed to a sheet that is nipped at the fixing nip portion, as the fixing film moves while in contact with the heater. In such a case, a thermal conductive member of larger surface area than that of the heater may be conceivably provided, between the heater and the fixing film, for the purpose of improving toner fixing performance in the fixing apparatus.

However, in such a configuration in which the heater has a thermal conductive member, the surface area over which the thermal conductive member and the fixing film slide becomes excessively large, and as a result slidability between the foregoing worsens, which may adversely impact good rotation of the fixing film. It is necessary therefore to improve slidability between the thermal conductive member and the fixing film in the fixing apparatus.

Embodiment 5

Image Forming Apparatus

Figure 24:
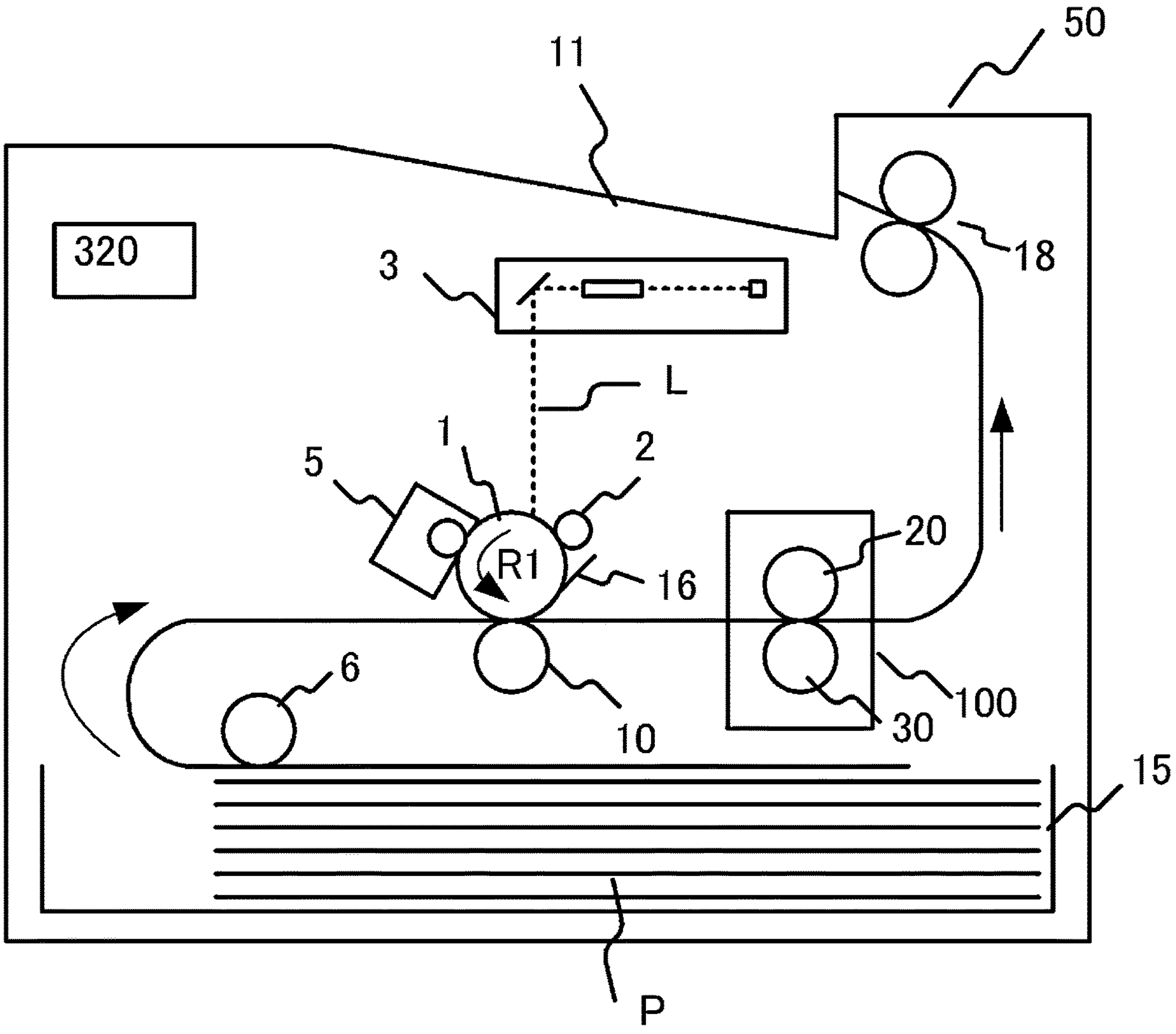
FIG. 24 is a schematic configuration diagram of an image forming apparatus of Embodiment 5.

FIG. 24 is a cross-sectional diagram of an image forming apparatus 50, which is a laser printer relying on electrophotographic recording technology, according to Embodiment 5. The specific operation of this image forming apparatus is identical to that of the image forming apparatus of FIG. 1. Firstly, the exposing apparatus 3 emits a laser beam L, according to image information, upon reception of a print instruction from the controlling unit 320 or from a user terminal, not shown. The photosensitive drum 1 charged to a predetermined polarity by the charging unit 2 is scanned with the laser beam L, as a result of which an electrostatic latent image according to the image information becomes formed on the surface of the photosensitive drum 1. Thereafter, the developing unit 5 supplies toner to the photosensitive drum 1, to form a toner image according to the image information, on the photosensitive drum 1. Through rotation of the photosensitive drum 1 in the direction of arrow Rd, the toner image having reached a transfer position formed by the photosensitive drum 1 and the transfer roller 10 becomes transferred onto the recording material P fed from the cassette 15 by a conveying roller 6. The surface of the photosensitive drum 1 having passed the transfer position is cleaned by the cleaner 16.

The recording material P having had a toner image transferred thereonto becomes fixed by being heated and pressed at the fixing apparatus 100. Fixing is performed thus. The recording material P is thereafter discharged to a sheet discharge tray 11 by the sheet discharging rollers 18.

Fixing Apparatus

An explanation on the fixing apparatus 100 follows here. The fixing apparatus 100 is of tension-less film heating type. A heat-resistant endless belt-like or cylindrical film is used as the fixing film 23. At least part of the circumference of the film is constantly tension-free (state in which no tension is applied thereto), and is rotationally driven by the rotational driving force of a pressing body.

Figure 25:
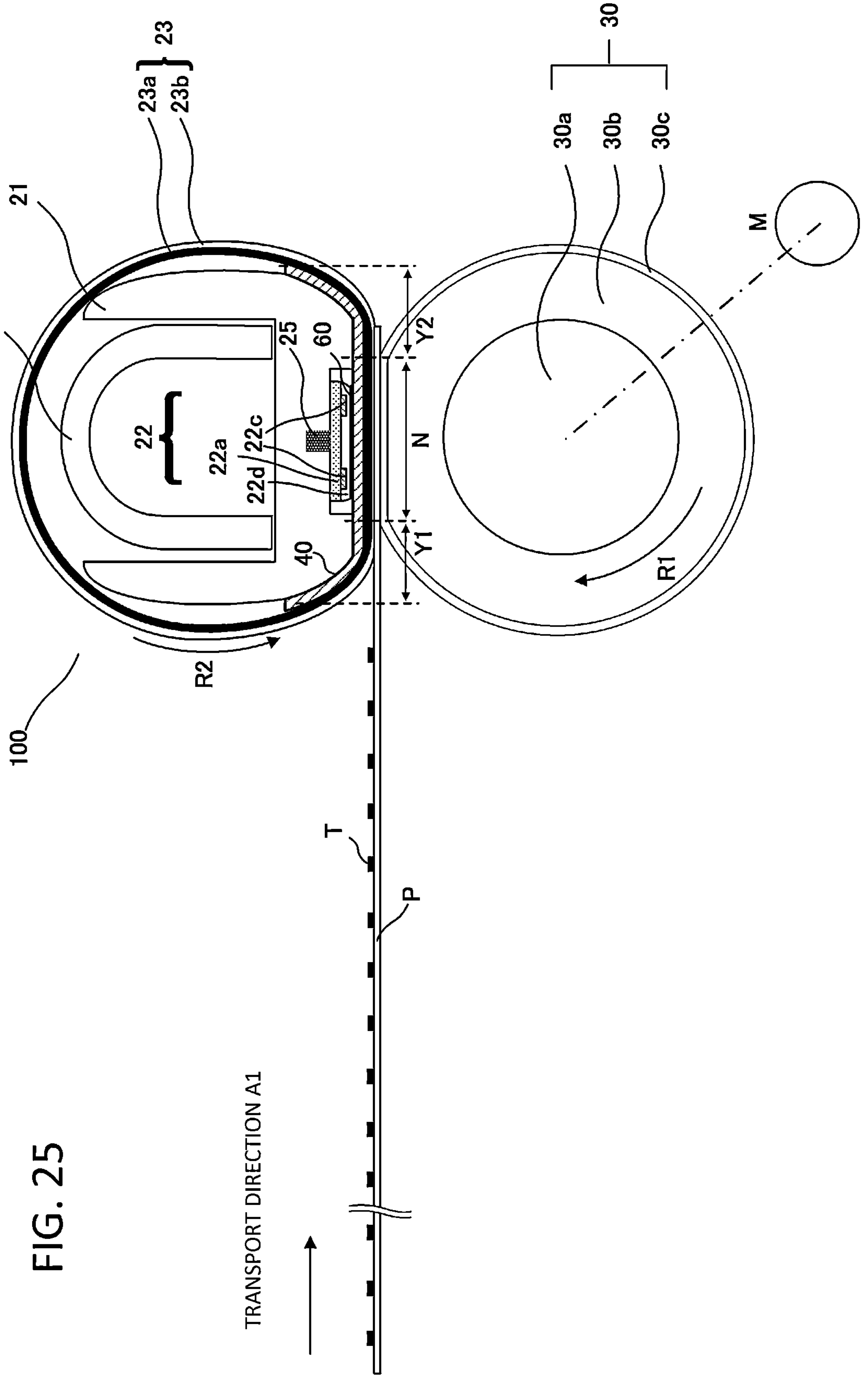
FIG. 25 is a cross-sectional diagram of a fixing apparatus of Embodiment 5.
Figure 26:
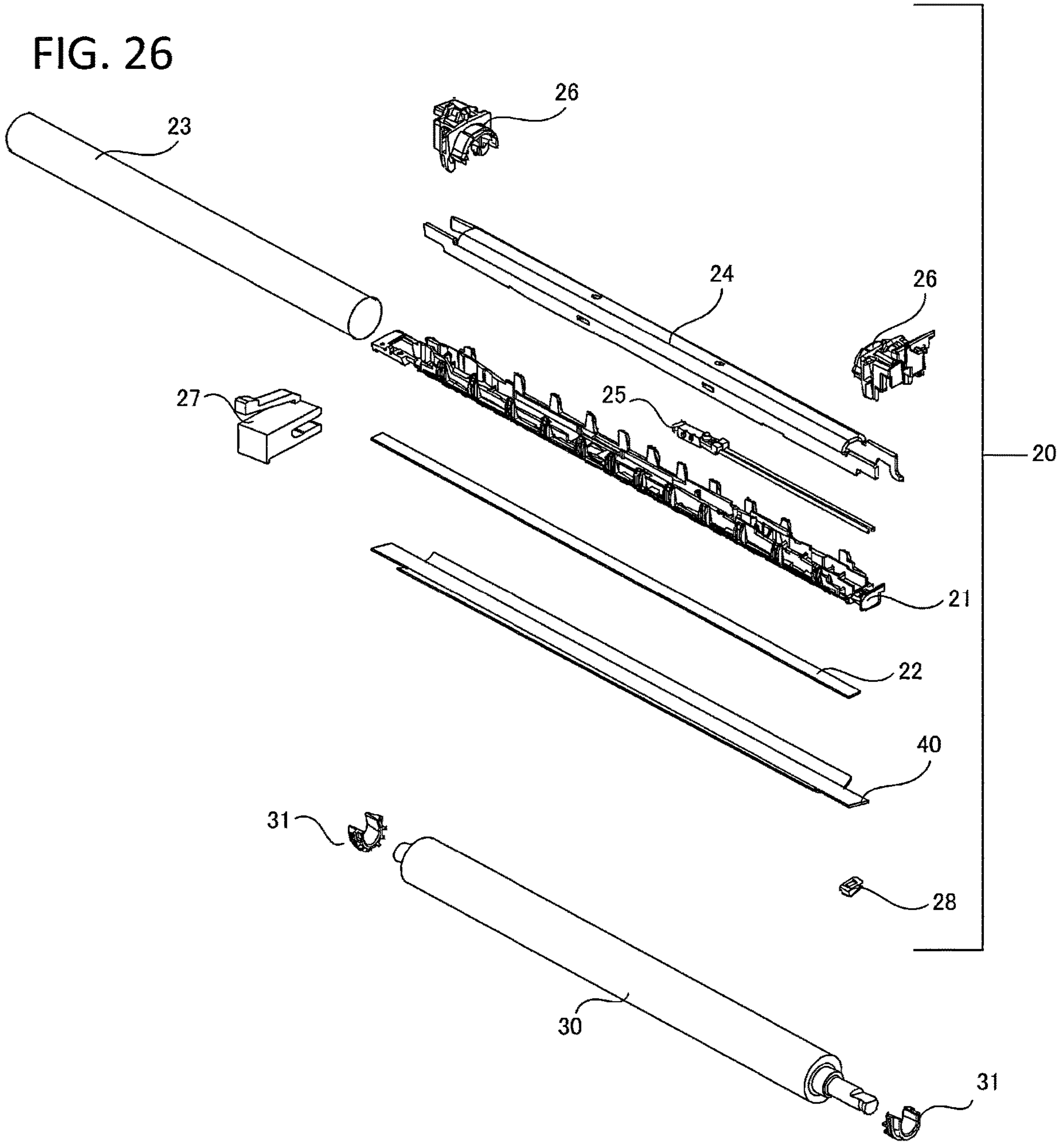
FIG. 26 is an exploded perspective-view diagram of a film assembly unit of Embodiment 5.
Figure 27:
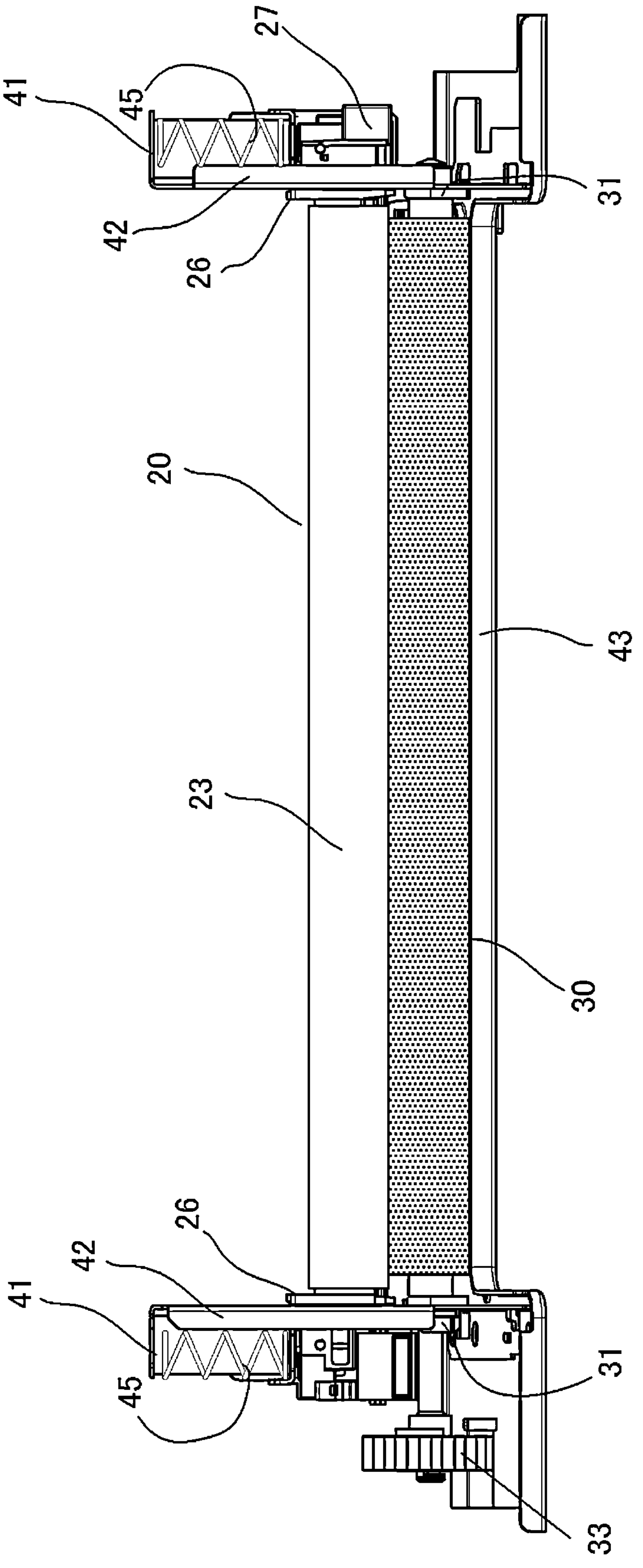
FIG. 27 is a front-view diagram of the fixing apparatus of Embodiment 5.

FIG. 25 is a schematic cross-sectional diagram of the fixing apparatus 100 of the present embodiment. FIG. 26 is an exploded perspective-view diagram of a film assembly unit 20 used in the fixing apparatus 100. FIG. 27 is a front-view diagram of the fixing apparatus 100.

The configuration of the fixing apparatus 100 will be explained with reference to the cross-sectional diagram of FIG. 25. The fixing apparatus 100 of the present embodiment has: the tubular fixing film 23; a thermal conductive member 40 in contact with the inner surface of the fixing film 23; the heater 22 which is heating member in contact with the surface, of the thermal conductive member 40, on the reverse side from that in contact with the fixing film 23; and the pressurizing roller 30 as a pressurizing member, that forms a fixing nip N with the thermal conductive member 40, across the fixing film 23 in between. That is, the thermal conductive member 40 as a nip forming member forms a fixing nip as a nip portion, with the pressurizing roller 30, across the fixing film 23 in between. In the present embodiment a thermal conductive grease 60 is applied to the contact surface of the thermal conductive member 40 and the heater 22. Sliding grease for improving slidability with the thermal conductive member 40 is applied to the inner surface of the fixing film 23.

The stay 24 is a reinforcing member made up of a metal such as iron, and presses the heater 22 towards the pressurizing roller 30, via a film guide 21. Through pressing against the pressurizing roller 30 the stay 24 is a member that maintains strength so as to preclude significant deformation even at the pressure of formation of the fixing nip N. The film guide 21 has the function of guiding the rotation of the fixing film 23. The film guide 21 is for instance a molded article of a heat-resistant resin such as PPS (polyphenylene sulfide) or a liquid crystal polymer. The pressurizing roller 30 receives motive power from a motor M, and rotates in the direction of arrow R1. The fixing film 23 rotates, in the direction of arrow R2, accompanying the rotation of the pressurizing roller 30.

The heater 22 has a substrate 22*a* made of a ceramic and having an elongated plate shape, heat generating members 22*c* which are resistive heat generating members that generate heat when energized, and a protecting layer 22*d* which is a glass-coated layer that protects the surface of the heat generating members 22*c*. A thermistor 25, which is a temperature detection member, is in contact with the side, of the substrate 22*a*, that is in contact with the film guide 21. Energization of the heat generating members 22*c* is controlled in accordance with the temperature detected by the thermistor 25.

The thickness of the fixing film 23 is preferably at least about 20 μm and not more than 100 μm, for the purpose of ensuring good thermal conductivity. The fixing film 23 has a structure having the film base layer 23*a* and the film releasing layer 23*b*. A single-layer film made up of material such as PTFE (polytetrafluoroethylene), PFA (tetrafluoroethylene-perfluoroalkyl vinyl ether) or PPS can be used as the film base layer 23*a*. As the fixing film 23 there can be used also a composite layer film resulting from applying the film releasing layer 23*b*, made up of a material such as PTFE, PFA or FEP (tetrafluoroethylene-perfluoroalkyl vinyl ether) onto the surface of the film base layer 23*a* made up of a material such as PI (polyimide), PAI (polyamide imide), PEEK (polyether ether ketone) or PES (polyether sulfone). Also a pure metal such as SUS, Al, Ni, Cu or Zn having high thermal conductivity, or alloys thereof, can be used as the film base layer 23*a*; the film releasing layer 23*b* can suitably result from the above-described coating and fluororesin tube coating.

In the present embodiment, PI having a thickness of 60 μm was used as the film base layer 23*a*; further, PFA was applied to a thickness of 12 μm, as the film releasing layer 23*b*, taking into consideration both thermal conductivity and wear derived from passage of paper. The longitudinal length of the fixing film 23 was set to 240 mm.

The pressurizing roller 30 as a pressurizing rotation member has a core metal 30*a* of a material such as iron or aluminum, the elastic layer 30*b* of a material such as silicone rubber, and the releasing layer 30*c* of a material such as PFA. The pressurizing roller 30 receives motive power from the motor M via gears, not shown, and rotates in the direction of arrow R1. The recording material P is transported, while nipped, in the transport direction denoted by arrow A1, as a result of which the toner image T on the recording material P becomes heated and fixed to the recording material P, at the fixing nip N.

Stainless steel, nickel, copper, aluminum, or an alloy containing the foregoing as a main constituent is used in the thermal conductive member 40. In a case where the thickness of the thermal conductive member 40 is small, the heat capacity of the thermal conductive member 40 is likewise low, which is advantageous in terms of quick-starting the fixing apparatus 100. The thickness of the thermal conductive member 40 may be set to lie in the range from 0.3 mm to 2.0 mm, in terms of balancing mass productivity, cost and performance. An aluminum alloy having a thickness of 0.5 mm was used in the present embodiment as the thermal conductive member 40.

The thermal conductive member 40 bends along the inner periphery of the film, on the upstream and downstream sides of the fixing nip N in the transport direction. Accompanying the rotation of the fixing film 23 in the direction of arrow R2, a tightening force (tension) from the fixing film 23 towards the thermal conductive member 40 arises in the vicinity of the upstream side and the downstream side of the fixing nip N. A tension nip Y denotes herein a region where the regions of bending of the fixing film 23 and of the thermal conductive member 40 are in contact with each other on account of the tension of the fixing film 23. The tension nip Y on the upstream side in the transport direction is called herein upstream tension nip Y1, and the tension nip Y on the downstream side in the transport direction will be called downstream tension nip Y2. With a first region defined as a region at which the thermal conductive member 40 and the pressurizing roller 30 sandwich the fixing film 23, thereby forming the fixing nip N, and a second region defined as a region at which the thermal conductive member 40 and the pressurizing roller 30 do not sandwich the fixing film 23, then the upstream tension nip Y1 is included in the second region. The downstream tension nip Y2 may be referred to as a third region, defined herein as the region, downstream in the transport direction, at which the fixing film 23 is not sandwiched by the thermal conductive member 40 and the pressurizing roller 30.

An explanation follows next with reference to the exploded perspective-view diagram of FIG. 26. After fitting of the film guide 21 and the stay 24 to each other, the fixing film 23 is fitted around the outer periphery of the film guide 21 and the stay 24, leaving some margin of peripheral length. The axial direction of the cylindrical shape of the fixing film 23 will be hereafter referred to as the longitudinal direction or the rotation axis direction.

Both ends of the stay 24 protrude from respective ends of the fixing film 23, such that respective flange members 26 are fitted the ends, the whole being assembled as the film assembly unit 20. Also a power supply terminal of the heater 22 protrudes from one end of the fixing film 23, with a power supplying connector 27 having fitted thereto. The power supplying connector 27 is in contact with an electrode portion of the heater 22, at a given a contact pressure, to form a power supply path.

A heater clip 28, which is formed out of a U-shaped bent metal plate, exhibits spring properties. Respective ends of the thermal conductive member 40 in the longitudinal direction are held against the film guide 21, together with the heater 22, by the power supplying connector 27 and the heater clip 28.

An explanation follows next with reference to the front-view diagram of FIG. 27. The flange members 26 regulate film position, during the operation of the fixing apparatus 100, by regulating the longitudinal-direction movement of the rotating fixing film 23.

The film assembly unit 20 is provided facing the pressurizing roller 30, and is supported by top plate-side housings 41 of the fixing apparatus so that movement in the left-right direction in the figure is restricted and movement in the top-bottom direction is free. Pressurizing springs 45 are attached, in a compressed state, to respective top plate-side housings 41 of the fixing apparatus. The pressing force of the pressurizing springs 45 is received at both ends of the stay 24 via the flange members 26, whereupon the stay 24 is pressed towards the pressurizing roller 30 and the entire film assembly unit 20 is pressed towards the pressurizing roller 30.

Bearing members 31 are provided on frame-side plates 42, so as to support the core metal of the pressurizing roller 30. The bearing members 31 receive the pressing force from the film assembly unit 20 via the pressurizing roller 30. A heat-resistant material boasting also excellent slidability is used as the material of the bearings in order to rotatably support the core metal of the pressurizing roller that is at a comparatively high temperature. The bearing members 31 are attached to a bottom-side housing 43. The pressurizing roller 30 is driven by a pressurizing roller driving gear 33 that receives a driving force from the motor M, for instance through a coupling gear, from the apparatus body.

Heater

Figure 28A:
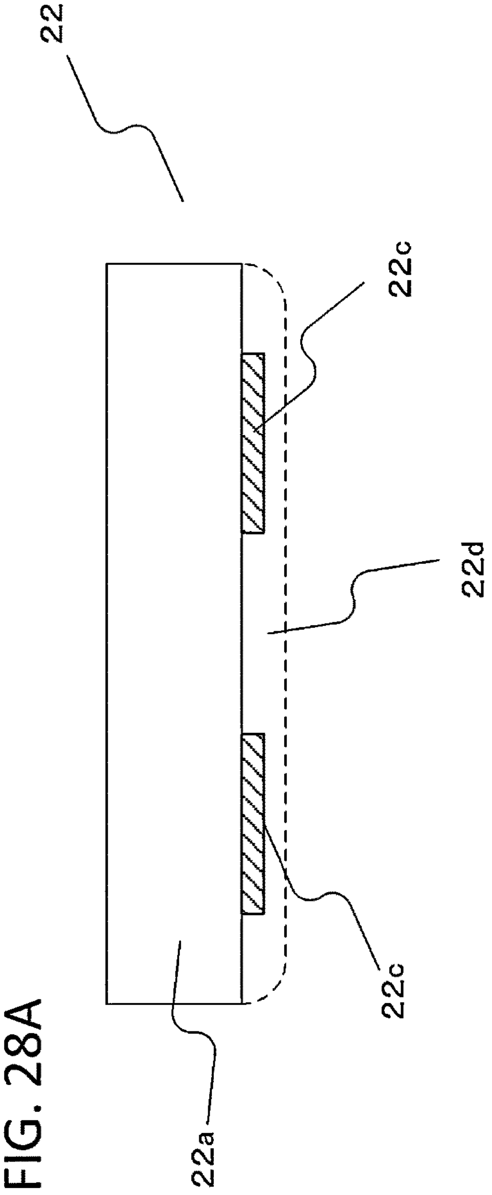
FIG. 28A is a cross-sectional diagram, and FIG. 28B a plan-view diagram, of a heater of Embodiment 5.
Figure 28B:
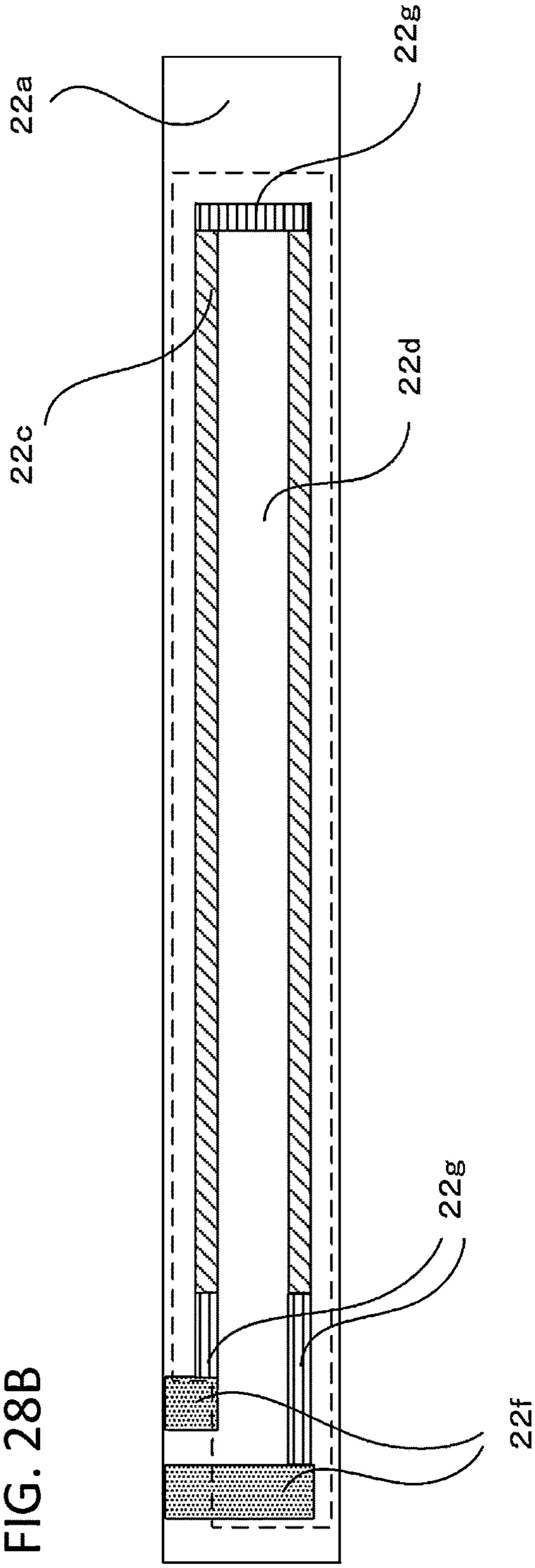

The materials that make up the heater 22 of the present embodiment, and a production method thereof, will be explained next. FIG. 28A is a cross-sectional diagram in the transverse direction, and FIG. 28B is a plan-view diagram in the longitudinal direction, of the heater 22.

The substrate **22*a* is a substrate made of a ceramic. The type of ceramic is not particularly limited, and may be selected as appropriate taking into consideration for instance the required mechanical strength, a coefficient of linear expansion suitable for the formation of the heat generating members, and market availability of plate stock. The thickness of the substrate 22*a* may be established in accordance with the strength, heat capacity and heat dissipation performance of the substrate. A thinner substrate 22*a* is advantageous in terms of quick-start, thanks to the resulting lower heat capacity of the substrate; however, an excessively thin substrate may easily give rise to problem of distortion at the time of heat molding of the heat generating members. A substrate 22*a* of large thickness is conversely advantageous in terms of distortion at the time of heat molding of the heat generating members; however, excessive thickness entails greater heat capacity, which is disadvantageous for quick start. A preferable thickness of the substrate 22*a* is herein from 0.3 mm to 2.0 mm, in terms of striking a balance between mass productivity, cost and performance. In the present embodiment an alumina substrate having a width of 10 mm, a length of 300 mm and a thickness of 1 mm was prepared as the substrate 22*a***.

The heat generating members **22*c* are formed through printing of a resistive heat generating member paste being a mixture of (A) a conductive component, (B) a glass component, and (C) an organic binder component, onto the substrate 22*a*, followed by firing. Upon firing of the resistive heat generating member paste, the organic binder component (C) burns off while components (A) and (B) remain, forming as a result the heat generating members 22*c*** containing the conductive component and the glass component. As the conductive component (A) for instance silver-palladium (Ag—Pd) and ruthenium oxide ($RuO_2$) exhibiting a sheet resistance value in the range from 0.1 (Ω/square) to 100 (kΩ/square), are suitably used, singly or compounded with each other, as the conductive component (A). In addition to the above (A) to (C), other materials may also be formulated, provided that they are present in trace amounts that do not impair the characteristics of the present invention.

In the present embodiment the heat generating members **22*c* were formed using a resistive heat generating member paste being a mixture of silver-palladium (Ag—Pd) as a conductive component, with an organic binder component and an organic binder component, the paste being applied, by screen printing, onto the ceramic substrate 22*a*, followed by drying at 180° C. and firing at 850° C. The heat generating members 22*c*** after firing had a thickness of 15 μm, a length of 220 mm, and a width of 1.1 mm.

Power Supplying Electrode and Conductive Pattern

Power supplying electrodes **22*f* and conductive patterns 22*g* have, as main constituents, silver (Ag), platinum (Pt), gold (Au) or a silver-platinum (Ag—Pt) alloy, and a silver-palladium (Ag—Pd) alloy are obtained by printing a paste, similar to the resistive heat generating member paste, and resulting from mixing a conductive component (A), a glass component (B) and an organic binder component (C), onto the ceramic substrate 22***a*.

The power supplying electrodes 22*f* and the conductive patterns 22*g*, provided for the purpose of supplying power to the heat generating members 22*c*, exhibit resistance sufficiently lower than that of the heat generating members 22*c*. In the above paste of the resistive heat generating members, paste of the power supplying electrodes and paste of the conductive pattern, materials must be selected that soften and melt at a temperature lower than the melting point of the substrate 22*a*; herein, the heat-resistant materials need to be selected with the actual usage temperature in mind.

In the present embodiment there were prepared pastes for the power supplying electrode and the conductive pattern, being mixtures of silver, as a conductive component, with a glass component and an organic binder component, the pastes were applied by screen printing, onto the ceramic substrate 22*a*, followed by drying at 180° C. and firing at 850° C., to form the power supplying electrodes 22*f* and the conductive patterns 22*g*.

The protecting layer 22*d* is provided for the purpose of protecting the heat generating members 22*c* and the conductive patterns 22*g*, and is denoted by a broken line in the figures. The material of the protecting layer 22*d* is preferably glass or PI (polyimide), from the viewpoint of heat resistance, and may be mixed as needed with for instance a thermally conductive filler having insulating properties. In the present embodiment a protecting layer glass paste was prepared, and then the protecting layer glass paste was applied on the heat generating members 22*c* and the conductive patterns 22*g* by screen printing, followed by drying at 180° C. and firing at 850° C., to form a protecting layer 22*d* having a thickness of 60 μm.

Effect

Figure 29A:
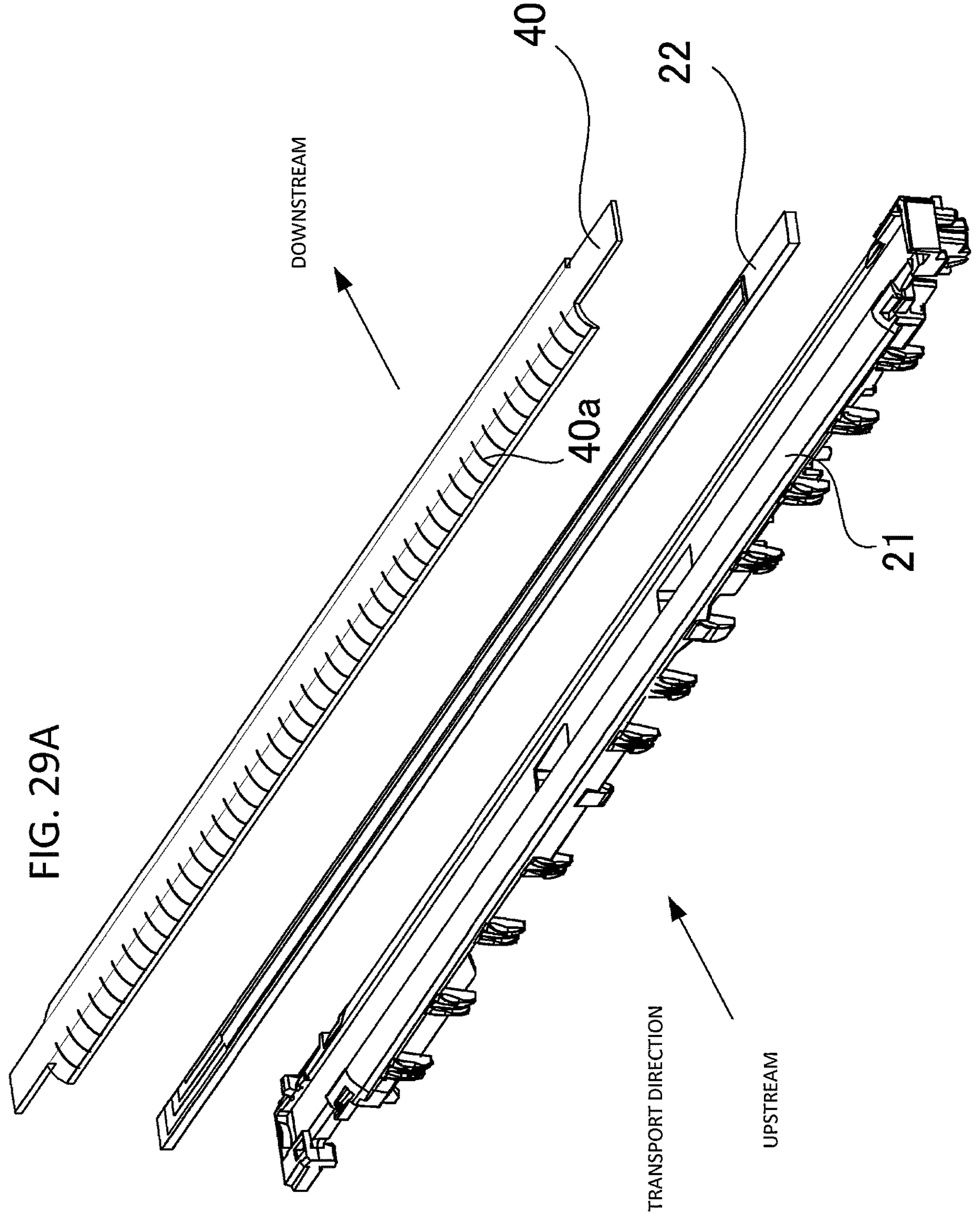
FIG. 29A is a perspective-view diagram of a thermal conductive member of Embodiment 5 prior to assembly.
Figure 29B:
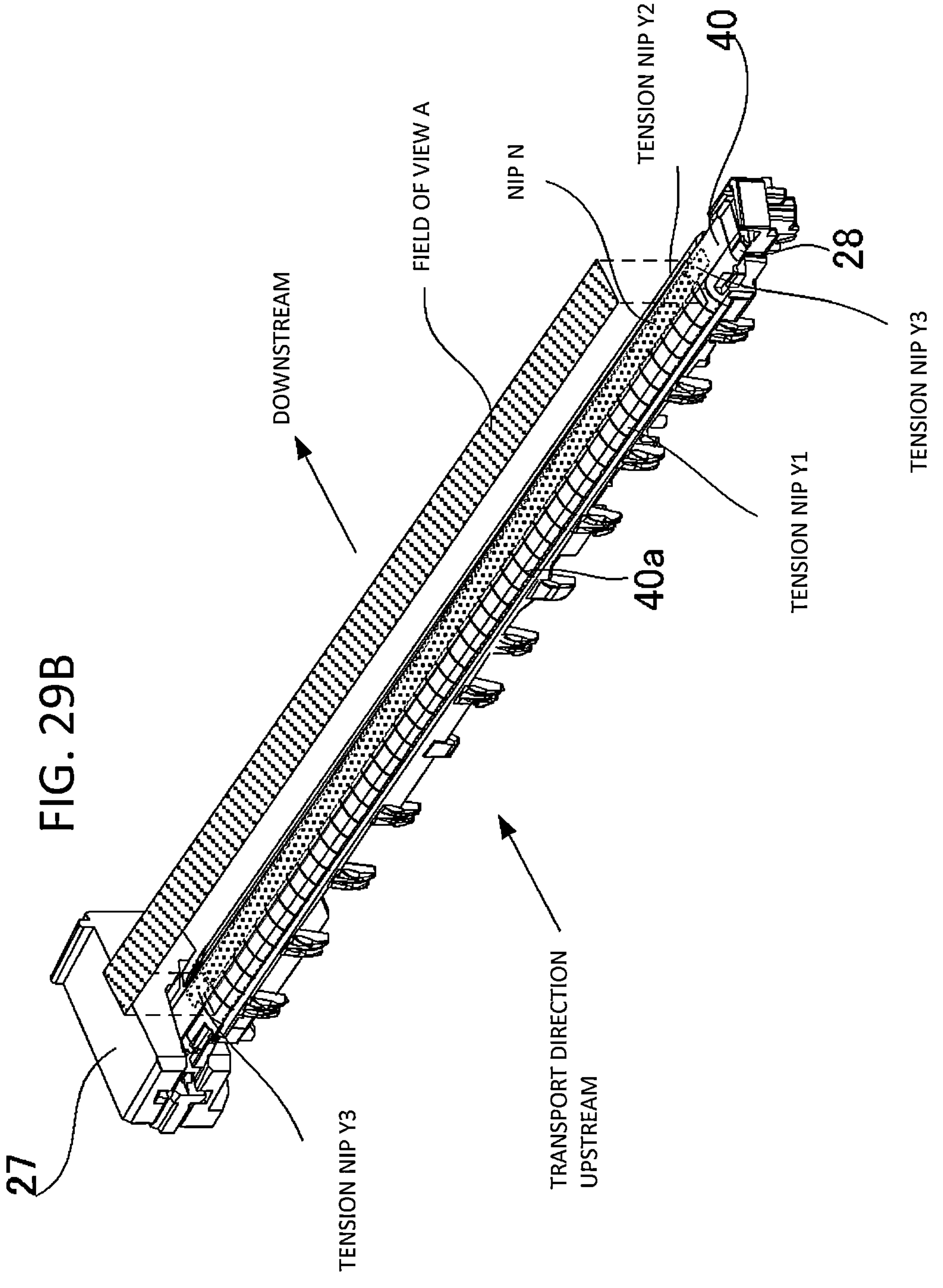
FIG. 29B is a perspective-view diagram of the thermal conductive member of Embodiment 5 after assembly.

An explanation follows next on the manner in which the thermal conductive member 40 is attached to the film guide 21 together with the heater 22. FIG. 29A is an exploded perspective-view diagram before assembly. FIG. 29B is a perspective-view diagram illustrating the state after assembly, and depicting the region, of the fixing nip N, formed through pressing of the pressurizing roller 30 against the surface of the thermal conductive member 40 across the fixing film 23, not shown. Multiple groove portions 40*a* are formed in the thermal conductive member 40, at the tension nip Y1 lying upstream of the fixing nip N in the transport direction. The groove portions 40*a* were formed through cutting of the thermal conductive member 40 to a width of 0.5 mm and a depth of 0.1 mm. The tension nip Y2 is formed downstream of the fixing nip N in the transport direction, while tension nips Y3 are formed at both ends of the fixing nip N in the longitudinal direction. Herein there are a first portion in which grooves (groove portions 40*a*) for holding grease are formed by the tension nip Y1 as the second region, being a region in which the fixing film 23 is not nipped by the thermal conductive member 40 and the pressurizing roller 30, and a second portion in which no grooves are formed. The first portion and the second portion are juxtaposed on a virtual line in the transport direction, as viewed from the upstream side in the transport direction towards the downstream side.

At the tension nip Y1, sliding grease G applied to the inner peripheral surface of the fixing film 23 is guided to the groove portions 40*a*. Thereafter, the sliding grease (not shown) in the groove portions 40*a* is transported to the fixing nip N, downstream in the transport direction, accompanying the rotation of the fixing film 23.

The behavior and effect of the sliding grease G will be explained in further detail next. FIG. 30A to FIG. 30D are schematic diagrams of the surface of the thermal conductive member 40 in a field of view A.

Figure 30A:
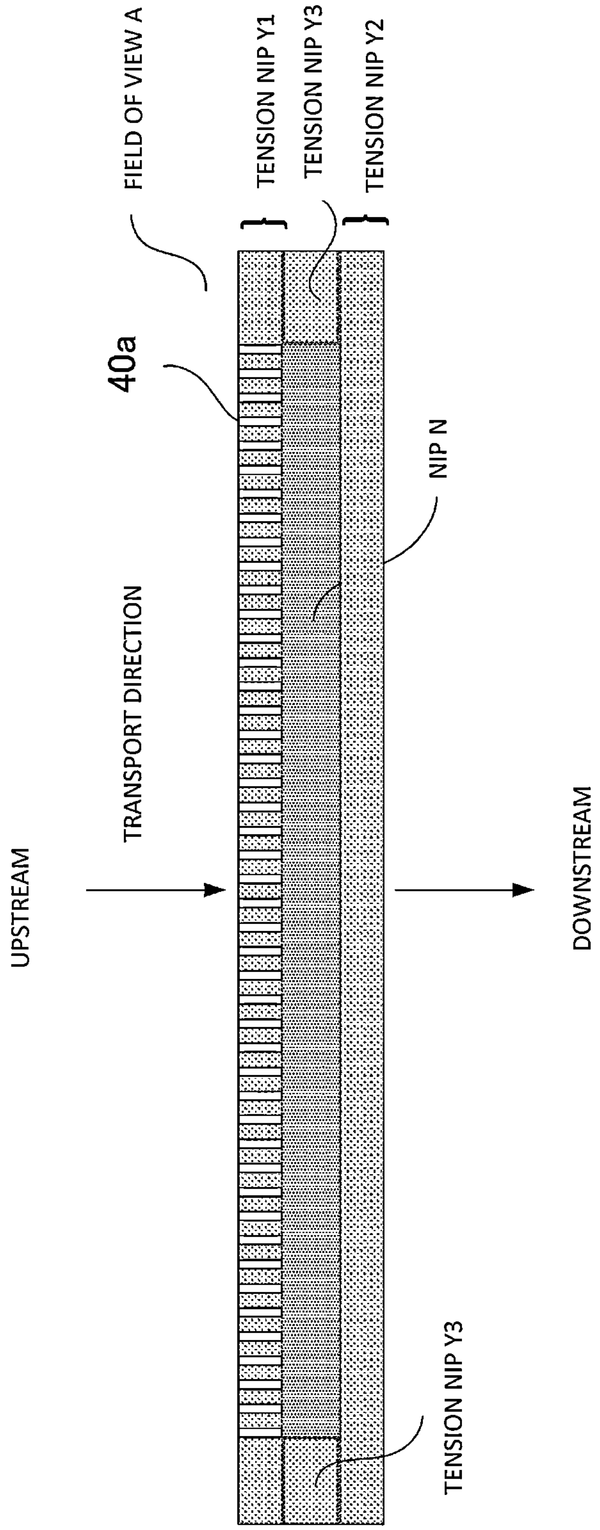
FIG. 30A illustrates the state of grease on the surface of the thermal conductive member of Embodiment 5.
Figure 30B:
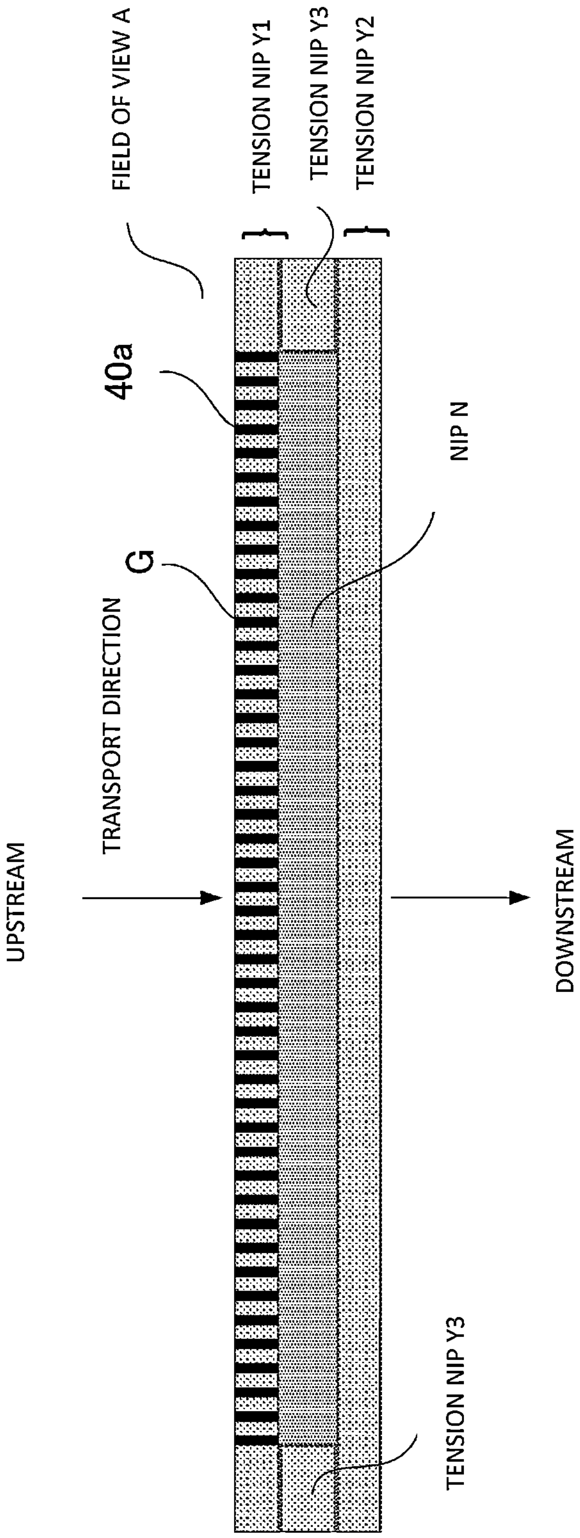
FIG. 30B illustrates the state of grease on the surface of the thermal conductive member of Embodiment 5.
Figure 30C:
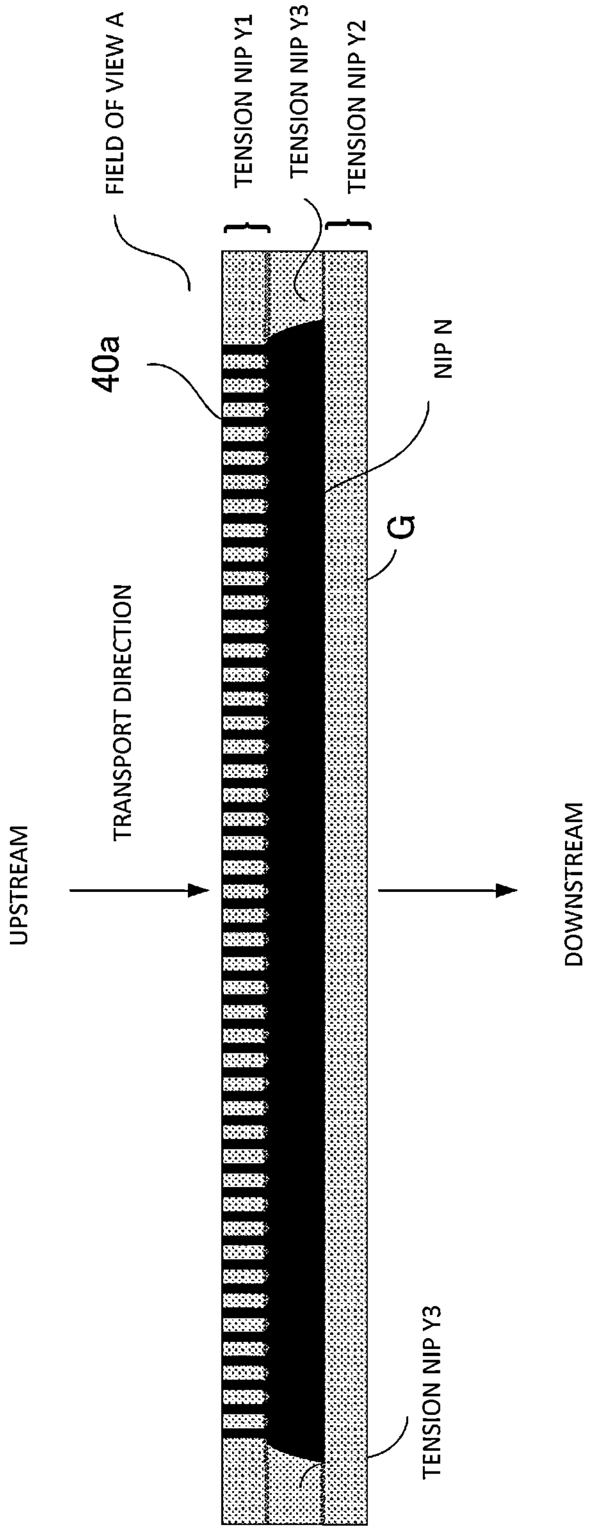
FIG. 30C illustrates the state of grease on the surface of the thermal conductive member of Embodiment 5.
Figure 30D:
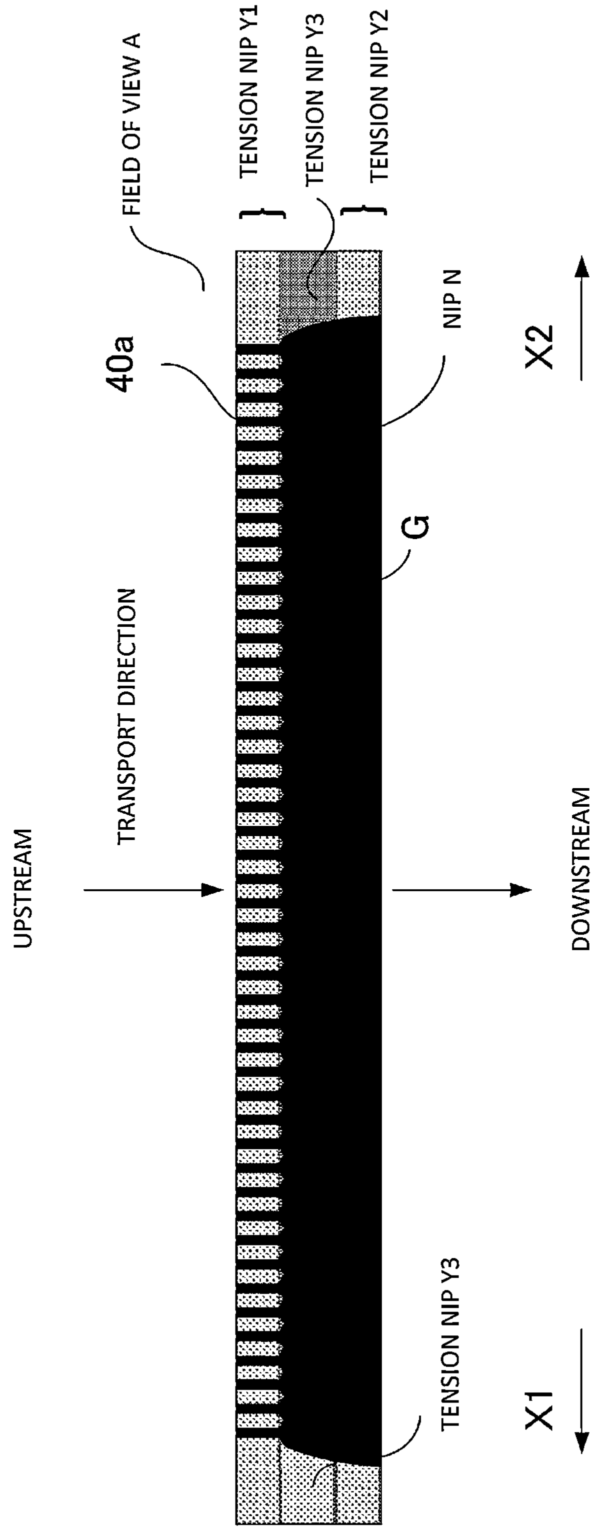
FIG. 30D illustrates the state of grease on the surface of the thermal conductive member of Embodiment 5.

FIG. 30A illustrates a state where there is no sliding grease Gin the groove portions 40*a*. FIG. 30B illustrates a state in which the sliding grease G is guided by the groove portions 40*a*. FIG. 30C illustrates a state in which the sliding grease G is guided by the groove portions 40*a*, and is further transported to the fixing nip N as the fixing film 23 rotates. In this case, the thermal conductive member 40 has a flat surface, at the region facing the fixing nip N, at which no groove portions 40*a* are formed, and hence the sliding grease G is spread flatly on account of the pressure received at the fixing nip N. FIG. 30D illustrates how the sliding grease G is spread flatly at the region of the tension nip Y2.

The groove portions 40*a* in the upstream region of the thermal conductive member 40 must be grooves formed in a direction so as to guide at least the sliding grease G to the fixing nip N. If this condition is satisfied, the thickness, number, layout, direction, shape and so forth of the grooves to be formed are appropriately designed in accordance with the configuration of the apparatus. A continuous region having no grooves provided therein is present in at least part of the portion of the thermal conductive member 40, between one end and the other end in the longitudinal direction of the fixing film (rotation axis direction), at a portion (region facing the fixing nip) corresponding to the fixing nip N. The sliding grease G becomes evenly spread as a result on the groove-free flat surface.

By adopting the configuration of the present embodiment a state was brought about in which the sliding grease G can be effectively used at the fixing nip N where sliding resistance is highest, as illustrated in FIG. 30C, and good rotatability of the fixing film 23 could be achieved. As a result, it was possible to bring to about 100000 the number of prints that could be heat-fixed on the recording material P, with the toner image T on the recording material P in a good state.

Figure 31:
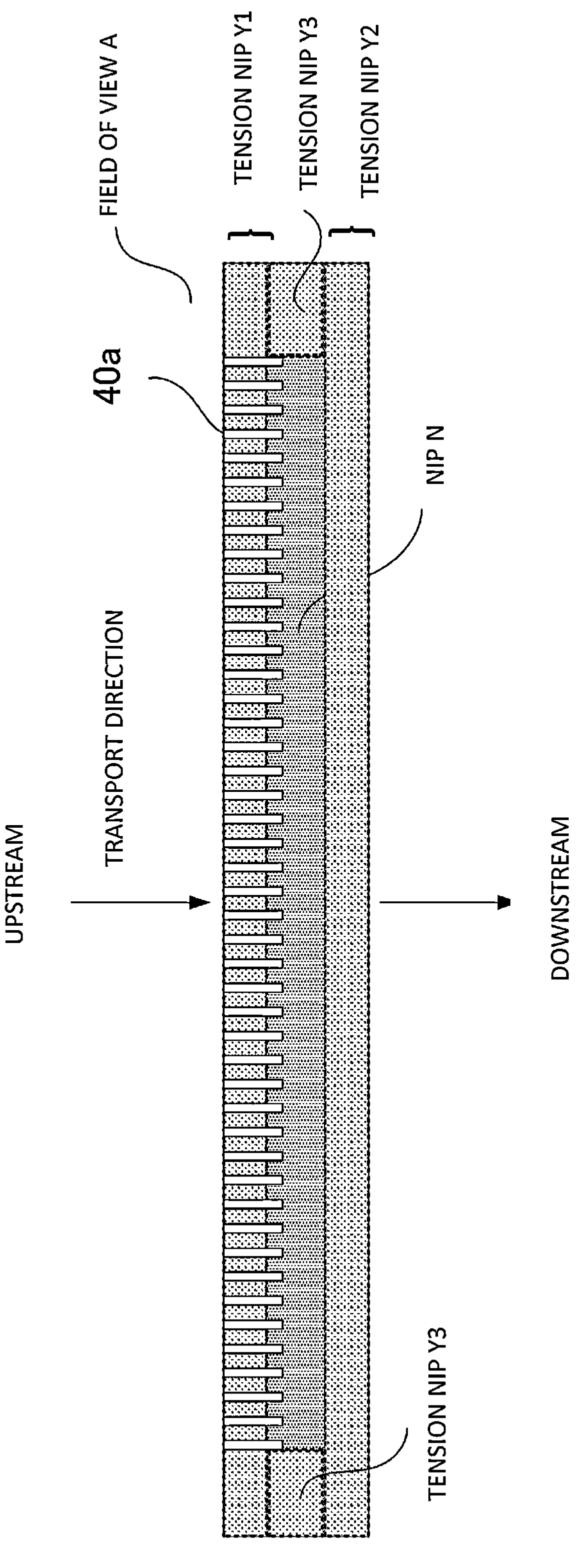
FIG. 31 illustrates a variation of a groove portion provided in the thermal conductive member of Embodiment 5.

The surface area of the fixing nip N may increase or decrease, within the tolerance of the hardness of the pressurizing roller 30 and of the pressing force of the pressurizing springs 45. The surface area of the fixing nip N becomes maximal as a result, and in some instances part of the groove portions 40*a* and 40*b* may intrude into the region of the fixing nip N, as illustrated in FIG. 31. In such a case as well it is preferable to secure a planar fixing nip N so that the sliding grease G can spread out flatly.

Comparative Example 1

Other than for the thermal conductive member 40 in the present comparative example, the image forming apparatus and the fixing apparatus adopt the same configurations as those in the present embodiment, and hence an explanation of these will be omitted herein.

Figure 32A:
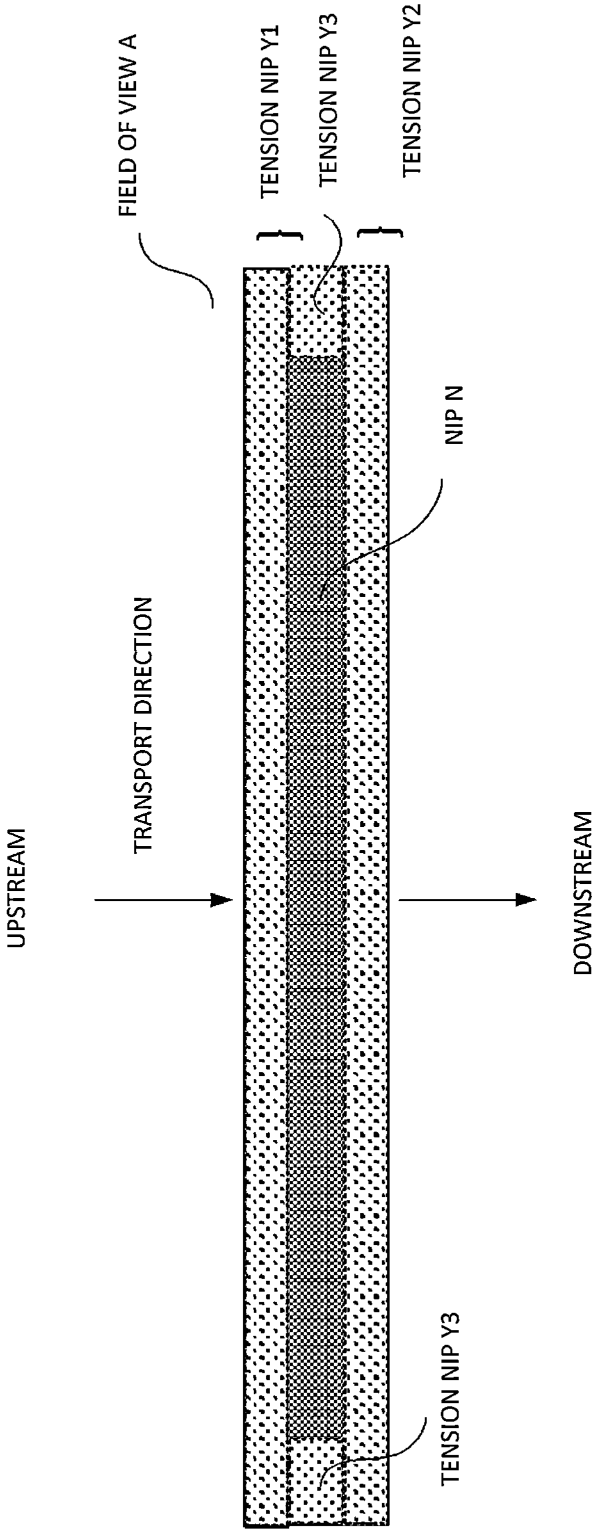
FIG. 32A illustrates the state of grease on the surface of a thermal conductive member of a comparative example.
Figure 32B:
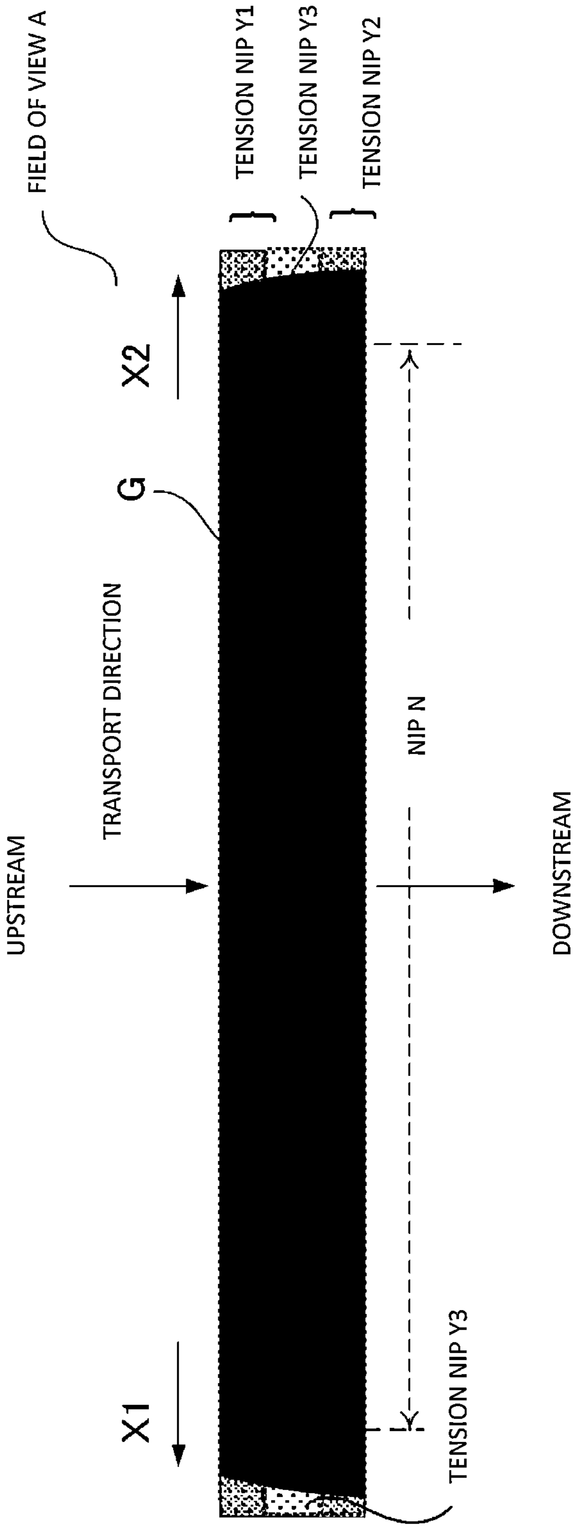
FIG. 32B illustrates the state of grease on the surface of a thermal conductive member of a comparative example.

As illustrated in FIG. 32A, in the present comparative example a thermal conductive member 40 was used that had no groove portions 40*a* formed therein. In consequence, the sliding grease G extended and spread in the directions denoted by arrows X1 and X2, i.e. towards both longitudinal ends of the thermal conductive member 40 at the tension nip Y1, as illustrated in FIG. 32B. As a result, when the number of prints reached about 80000, the amount of sliding grease G in the fixing nip N decreased, and rotatability of the fixing film 23 worsened. Therefore, when the recording material P was transported while nipped at the fixing nip N, a deviation arose between the rotational speed of the fixing film 23 and the transport speed of the recording material P, such that the toner image T on the recording material P was heat-fixed, in a disordered state, onto the recording material P.

Comparative Example 2

Other than for the thermal conductive member 40 in the present comparative example, the image forming apparatus and the fixing apparatus adopt the same configurations as those in the present embodiment, and hence an explanation thereof will be omitted herein.

Figure 33A:
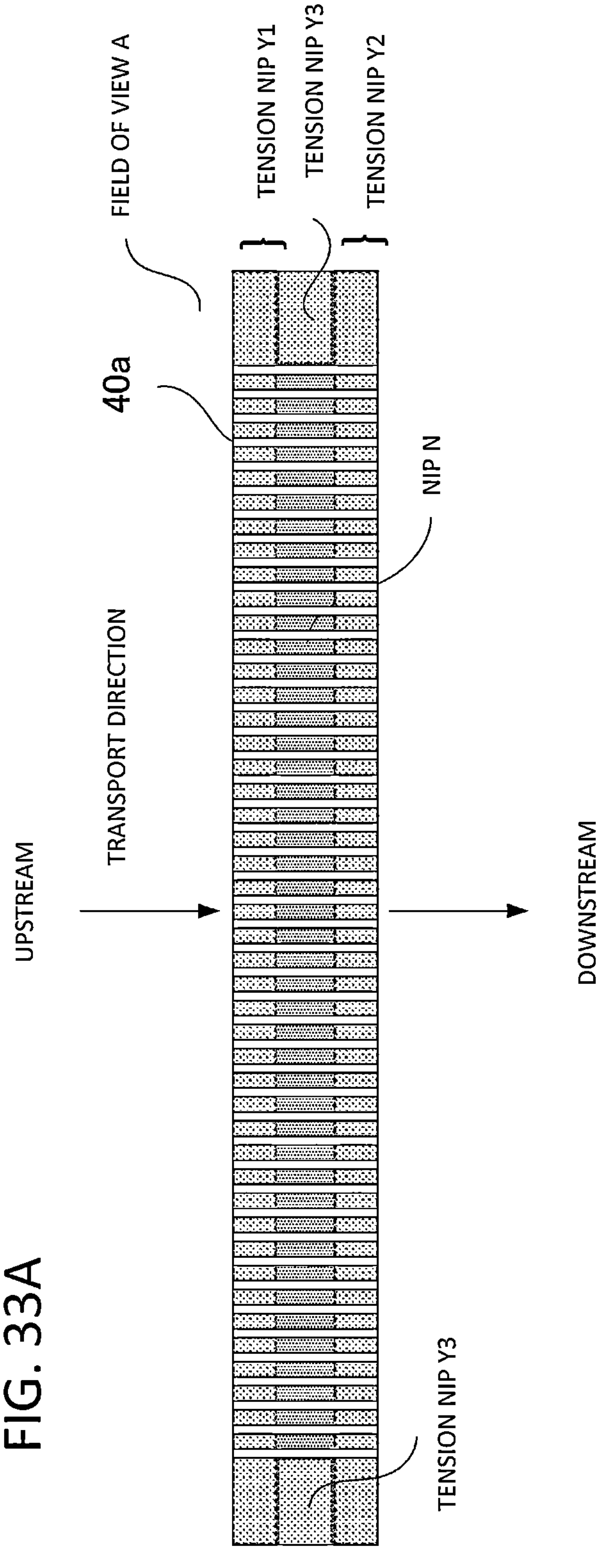
FIG. 33A illustrates the state of grease on the surface of a thermal conductive member of a comparative example.
Figure 33B:
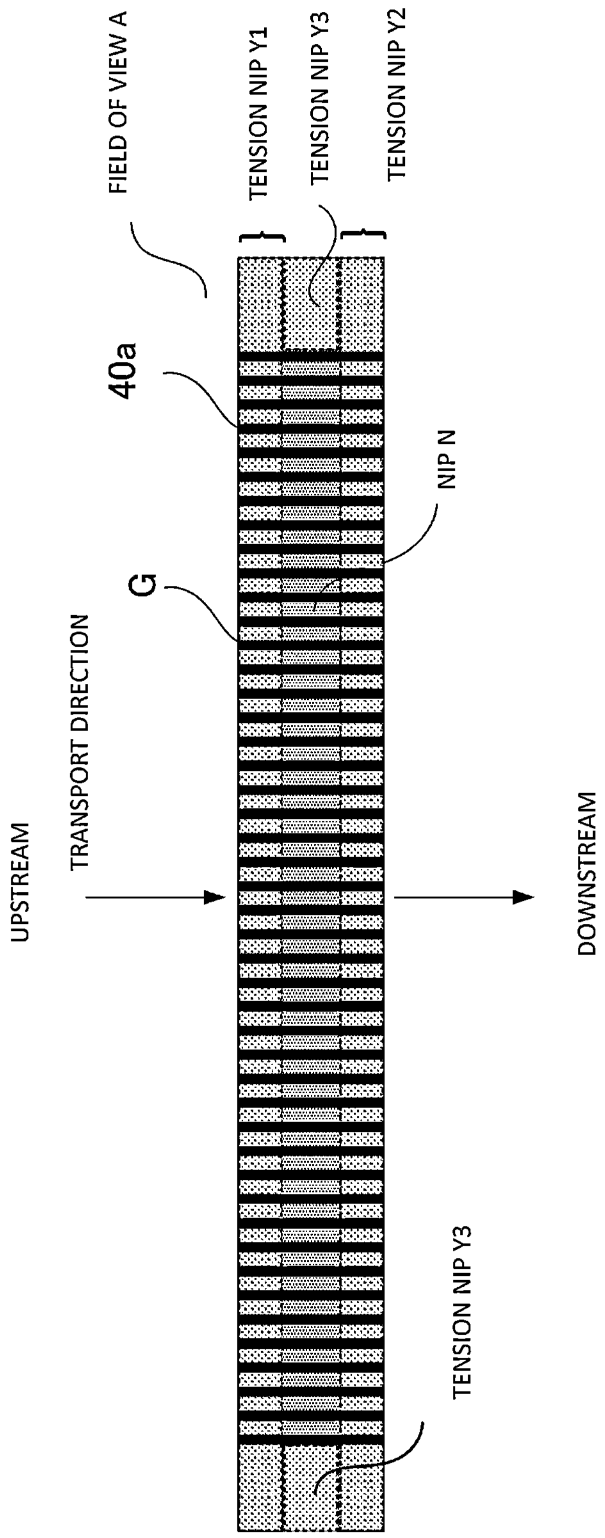
FIG. 33B illustrates the state of grease on the surface of a thermal conductive member of a comparative example.

As illustrated in FIG. 33A, in the present comparative example a thermal conductive member 40 was used in which there were formed multiple groove portions 40*a* continuously from the tension nip Y1 to the fixing nip N and the tension nip Y2. In consequence, as illustrated in FIG. 33B, the sliding grease G could not spread flatly in the fixing nip N, and the amount of the sliding grease G necessary for the sliding surface could not be secured. Similarly to Comparative example 1, the rotatability of the fixing film 23 worsened as a result at a print count of about 80000, and in consequence the toner image T on the recording material P was heat-fixed in a disordered state, onto the recording material P. It is therefore found that preferably a region is present at which no grooves are formed extending in the rotation axis direction in at least part of the rotation axis direction of the fixing film 23, at the fixing nip N.

Embodiment 6

Other than for the thermal conductive member 40 in the present comparative example, the image forming apparatus and the fixing apparatus adopt the same configurations as those in Embodiment 5, and hence an explanation thereof will be omitted herein.

Figure 34A:
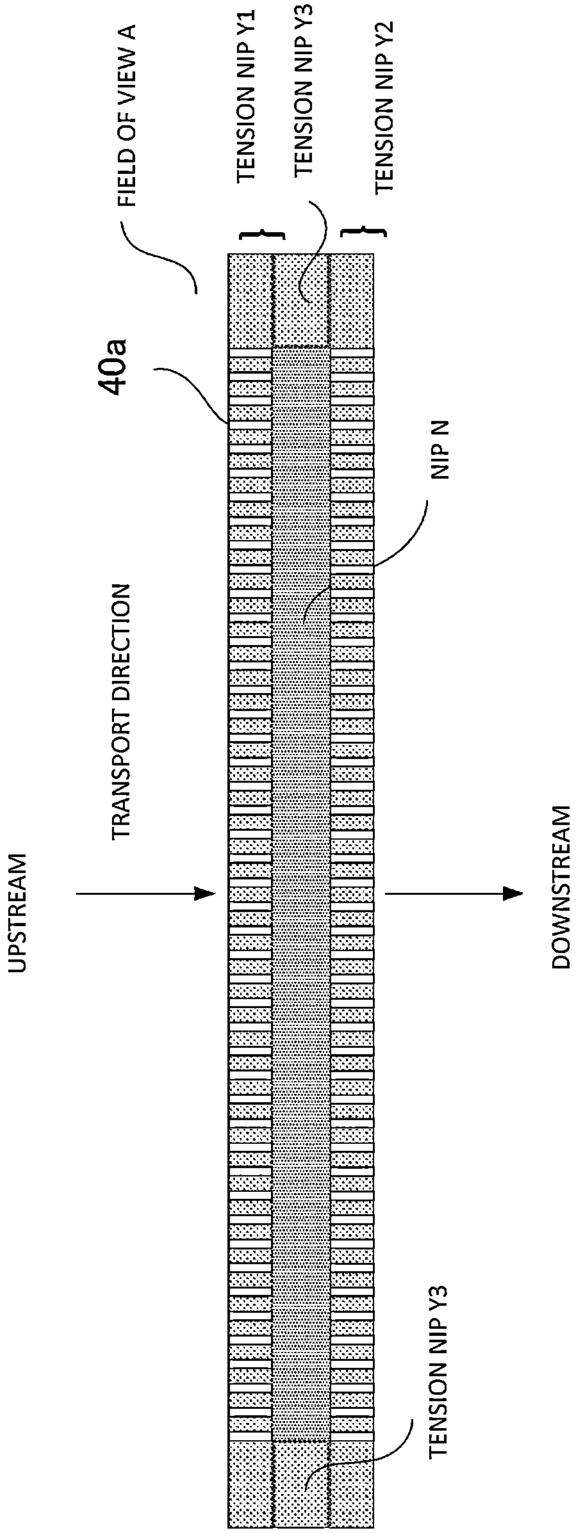
FIG. 34A illustrates the state of grease on the surface of a thermal conductive member of Embodiment 6.
Figure 34B:
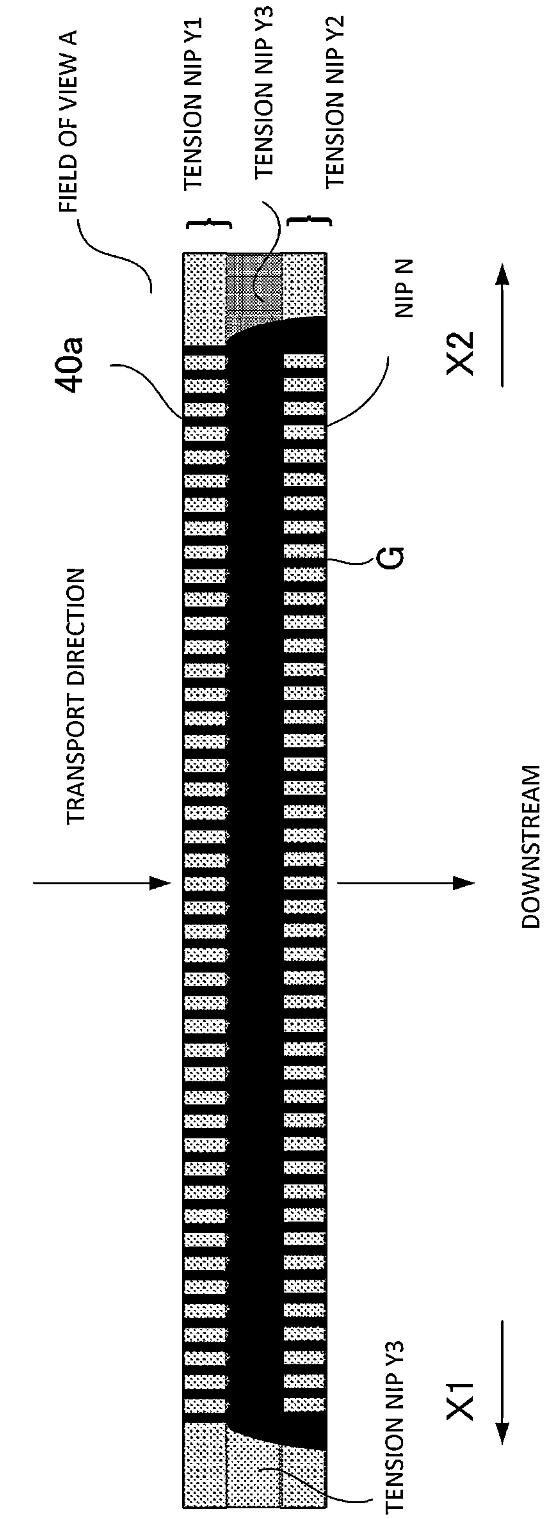
FIG. 34B illustrates the state of grease on the surface of the thermal conductive member of Embodiment 6.

As illustrated in FIG. 34A, in the present embodiment there was used a thermal conductive member 40 having multiple groove portions 40*a* formed at both the tension nip Y1 and the tension nip Y2. That is, grooves are formed also in the tension nip Y2 as a third region. The groove portions 40*a* of the tension nip Y1 and the tension nip Y2 are separated by a region facing the fixing nip. As a result, the sliding grease G is guided by the groove portions 40*a* not only in an upstream region, but also in a downstream region of the tension nip Y2, as illustrated in FIG. 34B. That is, the surface area over which the sliding grease G is spread out flatly at the region of the tension nip Y2 was smaller than that in the state of FIG. 30D, and as a result it was possible to curtail the amount of sliding grease G pushed unnecessarily out towards both ends of the thermal conductive member 40 (directions of arrows X1 and X2). In consequence, the fixing film 23 rotated better than in the fixing apparatus of Embodiment 5, and the number of prints that could be heat-fixed on the recording material P, with the toner image T on the recording material P in a good state, could be increased by 10%.

Embodiment 7

Other than for the thermal conductive member 40 in the present comparative example, the image forming apparatus and the fixing apparatus adopt the same configurations as those in Embodiment 5, and hence an explanation thereof will be omitted herein.

Figure 35A:
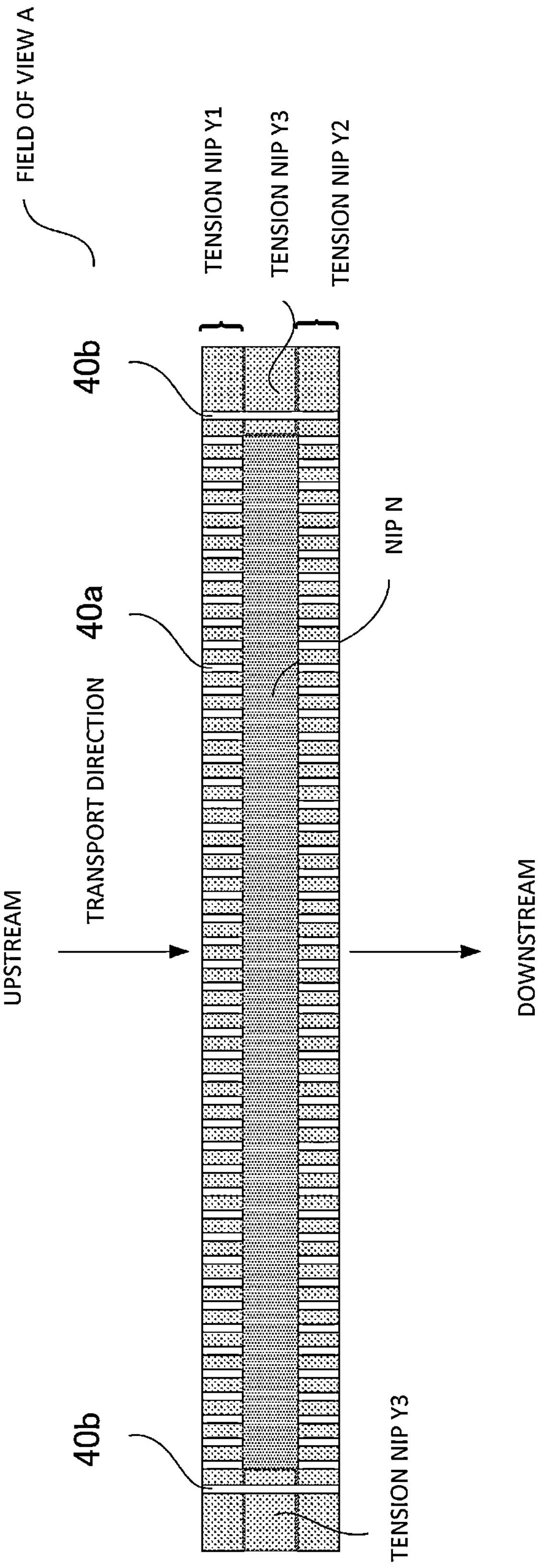
FIG. 35A illustrates the state of grease on the surface of a thermal conductive member of Embodiment 7.
Figure 35B:
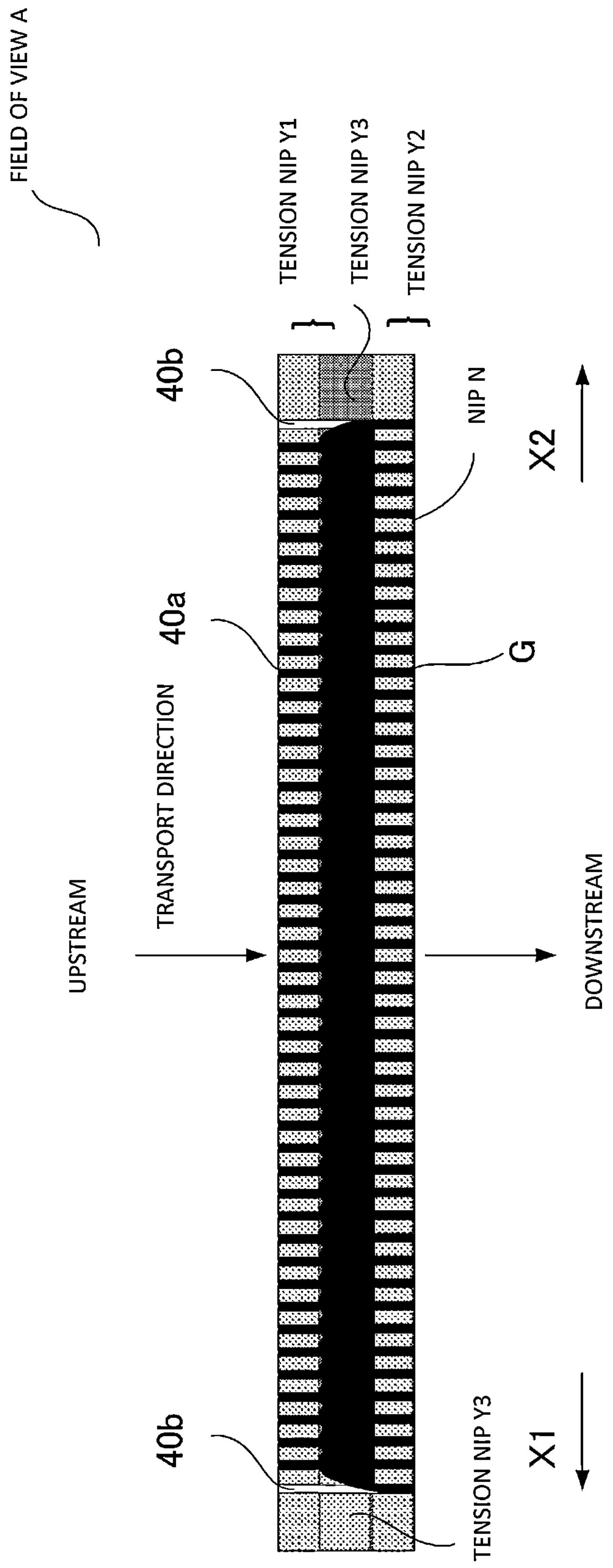
FIG. 35B illustrates the state of grease on the surface of the thermal conductive member of Embodiment 7.

In addition to the configuration of the thermal conductive member 40 of Embodiment 6, in the present embodiment respective groove portions 40*b* are formed continuously from the tension nip Y1 to the tension nip Y3 and the tension nip Y2 at regions outward of both ends of the fixing nip N in the longitudinal direction, as illustrated in FIG. 35A. As illustrated in FIG. 35B, the sliding grease G pushed out towards both ends of the thermal conductive member 40 (directions of arrows X1 and X2) was guided as a result by the groove portions 40*b*; this allowed curtailing the amount of sliding grease G that was unnecessarily pushed out towards both ends of the thermal conductive member 40. In consequence, the fixing film 23 rotated better than in the fixing apparatus of Embodiment 6, and the number of prints that could be heat-fixed on the recording material P, with the toner image T on the recording material P in a good state, could be increased by 10%.

Embodiment 8

Other than for the thermal conductive member 40 in the present comparative example, the image forming apparatus and the fixing apparatus adopt the same configurations as those in Embodiment 5, and hence an explanation thereof will be omitted herein.

Figure 36A:
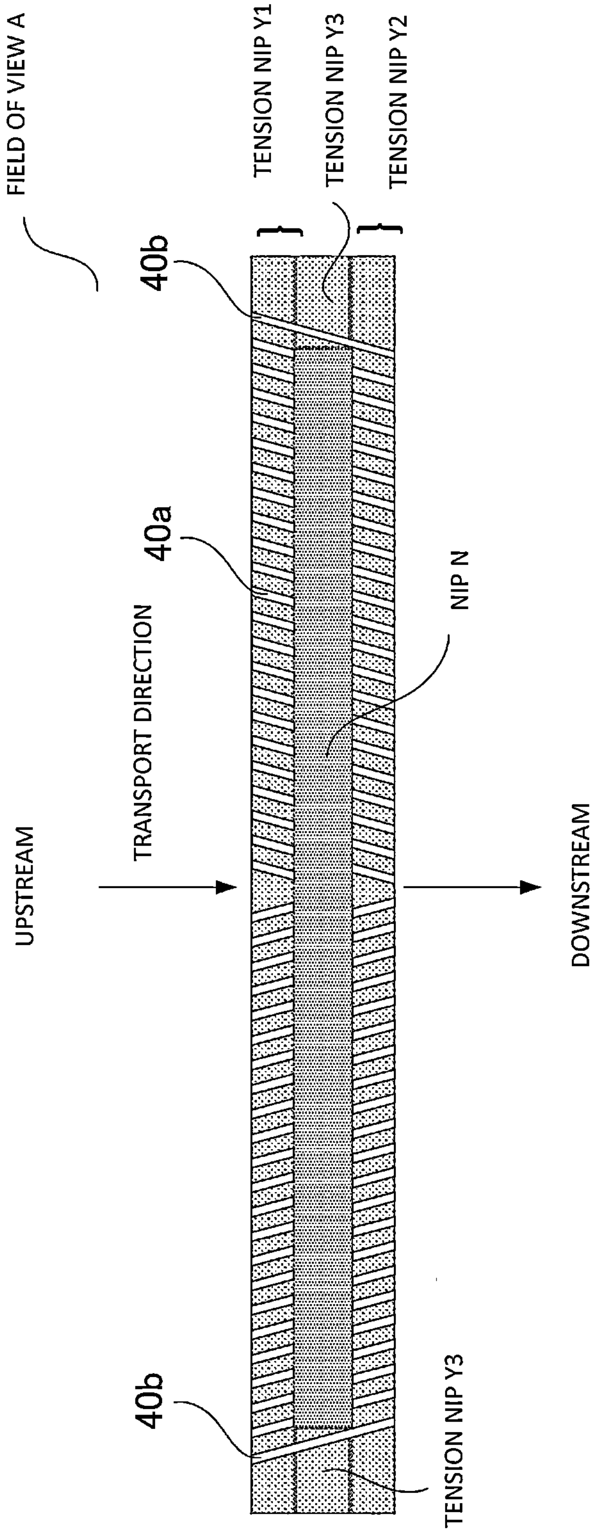
FIG. 36A illustrates the state of grease on the surface of a thermal conductive member of Embodiment 8.

As illustrated in FIG. 36A, in the present embodiment the groove portions 40*a* in the upstream region are formed obliquely with respect to the transport direction. The groove portions 40*a* are formed such that the orientation thereof points from the end portion towards the central portion as the groove portions 40*a* extend from the upstream side to the downstream side. Similarly, the groove portions 40*a* in the downstream region are formed obliquely with respect to the transport direction. The groove portions 40*b* are formed such that the orientation thereof points from the respective end portion towards the central portion as the groove portions 40*b* extend from the upstream side to the downstream side.

Figure 36B:
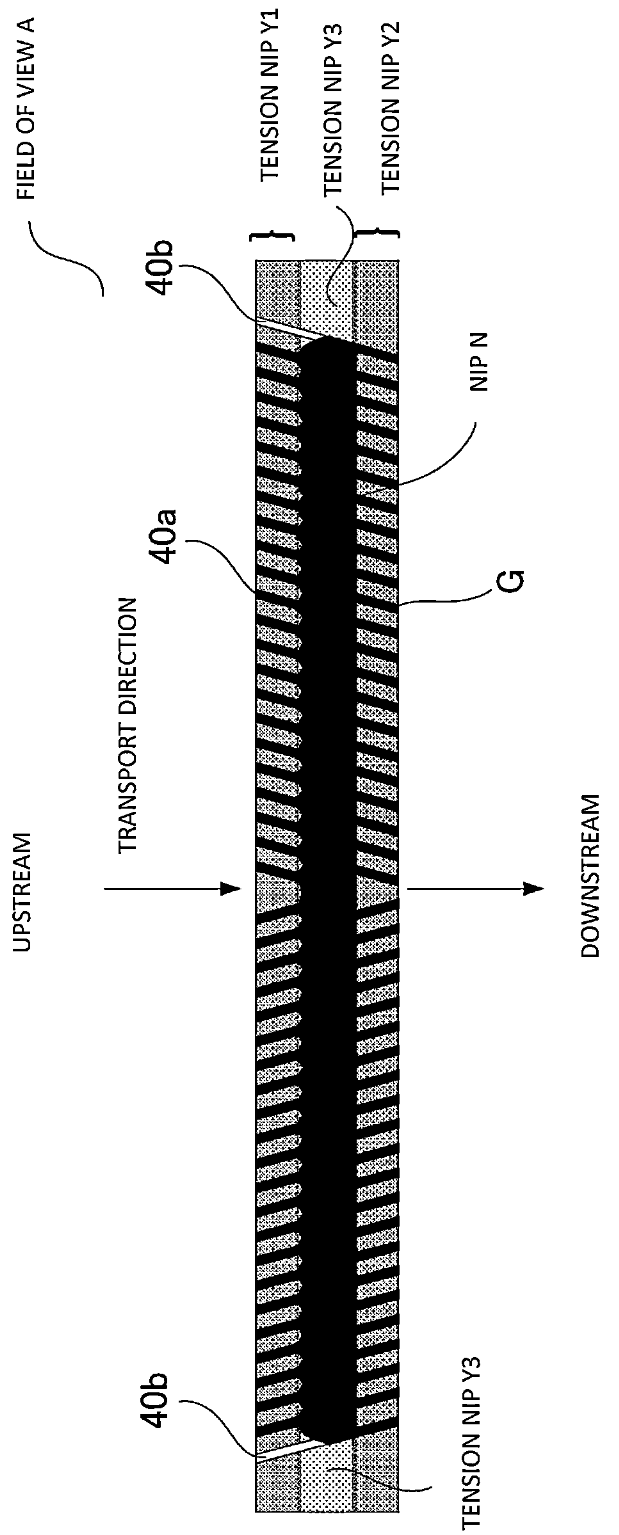
FIG. 36B illustrates the state of grease on the surface of the thermal conductive member of Embodiment 8.

When the sliding grease G is spread out flatly in the fixing nip N, the sliding grease G is spread towards both longitudinal ends of the thermal conductive member 40. In the case of FIG. 35B of Embodiment 7, therefore, the sliding grease G might shift off the vicinity of the longitudinal-direction center of the thermal conductive member 40 towards both ends, as the revolutions of the fixing apparatus increased. In the present embodiment, by contrast, the sliding grease G can be transported towards the center in the longitudinal direction, as illustrated in FIG. 36B. In consequence, the fixing film 23 rotated better here than in the fixing apparatus of Embodiment 7, and the number of prints that could be heat-fixed on the recording material P, with the toner image T on the recording material P in a good state, could be increased by 10%.

Embodiment 9

Figure 37:
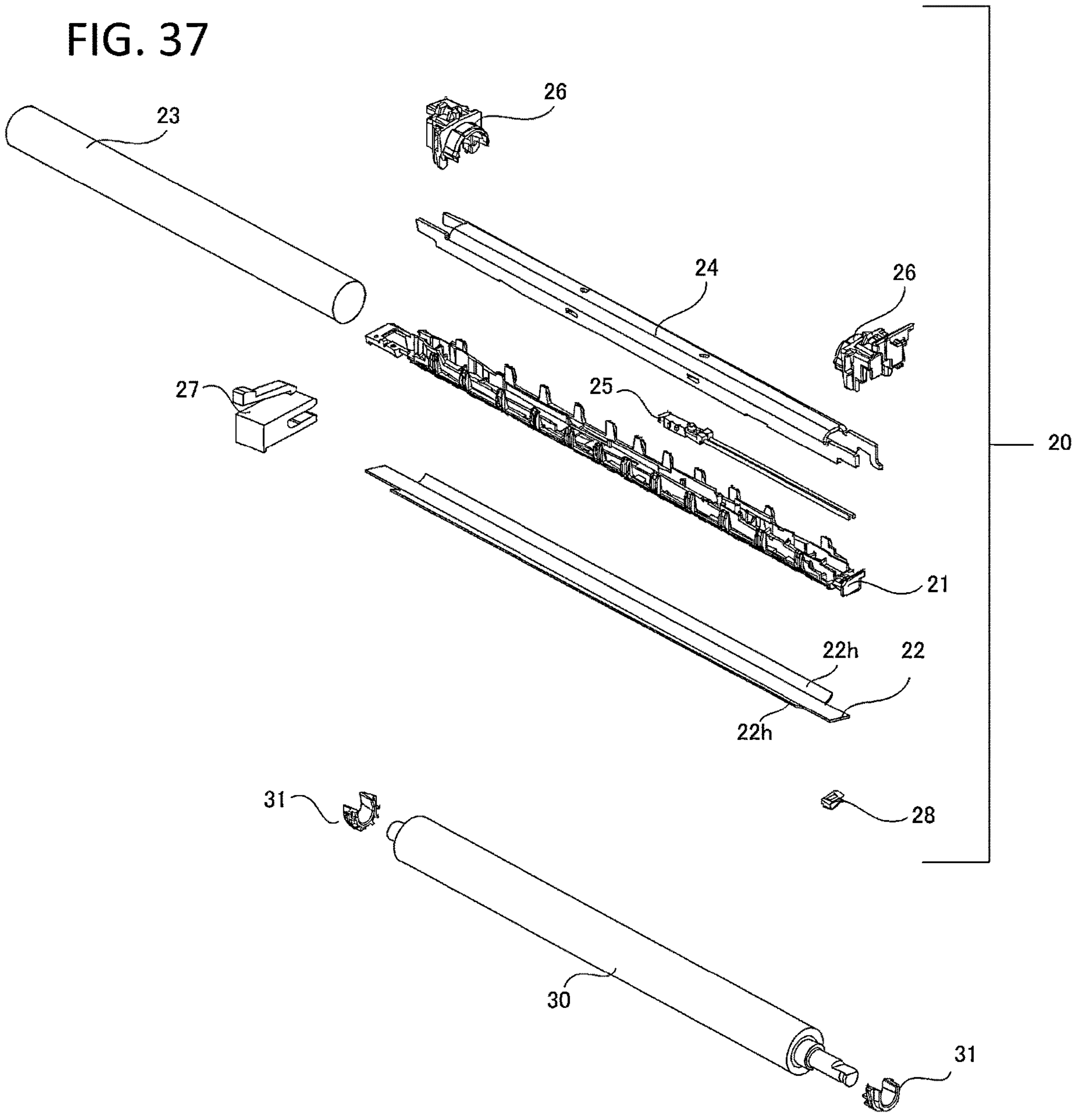
FIG. 37 is an exploded perspective-view diagram of a film assembly unit of Embodiment 9.

As illustrated in FIG. 37, the fixing apparatus of the present embodiment does not use the thermal conductive member 40, unlike in Embodiments 5 to 8. As a characterizing feature of the present embodiment, a metal-made substrate is used as the substrate 22*a*, and bent portions 22*h* are provided on the upstream and downstream sides of the heater 22 in the transport direction. The material used in the substrate 22*a* is not limited to a metal, and herein a ceramic or the like may be used instead; from the viewpoint of workability, however, a metal-made substrate is preferably used to form the bent portions 22*h* in the heater 22, as in the present embodiment.

Elements other than the heater 22 have the same configuration as in Embodiment 5; accordingly, a detailed explanation thereof will be omitted, and the detailed configuration of the heater 22, as the characterizing feature herein, will be explained next.

Figure 38A:
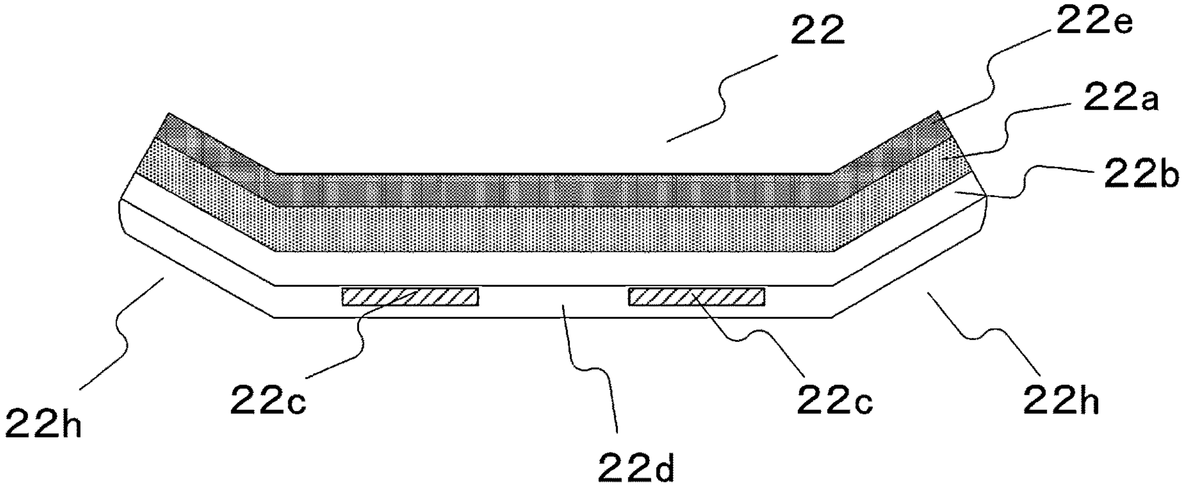
FIG. 38A is a cross-sectional diagram of a heater of Embodiment 9.

FIG. 38A is a cross-sectional diagram of the heater 22 having a metal-made substrate 22*a* in the present embodiment. The heater 22 includes at least the substrate 22*a*, having a long and thin plate shape and being mainly made of metal alloy, heat generating members 22*c* that generate heat when energized, an insulating layer 22*b* which is a first insulating layer that insulates the heat generating members 22*c* and the substrate 22*a* and the protecting layer 22*d* that protects the heat generating members 22*c*. In order to prevent warping of the substrate 22*a* during manufacture, also the surface on the reverse side from that where the heat generating members 22*c* are provided has an insulating layer 22*e*, which is a second insulating layer. The substrate 22*a* has the bent portions 22*h*, as described above.

The material suitably used in the metal-made substrate 22*a* may be stainless steel, nickel, copper, aluminum, or alloys containing any of the foregoing as a main material. Stainless steel is most preferable among the foregoing, in terms of strength, heat resistance and corrosion. The type of stainless steel is not particularly limited, and may be selected as appropriate for instance depending on the necessary mechanical strength, the below-described insulating layer, coefficients of linear expansion conforming to the formation of the heat generating members, and market availability of plate stock.

As an example, martensitic and ferritic chromium stainless steels (400 series) are suitably used, since these have relatively low coefficients of linear expansion among stainless steels, and can readily form the insulating layer and the heat generating members.

The thickness of the substrate 22*a* may be stipulated taking into consideration strength, heat capacity, and heat dissipation performance. A thinner substrate 22*a* has lower heat capacity, which is advantageous in terms of quick-start; however, an excessively thin substrate may however give rise to the problem of distortion at the time of heat molding of the heat generating members. A substrate 22*a* of large thickness is conversely advantageous in terms of distortion at the time of heat molding of the heat generating members, but an excessive thickness entails a greater heat capacity, which is disadvantageous in terms of quick start. A preferable thickness of the substrate 22*a* is herein from 0.3 mm to 2.0 mm, in terms of striking a balance between mass productivity, cost and performance. In the present embodiment, a ferritic stainless steel substrate (SUS430: 18Cr stainless steel) having a thickness of 0.5 mm was prepared as the substrate 22*a*.

The insulating layers 22*b*, 22*e* will be explained next. The material of the insulating layers 22*b*, 22*e* is not particularly limited, but a heat-resistant material needs to be selected herein in anticipation of temperatures in actual use. Glass and PI (polyimide) are preferable as the material, from the viewpoint of heat resistance. In a case for instance where a glass layer is used, the groove portions are formed in this glass layer. In a case where a polyimide layer is used, the groove portions are formed in this polyimide layer.

In the case of glass, a specific powder material may be selected as appropriate within a range such that the characteristics of the present invention are not impaired. A thermally conductive filler or the like having insulating properties may be mixed in, as needed. The insulating layers 22*b*, 22*e* may be made up of the same material, or of different materials. Likewise, the thicknesses of the insulating layers 22*b*, 22*e* may be identical, or may be modified as needed. Ordinarily, heaters having a withstand voltage of about 1.5 kV are preferably used in image forming apparatuses. Accordingly, it suffices that the thickness of the insulating layer 22*b* be secured in accordance with the material, so as to achieve a dielectric strength performance of 1.5 kV between the heat generating members 22*c* and the substrate 22*a*.

The method for forming the insulating layers 22*b*, 22*e* is not particularly limited; as an example, the insulating layers 22*b*, 22*e* can be formed smoothly for instance by screen printing. In forming an insulating layer out of glass or PI (polyimide) on the substrate 22*a*, the coefficients of linear expansion of the substrate and of the materials of the insulating layers must be adjusted as appropriate so that the insulating layers do not crack or delaminate due to differences in coefficient of linear expansion between the materials. Glass is superior to PI as regards durability. The materials for the substrate and the insulating layers may be selected as appropriate with all the above in mind.

In the present embodiment, an insulating layer glass paste was applied on the above-described a stainless steel substrate by screen printing, followed by drying at 180° C. and firing at 850° C., to form, on the respective face of the stainless steel substrate, an insulating layer 22*b* having a thickness of 60 μm and an insulating layer 22*e* having a thickness of 120 μm.

Figure 38B:
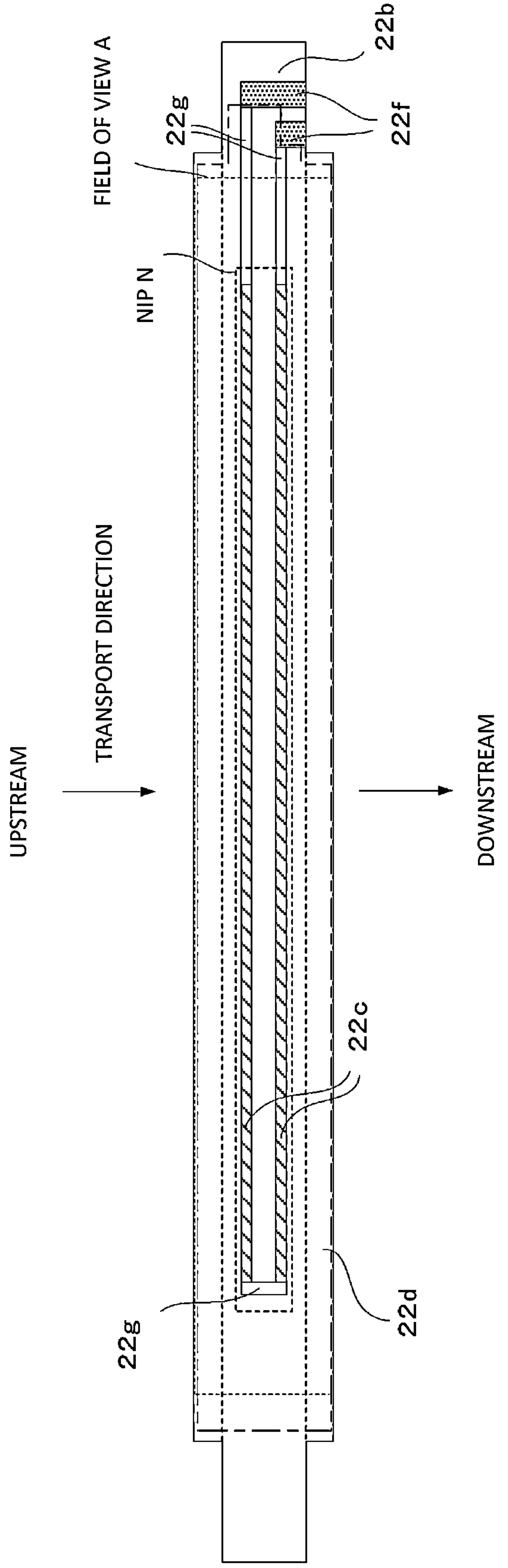
FIG. 38B is a plan-view diagram of the heater of Embodiment 9.

The heat generating members 22*c*, the power supplying electrodes 22*f*, the conductive patterns 22*g* and the protecting layer 22*d* were formed thereafter on the insulating layer 22*b*, as illustrated in the longitudinal diagram of FIG. 38B. The method is similar to that of Embodiment 5, and accordingly an explanation thereof will be omitted.

Figure 38C:
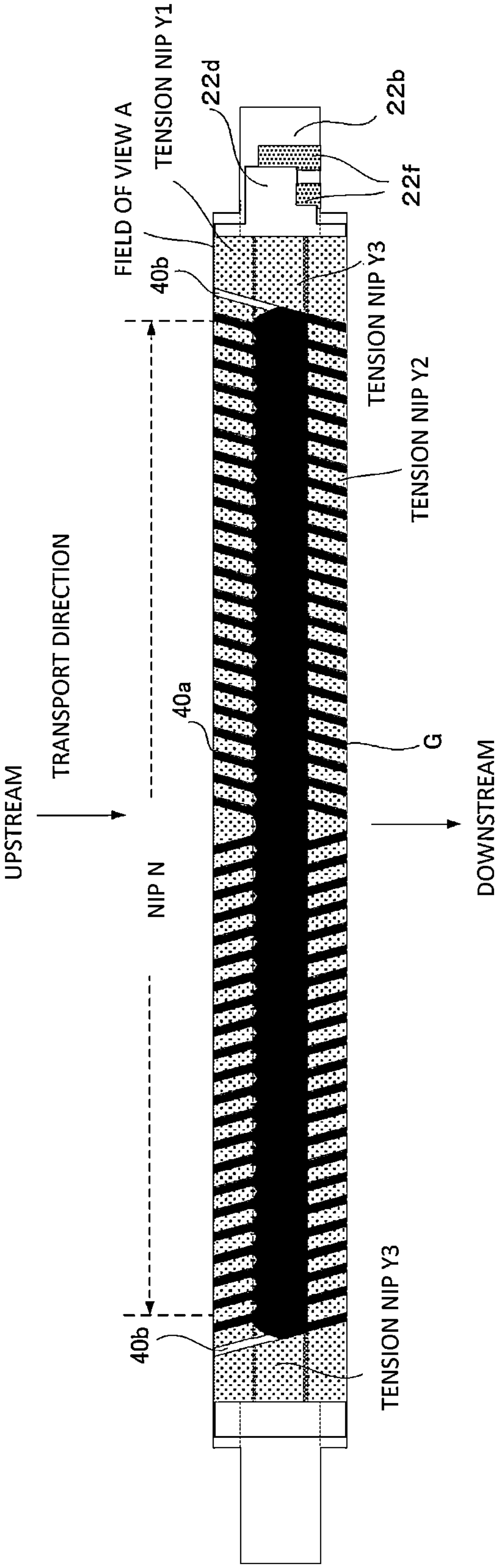
FIG. 38C is a diagram illustrating the state of grease on the surface of the heater of Embodiment 9.

FIG. 38C illustrates the manner in which groove portions 40*a* and groove portions 40*b* similar to those of Embodiment 8 are provided on the surface of the protecting layer 22*d*. The fixing nip N and tension nips Y1, Y2 and Y3 are also depicted.

Unlike in Embodiments 5 to 8, the configuration in the present embodiment does not utilize the thermal conductive member 40, and hence heat of the heat generating members 22*c* can be efficiently transmitted to the fixing film 23. Accordingly, the present embodiment is more advantageous than the fixing apparatus 100 of Embodiments 1 to 4 in terms of quick start properties. Also in a case where the groove portions 40*a* and 40*b* are provided on the heater surface as in the present embodiment, good rotatability of the fixing film 23 was obtained, similarly to that in Embodiment 8, and the toner image T on the recording material P could be heat-fixed, in a good state, onto the recording material P.

Through formation of the groove portions 40*a* and 40*b* on the surface of the heater, similarly to Embodiment 5 through Embodiment 7, rotatability is improved in the same way as in the various embodiments. The best rotatability of the fixing film 23 was achieved in a case where the groove portions 40*a* and 40*b* were formed in the same way as in Embodiment 8 (i.e. the instance depicted in FIG. 38C).

A configuration using a metal substrate as in the present embodiment is advantageous in terms of quick start properties, as described above, but may be disadvantageous in terms of cost as compared with a heater configuration in which a ceramic substrate is used. That is, the configurations described in Embodiments 5 to 7 may be selected in a case where cost has priority.

Figure 39:
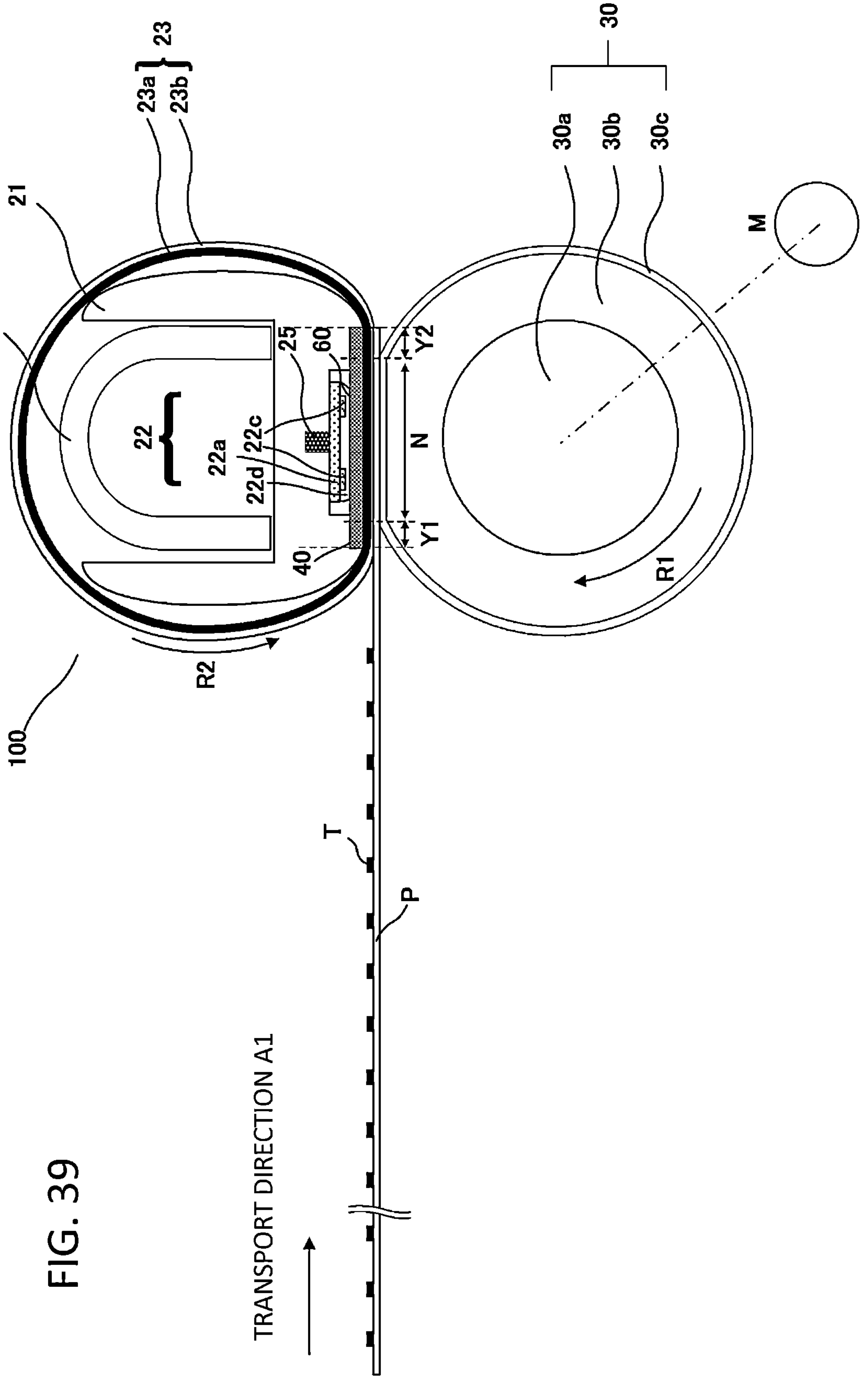
FIG. 39 is a cross-sectional diagram illustrating a variation of a fixing apparatus.
Figure 40:
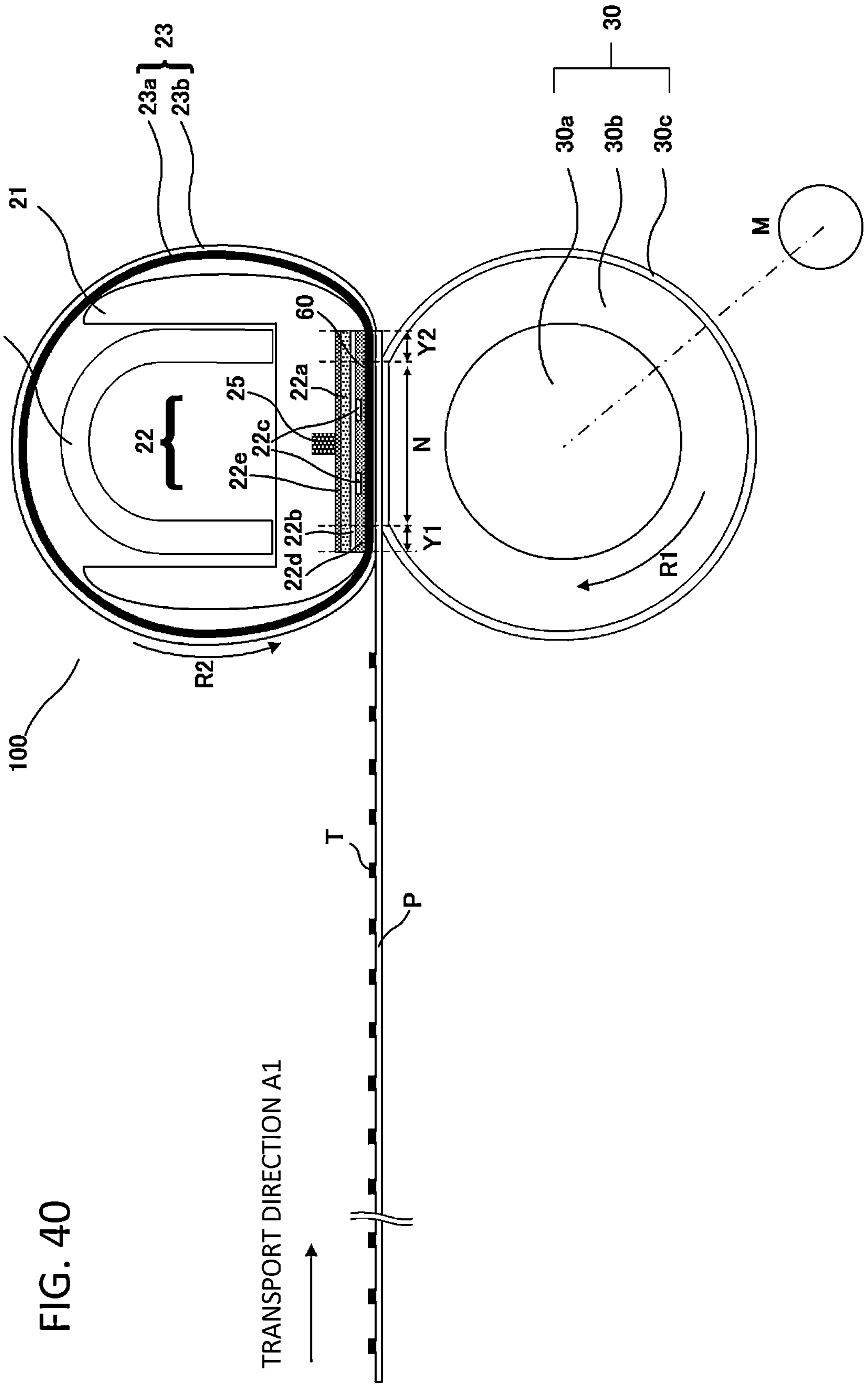
FIG. 40 is a cross-sectional diagram illustrating a variation of a fixing apparatus.

The thermal conductive member 40 explained in Embodiments 5 to 8 and the heater 22 explained in the present embodiment have bent portions upstream and downstream of the fixing nip N in the transport direction. However, the thermal conductive member 40 and the heater 22 may have a planar shape, as illustrated in FIG. 39 and FIG. 40. A thermal conductive member 40 and a heater 22 of planar shape have the benefits of boasting good workability and low cost. Although a configuration having bent portions is inferior in workability, such a configuration is nevertheless advantageous in that the shape thereof tracks the locus of rotation of the fixing film 23, and as a result rotatability of the fixing film 23 is unhindered. These shapes may be selected as appropriate so as to suit the image forming apparatus.

The configurations of the embodiments above can be arbitrarily combined with each other so long as no contradictions arise in doing so. For instance, a fixing apparatus may be configured that includes both the enclosing member described in (I) and the regulating rotation member described in (II). A fixing apparatus may be configured that includes both the enclosing member described in (I), and a heater or thermal conductive member having grooves, such as those described in (III). Also, a fixing apparatus may be configured that includes both the regulating rotation member explained in (II), and a heater or thermal conductive member having grooves, such as those described in (III). Further, a fixing apparatus may be configured that includes all of the enclosing member described in (I), the regulating rotation member described in (II), and a heater or thermal conductive member having grooves, such as those described in (III).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170350, filed on Oct. 25, 2022, which is hereby incorporated by reference wherein in its entirety.

What is claimed is:

1. A fixing apparatus, comprising:

a first rotation member;

an elongated heater configured to have a heat generating member and a substrate on which the heat generating member is provided and to be disposed in an internal space of the first rotation member;

a temperature sensing unit configured to detect a temperature of the heater;

a heater holder configured to hold the heater;

a second rotation member configured to form a nip portion with the heater, across the first rotation member;

a reservoir to store grease that is supplied between the first rotation member and the heater; and an elastic member configured to enclose the temperature sensing unit, in the nip portion, a toner image formed on a recording material being heated and fixed, wherein the reservoir, the temperature sensing unit and the elastic member are provided between the heater and the heater holder, in a thickness direction orthogonal to both a longitudinal direction of a surface of the substrate on which a heat generating member is provided, and to a transverse direction that is orthogonal to the longitudinal direction;

the temperature sensing unit is enclosed by the elastic member in the longitudinal direction and the transverse direction; and the elastic member has a lower Young's modulus than that of a body of the heater holder.

2. The fixing apparatus according to claim 1, wherein the elastic member is made up of silicone rubber.

3. The fixing apparatus according to claim 1, wherein the elastic member is bonded to the heater.

4. The fixing apparatus according to claim 1, wherein the temperature sensing unit has at least either one of a thermistor configured to detect the temperature of the heater, and a fuse capable of stopping energization of the heater.

5. The fixing apparatus according to claim 1, wherein the first rotation member is a tubular film, and the second rotation member is a pressurizing roller.

6. An image forming apparatus, comprising:

an image forming unit configured to form a toner image on the basis of image data; and a fixing apparatus configured to fix the toner image on a recording material, wherein the fixing apparatus is the fixing apparatus of claim 1.

7. The fixing apparatus according to claim 1, further comprising:

a stay configured to support the heater holder; and a rotatable support having a shaft that is rotatably supported by the stay and having a size so that a portion of the rotatable support protrudes beyond the stay in order to support the first rotation member and to rotate accompanying the rotation of the first rotation member; and the rotatable support has a contact region that is in contact with the first rotation member and a non-contact region that is not in contact with the first rotation member, in the longitudinal direction of the surface of the substrate on which a heat generating member is provided, and in a transverse direction that is orthogonal to the longitudinal direction.

8. The fixing apparatus according to claim 1, wherein the heater has a protecting layer configured to cover the heat generating member;

the protecting layer includes a first region at which the protecting layer sandwiches the first rotation member, together the second rotation member, and a second region at which the protecting layer does not sandwich the first rotation member, in a transport direction of the recording material orthogonal to the longitudinal direction of the surface of the substrate on which a heat generating member is provided;

the second region lies upstream of the first region in the transport direction;

the second region has a first portion at which a groove for holding grease is formed, and the first region has a second portion in which the groove is not formed; and the first portion and the second portion are juxtaposed on a virtual line in the transport direction, as viewed from the upstream side towards the downstream side of the transport direction.

* * * * *